US012561044B2

(12) United States Patent
Park et al.

(10) Patent No.: US 12,561,044 B2
(45) Date of Patent: Feb. 24, 2026

(54) METHOD AND DEVICE FOR PROVIDING WALLPAPER IN ELECTRONIC DEVICE

(71) Applicant: SAMSUNG ELECTRONICS CO., LTD., Suwon-si (KR)

(72) Inventors: Gyeongtae Park, Suwon-si (KR); Junghyeob Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/890,124

(22) Filed: Sep. 19, 2024

(65) Prior Publication Data

US 2025/0130684 A1 Apr. 24, 2025

Related U.S. Application Data

(63) Continuation of application No. PCT/KR2023/002431, filed on Feb. 21, 2023.

(30) Foreign Application Priority Data

Mar. 22, 2022 (KR) ........................ 10-2022-0035407
Jul. 25, 2022 (KR) ........................ 10-2022-0091748

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *H04M 1/0237* (2013.01);
(Continued)

(58) Field of Classification Search
CPC .. G06F 3/04817; G06F 3/0482; G06F 3/0488; G06F 3/04842; G06F 3/041;
(Continued)

(56) References Cited

U.S. PATENT DOCUMENTS 10,739,940 B2 8/2020 Lee et al.
11,029,839 B2 6/2021 Hu et al.
(Continued)

FOREIGN PATENT DOCUMENTS

CN 104750393 A 7/2015
KR 20100027501 A 3/2010
(Continued)

OTHER PUBLICATIONS

International Search Report corresponding to Application No. PCT/KR2023/002431; Dated Mar. 22, 2022.

*Primary Examiner* — Stephen G Sherman
(74) *Attorney, Agent, or Firm* — CANTOR COLBURN LLP

(57) ABSTRACT

An embodiment of the present disclosure provides an electronic device having a rollable display capable of supporting a wallpaper and a wallpaper setting, and a method therefor. According to an embodiment, the electronic device may support, by a processor, wallpaper displaying according to a change in an expansion or contraction state of the rollable display and a wallpaper setting for same. According to an embodiment, the processor may operate to configure a first image area corresponding to first wallpaper displayed in a first display area and display a first preview image corresponding to the configured first image area. According to an embodiment, the processor may operate to configure a second image area corresponding to second wallpaper displayed in a second display area and display a second preview image corresponding to the configured second image area.

18 Claims, 34 Drawing Sheets

(51) Int. Cl.
| | |
|---|---|
| *H04M 1/02* | (2006.01) |
| *H04M 1/72448* | (2021.01) |
| *H04M 1/72469* | (2021.01) |
| *G06F 3/0488* | (2022.01) |

(52) U.S. Cl.
CPC ..... *H04M 1/0268* (2013.01); *H04M 1/72448* (2021.01); *H04M 1/72469* (2021.01); *G06F 3/0488* (2013.01)

(58) Field of Classification Search
CPC ..... G06F 1/16; H04M 1/0237; H04M 1/0268; H04M 1/72448; H04M 1/72469; H04M 1/02
See application file for complete search history.

(56) References Cited

U.S. PATENT DOCUMENTS

| | | | |
|---|---|---|---|
| 2010/0056223 | A1 | 3/2010 | Kim et al. |
| 2013/0305189 | A1 | 11/2013 | Kim |
| 2015/0113475 | A1 | 4/2015 | Xu et al. |
| 2015/0156312 | A1* | 6/2015 | Jung ..................... G06F 1/1628 |
| | | | 455/566 |
| 2016/0026219 | A1 | 1/2016 | Kim et al. |
| 2016/0357406 | A1 | 12/2016 | Lee et al. |
| 2017/0345192 | A1 | 11/2017 | Geller et al. |
| 2018/0024728 | A1 | 1/2018 | Cheng |
| 2022/0035513 | A1 | 2/2022 | Kang et al. |
| 2022/0121346 | A1 | 4/2022 | Kim et al. |
| 2022/0357823 | A1 | 11/2022 | Choi |

FOREIGN PATENT DOCUMENTS

| | | | |
|---|---|---|---|
| KR | 20130136691 | A | 12/2013 |
| KR | 101389775 | B1 | 4/2014 |
| KR | 20140112988 | A | 9/2014 |
| KR | 20150090698 | A | 8/2015 |
| KR | 20160013748 | A | 2/2016 |
| KR | 20160143312 | A | 12/2016 |
| KR | 101868352 | B1 | 6/2018 |
| KR | 102254597 | B1 | 5/2021 |
| KR | 20220061800 | A | 5/2022 |
| WO | 2021049685 | A1 | 3/2021 |
| WO | 2022025308 | A1 | 2/2022 |

* cited by examiner

METHOD AND DEVICE FOR PROVIDING WALLPAPER IN ELECTRONIC DEVICE

CROSS-REFERENCE TO RELATED APPLICATIONS

This application is a continuation application of International Application No. PCT/KR2023/002431 designating the United States, filed on Feb. 21, 2023, in the Korean Intellectual Property Receiving Office and claiming priority to Korean Patent Application No. 10-2022-0091748, filed on Jul. 25, 2022, in the Korean Intellectual Property Office, and to Korean Patent Application No. 10-2022-0035407, filed on Mar. 22, 2022, in the Korean Intellectual Property Office, the disclosures of all of which are incorporated by reference herein in their entireties.

BACKGROUND

An embodiment of the present disclosure provides a method and device for providing user wallpaper in an electronic device.

With the development of digital technologies, various types of electronic devices are widely used, such as mobile communication terminals, personal digital assistants (PDAs), electronic notebooks, smartphones, tablet personal computers (PCs), wearable devices and/or laptop PCs, or the Internet of Things (IoT). Hardware components and/or software components of the electronic device are consistently developed to support and improve the function of the electronic device.

As part of the software components of the electronic device, the electronic device may provide a user with a function to configure wallpaper according to the user's intent. For example, the user may configure user wallpaper in the electronic device on the basis of an image taken by the user using the electronic device and/or obtained (e.g., downloaded) from an external source (e.g., a server or another electronic device) through a designated communication. As described above, the electronic device may provide user-customized wallpaper on the lock screen and/or wallpaper of the electronic device as a background of the electronic device using a predetermined image that is configured by the user.

Meanwhile, the electronic device may have a limited size for portability, which constrains a size of a display. Therefore, recently, various forms of electronic devices have been developed that provide a more expanded screen in the electronic device. For example, the display of the electronic device is progressively increasing in size from a display having a limited size, and the electronic device is designed to provide various services (or functions) to the user through a large screen.

The latest electronic device may have a new form factor, such as a rollable device and/or a slidable device. For example, the electronic device may have a flexible display or a slidable display, and at least a portion of the display may be rolled up for use or unfolded for use. For example, the electronic device may be implemented to allow the screen to be expanded or contracted by a sliding method. For example, a portion of the flexible display may be slidingly withdrawn from an interior space of the electronic device or retracted into the interior space of the electronic device, which may cause the screen to be expanded or contracted.

With the electronic device taking on new form factors, there is an increasing need to develop a corresponding user interface (UI) and operations related thereto.

In a conventional electronic device, when wallpaper is provided, a fragmentary wallpaper is provided on the basis of an initially configured image, regardless of whether the screen is expanded or contracted. For example, in the electronic device, the wallpaper is provided in a method corresponding to a wallpaper setting in an electronic device including a fixed display, regardless of whether the screen is expanded or contracted. For example, a conventional user wallpaper configuration experience provides a wallpaper setting based on an electronic device with a physically fixed display.

SUMMARY

There is provided an electronic device according to an embodiment of the present disclosure. The electronic device may include a first housing, a second housing disposed to slidingly move relative to the first housing, a rollable display having a first display area and a second display area expanding from the first display area, a memory, having one or more storage mediums, storing instructions, and at least one processor having processing circuitry, wherein the instructions, when executed by the at least one processor individually and/or collectively, cause the electronic device configure a first image area corresponding to first wallpaper displayed in the first display area. According to an embodiment, the instructions, when executed by the at least one processor individually and/or collectively, cause the electronic device to display a first preview image corresponding to the configured first image area. According to an embodiment, the instructions, when executed by the at least one processor individually and/or collectively, cause the electronic device to configure a second image area corresponding to second wallpaper displayed in the second display area. According to an embodiment, the instructions, when executed by the at least one processor individually and/or collectively, cause the electronic device to display a second preview image corresponding to the configured second image area.

An electronic device, according to an embodiment of the present disclosure, may include a display, and a processor. The processor may operate to detect a trigger related to a wallpaper setting. The processor may operate to simultaneously display, on the basis of detecting the trigger, the first preview image and the second preview image corresponding to the first display area in the first state and the second display area in the second state, respectively. The processor may operate to perform an object analysis of various image objects on the basis of an entire area of a wallpaper image corresponding to the first preview image and the second preview image. The processor may operate to generate at least one recommended object related to at least one image object on the basis of a result of the object analysis. The processor may operate to provide the at least one recommended object to a wallpaper preview area for wallpaper. The processor may operate to detect a user input of selecting a recommended object on the basis of the at least one recommended object. The processor may operate to identify, in response to the user input, the second image area for the second wallpaper on the basis of the selected recommended object. The processor may operate to configure the second wallpaper based on the second image area. The processor may operate to display the second preview image for the second wallpaper through the wallpaper preview area.

An electronic device according to an embodiment of the present disclosure may include a rollable display having a first display area and a second display area that expands from the first display area. An operation method of an electronic device, according to an embodiment of the present disclosure, may include an operation of configuring a first image area corresponding to first wallpaper displayed in a first display area, and displaying a first preview image corresponding to the configured first image area, and an operation of configuring a second image area corresponding to second wallpaper displayed in a second display area, and displaying a second preview image corresponding to the configured second image area.

An electronic device, according to an embodiment of the present disclosure, may include a display, and a processor. An operation method of an electronic device, according to an embodiment of the present disclosure, may include an operation of detecting a trigger related to a wallpaper setting. According to an embodiment, the operation method may include, on the basis of detecting the trigger, an operation of simultaneously displaying a first preview image and a second preview image corresponding to a first display area in a first state and a second display area in a second state, respectively. According to an embodiment, the operation method may include, on the basis of an entire area of a wallpaper image corresponding to a first preview image and a second preview image, an operation of performing an object analysis of various image objects. According to an embodiment, the operation method may include an operation of generating at least one recommended object related to at least one image object on the basis of the result of the object analysis. According to an embodiment, the operation method may include an operation of providing at least one recommended object to a wallpaper preview area for wallpaper.

According to an embodiment, the operation method may include an operation of detecting a user input of selecting a recommended object on the basis of the at least one recommended object. According to an embodiment, the operation method may include an operation of identifying, in response to the user input, the second image area for the second wallpaper on the basis of the selected recommended object. According to an embodiment, the operation method may include an operation of configuring the second wallpaper based on the second image area. According to an embodiment, the operation method may include an operation of displaying the second preview image for the second wallpaper through the wallpaper preview area.

In various embodiments of the present disclosure to solve the technical objects described herein, a computer-readable recording medium in which a program for executing the method in a processor is recorded may be included.

According to an embodiment, a non-transitory computer-readable storage medium (or computer program product) storing one or more programs is described. According to an embodiment, when executed by a processor of an electronic device, one or more programs may include instructions to perform operations of detecting a trigger related to a wallpaper setting, displaying simultaneously, on the basis of detecting the trigger, a first preview image and a second preview image corresponding to a first display area in a first state and a second display area in a second state, respectively, performing an object analysis of various image objects on the basis of an entire area of a wallpaper image corresponding to the first preview image and the second preview image, generating, on the basis of a result of the object analysis, at least one recommended object related to the at least one image object, and providing the at least one recommended object to a wallpaper preview area for wallpaper.

According to an embodiment, one or more programs may include instructions to perform operations of detecting a user input of selecting a recommended object on the basis of the at least one recommended object, identifying, in response to the user input, the second image area for the second wallpaper on the basis of the selected recommended object, configuring the second wallpaper based on the second image area, and displaying the second preview image for the second wallpaper through the wallpaper preview area.

An additional range of the applicability of the present disclosure will become apparent from the following detailed description. However, various alterations and modifications may be clearly understood by those skilled in the art without departing from the spirit and scope of the present disclosure. Accordingly, it should be understood that the detailed description and the specific embodiments such as the exemplary embodiments of the present disclosure are just provided for illustrative purposes.

BRIEF DESCRIPTION OF THE DRAWINGS

In connection with the description of the drawings, the same or similar reference numerals may be used for the same or similar components.

FIG. 1 is a block diagram illustrating an example electronic device in a network environment according to various embodiments.

FIGS. 11A and 11B are views for describing examples of configuring wallpaper on an electronic device according to an embodiment of the present disclosure.

DETAILED DESCRIPTION

Figure 2A:
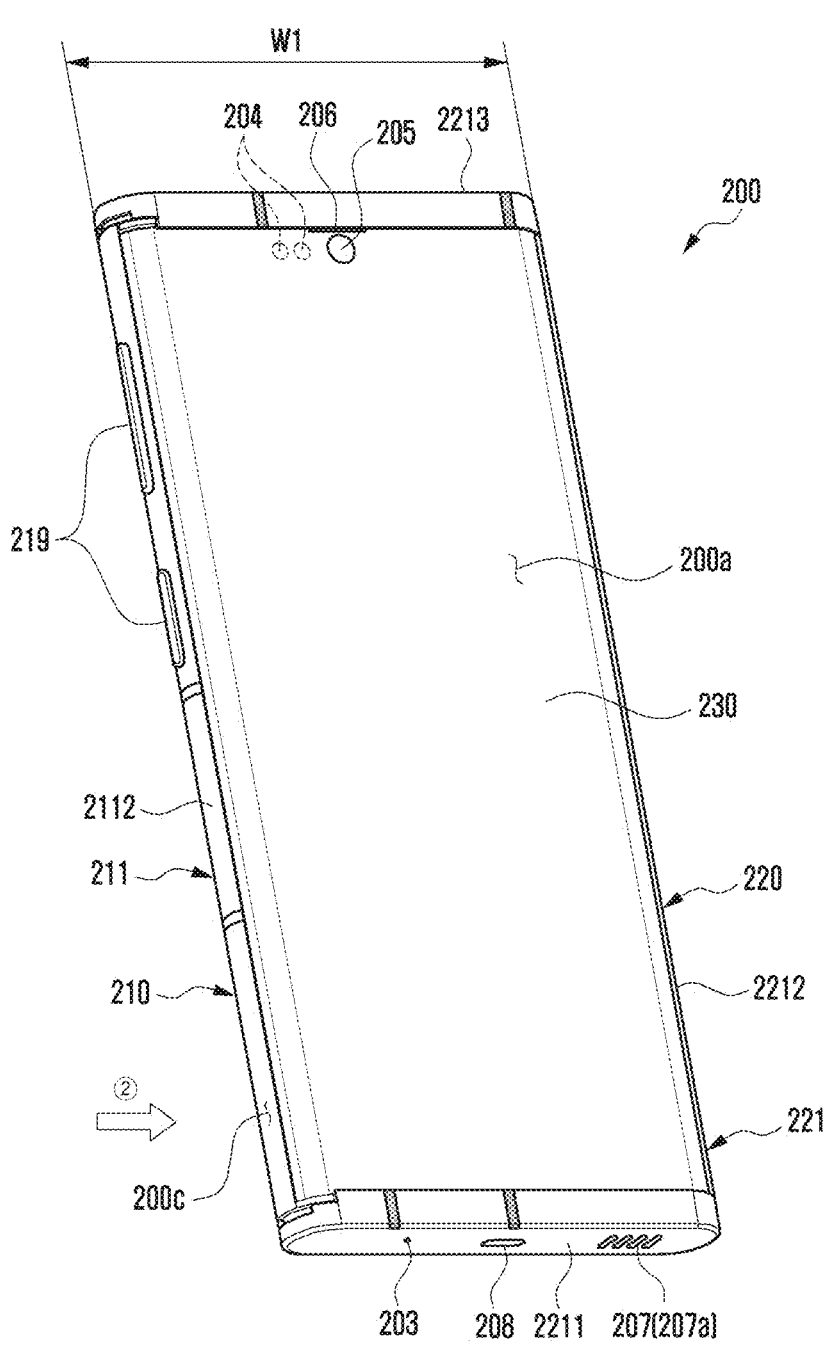
FIGS. 2A and 2B are views illustrating a front and rear view of an electronic device in a closed state of the electronic device having a form factor according to an embodiment.

In various embodiments of the present disclosure, there is provided a method and device for supporting intuitive user wallpaper and a wallpaper setting in an electronic device including an expandable display (e.g., a rollable display).

In various embodiments of the present disclosure, there is provided a method and device that is capable of supporting wallpaper that is adaptive to a state change of an electronic device (e.g., expansion or contraction of a display), in the electronic device including an expandable display.

In various embodiments of the present disclosure, there is provided a method and device that is capable of simultaneously providing a plurality of preview images each corresponding to a state of an electronic device (e.g., an open state (or an expanded state) or a closed state (or a contracted state)) in a wallpaper preview area during a user wallpaper setting on the electronic device including an expandable display, and improving usability and convenience of the wallpaper setting on the basis of a preview image for each state of the electronic device.

In various embodiments of the present disclosure, there is provided a method and device that, in an electronic device including an expandable display, when a preview image for each state of the electronic device is provided in a wallpaper preview area, tracks a recommendable image area in a wallpaper image, and provides at least one recommended object related to the tracked image area, thereby improving the usability and convenience of a user's wallpaper setting.

In various embodiments of the present disclosure, there is provided a method and device, in an electronic device including an expandable display, which is capable of providing user's wallpaper with successive changes to match the characteristics of the continuously expanding display.

Technical problems to be solved by the present document are not limited to the above-mentioned technical problems, and other technical problems, which are not mentioned above, may be clearly understood from the following descriptions by those skilled in the art to which the present disclosure pertains.

According to an electronic device, an operating method thereof, and a recording medium according to an embodiment of the present disclosure, in an electronic device including an expandable display (e.g., a rollable display), wallpaper can be provided that is adaptive and/or intuitive to a state change of the electronic device (e.g., expansion or contraction of the display). According to an embodiment of the present disclosure, during a user wallpaper setting on an electronic device, a plurality of preview images can be simultaneously provided in a wallpaper preview area, each corresponding to a state of the electronic device (e.g., an open state (or an expanded state) or a closed state (or a contracted state)). According to an embodiment of the present disclosure, a plurality of preview images corresponding to a state change of an electronic device is provided, thereby providing intuitiveness and convenience for a user wallpaper setting for each state of the electronic device (e.g., a contracted or expanded state of a display).

According to an embodiment of the present disclosure, in an electronic device, when a preview image for each state of the electronic device is provided in a wallpaper preview area, a recommendable image area for a user can be tracked on the basis of an entire area of a wallpaper image, and at least one recommended object related to the tracked image area can be provided. According to an embodiment of the present disclosure, the usability and convenience of a user's wallpaper setting can be improved on the basis of at least one recommended object. According to an embodiment of the present disclosure, in an electronic device, user's wallpaper can be provided with successive changes to match the characteristics of the continuously expanding display.

In addition, various effects that can be directly or indirectly identified through the present document may be provided. The effects obtained by the present disclosure are not limited to the aforementioned effects, and other effects, which are not mentioned above, will be clearly understood by those skilled in the art from the following description.

Figure 1:
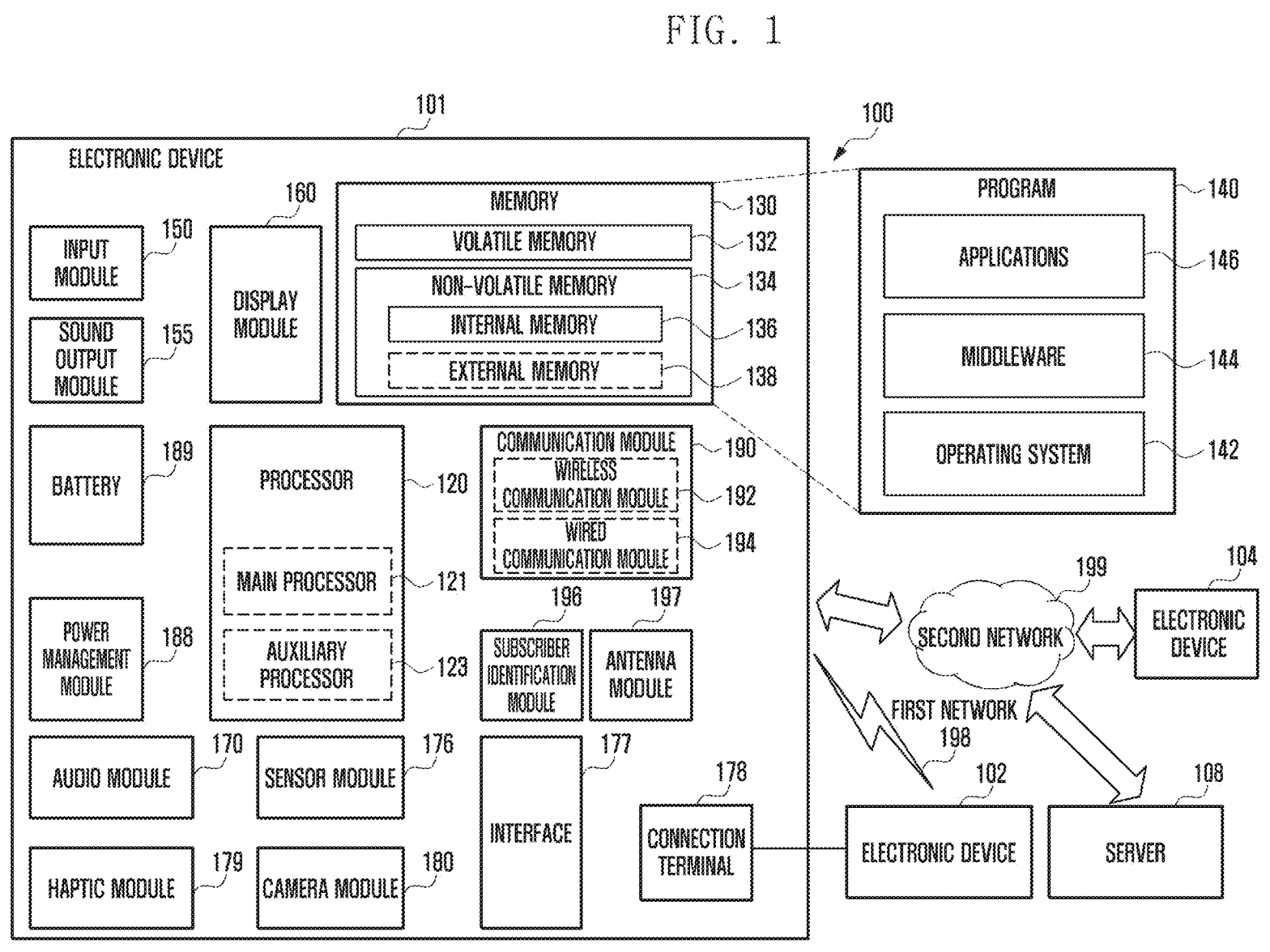

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2B:
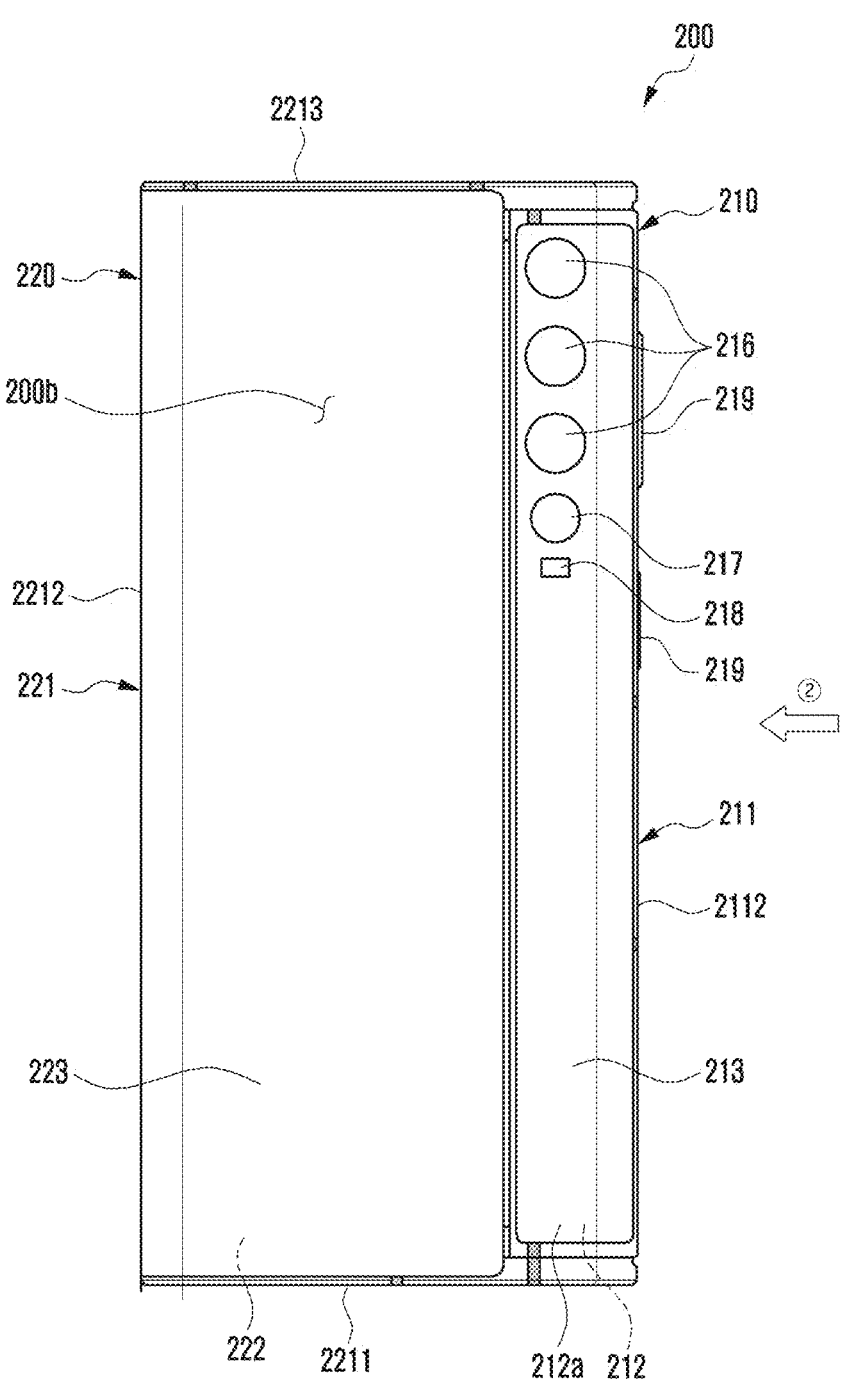
Figure 2C:
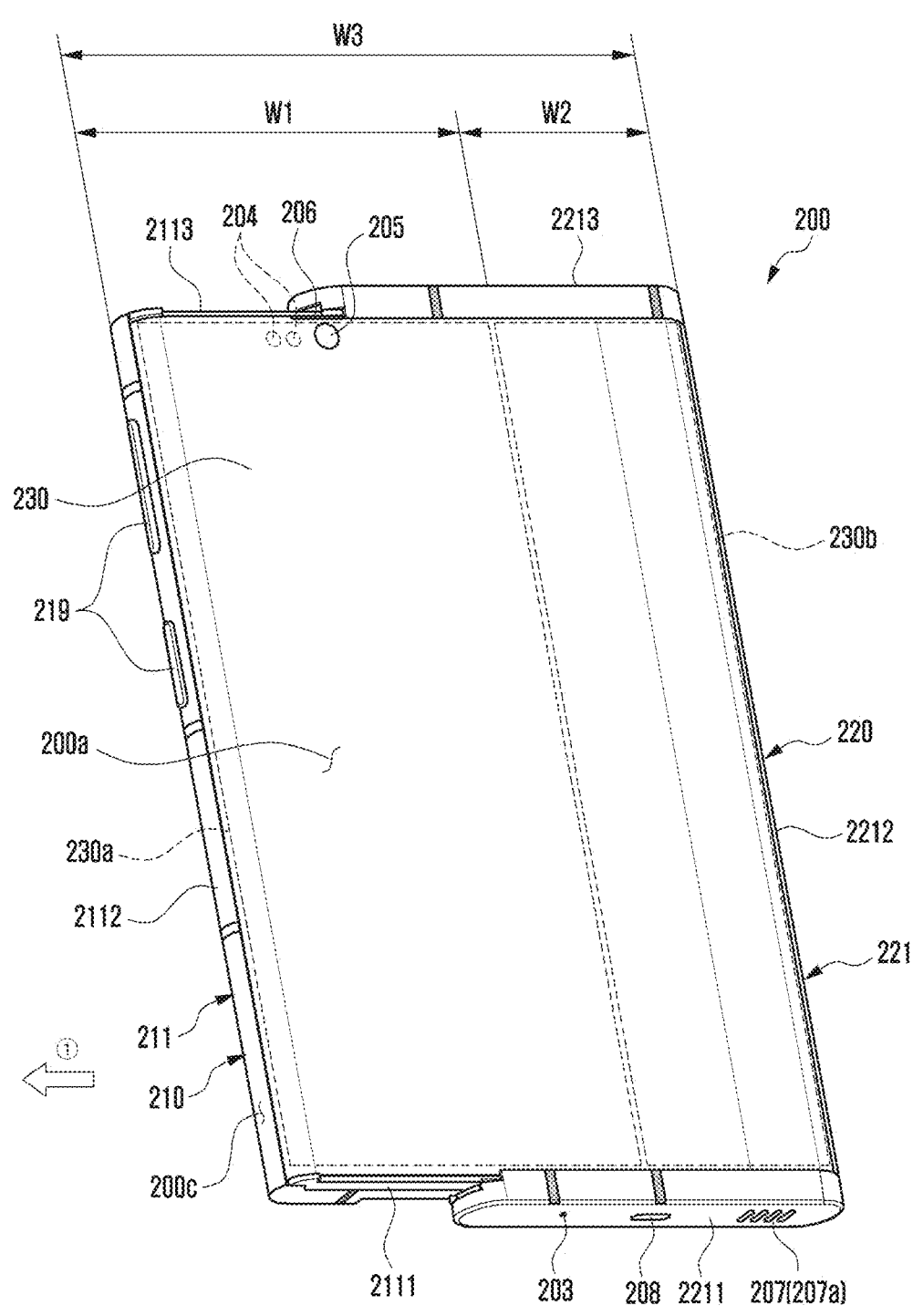
FIGS. 2C and 2D are views illustrating a front and rear view of an electronic device in an open state of the electronic device having a form factor according to an embodiment.
Figure 2D:
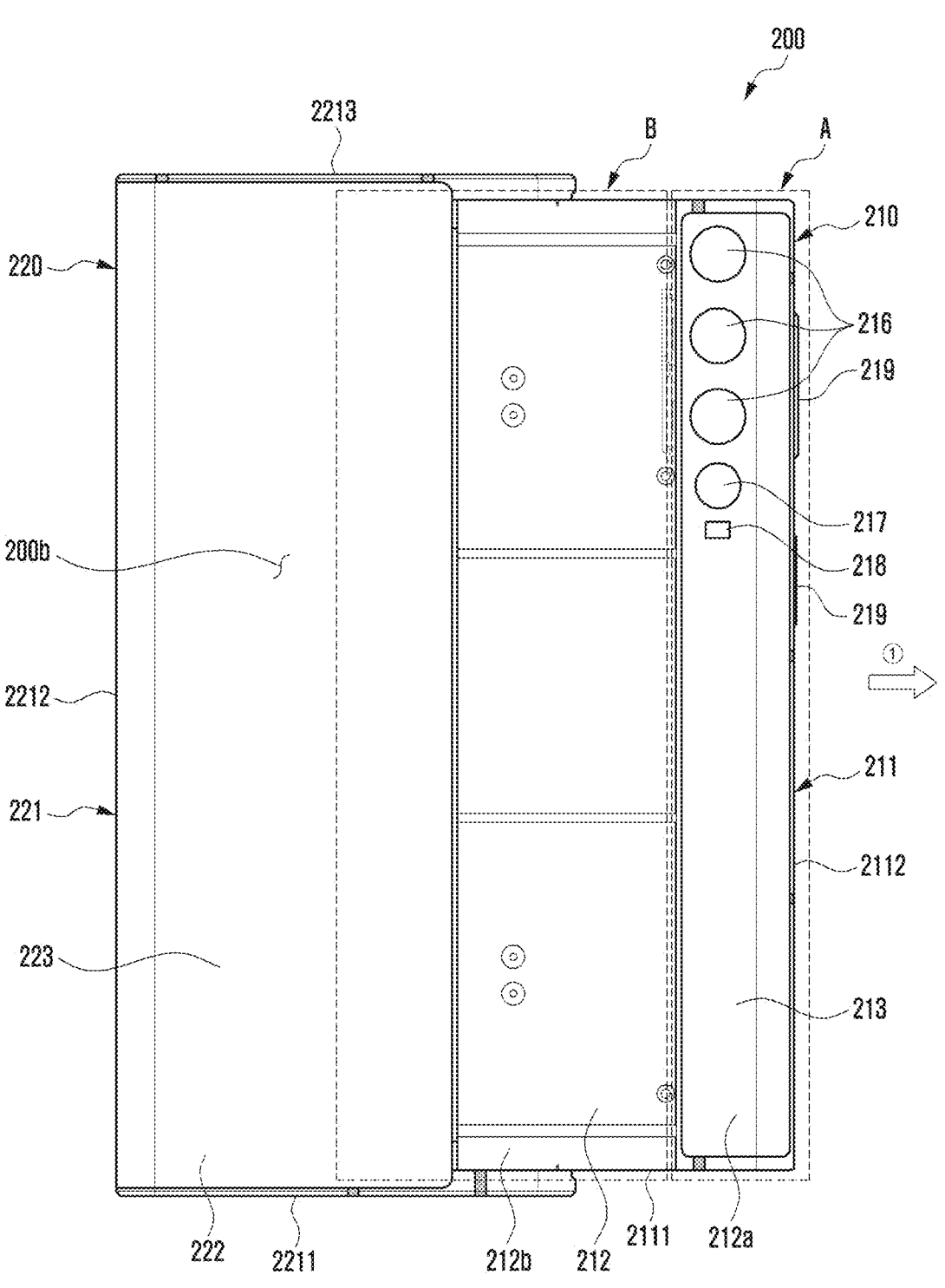

FIGS. 2A and 2B are views illustrating a front and rear view of an electronic device in a closed state of the electronic device having a form factor according to an embodiment. FIGS. 2C and 2D are views illustrating a front and rear view of an electronic device in an open state of the electronic device having a form factor according to an embodiment.

An electronic device 200 in FIGS. 2A to 2D may be at least partially similar to the electronic device 101 in FIG. 1, include the electronic device 101 in FIG. 1, or further include other embodiments of the electronic device 101 in FIG. 1.

With reference to FIGS. 2A to 2D, the electronic device 200 may include a first housing 210 (e.g., a first housing structure or base housing), a second housing 220 (e.g., a second housing structure or slide housing) coupled to the first housing 210 to be moveable (e.g., sliding) in a designated first direction (direction ①) (e.g., in the x-axis direction) and in a designated reciprocal distance from the first housing 210, and a flexible display 230 (e.g., an expandable display) disposed to be supported by at least a portion of the first housing 210 and the second housing 220.

According to an embodiment, the electronic device 200 may include a bendable member (or bendable support member) (e.g., a multi-joint hinge module or multi-bar assembly) that, in an open state (or an expanded state or a withdrawn state (slide-out state)), forms at least partially a same plane as at least a portion of the first housing 210 and, in a closed state (or a contracted state or a retracted state (slide-in state)), is received at least partially into an interior space of the second housing 220. According to an embodiment, at least a portion of the flexible display 230, in a closed state, may be disposed to be invisible from the outside by being received into the interior space of the second housing 220 while supported by the bendable member. According to an embodiment, at least a portion of the flexible display 230 may be disposed to be visible from the outside while being supported by the bendable member that forms at least partially a same plane as the first housing 210 in an open state.

According to an embodiment, the electronic device 200 may include a front surface 200a (e.g., a first surface), a rear surface 200b (e.g., a second surface) directed in a direction opposite to the front surface 200a, and a side surface (not illustrated) to surround a space between the front surface 200a and the rear surface 200b. According to an embodiment, the electronic device 200 may include a first housing 210 including a first lateral member 211, and a second housing 220 including a second lateral member 221. According to an embodiment, the first lateral member 211 may include a first side surface 2111 having a first length along a first direction (direction ①), a second side surface 2112 extending from the first side surface 2111 along a direction substantially perpendicular to the first side surface 2111 and having a second length longer than the first length, and a third side surface 2113 extending substantially in parallel with the first side surface 2111 from the second side surface 2112 and having the first length. According to an embodiment, the first lateral member 211 may be at least partially made of a conductive material (e.g., metal). According to an embodiment, at least a portion of the second lateral member 211 may include a first support member 212 extending to at least a portion of an interior space of the first housing 210.

According to an embodiment, the second lateral member 221 may include: a fourth side surface 2211 at least partially corresponding to the first side surface 2111 and having a third length, a fifth side surface 2212 extending substantially in parallel with the second side surface 2112 from the fourth side surface 2211 and having a fourth length longer than the third length, and a sixth side surface 2213 extending from the fifth side surface 2212 in correspondence to the third side surface 2113, and having the third length. According to an embodiment, the second lateral member 221 may be at least partially made of a conductive material (e.g., metal). According to an embodiment, at least a portion of the second lateral member 221 may include a second support member 222 extending to at least a portion of an interior space of the second housing 220.

According to an embodiment, the first side surface 2111 and the fourth side surface 2211, and the third side surface 2113 and the sixth side surface 2213 may be slidably coupled relative to each other. According to an embodiment, in a closed state, the first side surface 2111 may be disposed to be invisible from the outside by overlapping at least a portion of the fourth side surface 2211. According to an embodiment, in a closed state, the third side surface 2113 may be disposed to be visible from the outside by overlapping at least a portion of the sixth side surface 2213. According to an embodiment, in a closed state, at least a portion of the first support member 212 may overlap the second support member 222, and a remaining portion of the first support member 212 may be disposed to be visible from the outside. Therefore, the first support member 212, in a closed state, may include a non-overlapping portion 212a that does not overlap the second support member 222 and an overlapping portion 212b that overlaps the second support member 222. In an embodiment, the non-overlapping portion 212a and the overlapping portion 212b may be formed integrally. In an embodiment, the non-overlapping portion 212a and the overlapping portion 212b are provided separately and may be structurally coupled.

According to an embodiment, the first housing 210 may include, in a first space, a first subspace A corresponding to the non-overlapping portion 212a and a second subspace B corresponding to the overlapping portion 212b. According to an embodiment, the first subspace A and the second subspace B may be disposed in such a way that the first subspace A and the second subspace B are at least partially connected to, or separated from, each other. According to an embodiment, the first subspace A may be formed to have a larger spatial volume than the second subspace B. This may be attributed to an overlapping structure in which the second support member 222 and the first support member 212 overlap in an area corresponding to the second subspace B. According to an embodiment, the electronic device 200 may include a plurality of electronic components disposed in the first space of the first housing 210, such as a camera module 216, a sensor module 217 a flash 218, a main board (or PCB), or a battery.

According to an embodiment, the first subspace A may be used as an area for the disposition of electronic components (e.g., camera module 216, sensor module 217, or flash 218) that require a relatively large mounting space (e.g., a relatively large mounting thickness) or that need to operate by avoiding the overlapping structure. According to an embodiment, the second subspace B may be used, for example, as an area for the disposition of electronic components (e.g., a main board (or PCB)) or a battery that require a relatively small mounting space (e.g., a relatively small mounting thickness), or that are capable of operating independently of the overlapping structure.

According to an embodiment, the front surface 200a and the rear surface 200b of the electronic device 200 may have a variable area depending on a closed state and an open state. In an embodiment, the electronic device 200 may include a first rear surface cover 213 disposed on at least a portion of the first housing 210 and a second rear surface cover 223 disposed on at least a portion of the second housing 220 on the rear surface 200b. According to an embodiment, the first rear surface cover 213 and/or the second rear surface cover 223 may be disposed in such a way that the first support member 212 and the second support member 213 are coupled to at least a portion of the first support member 212 and the second support member 213. In an embodiment, the first rear surface cover 213 and/or the second rear surface cover 223 may be integrally formed with each of the side surface members 211 and 221.

According to an embodiment, the first rear surface cover 213 and/or the second rear surface cover 223 may be formed of a polymer, coated or colored glass, ceramic, metal (e.g., aluminum (Al), stainless steel (STS), or magnesium), or a combination of at least two of the materials. In an embodiment, the first rear surface cover 213 and/or the second rear surface cover 223 may extend to at least a portion of each of the side surface members 211 and 221. In an embodiment, at least an extended portion of each of the side surface members 211 and 221 of the first rear surface cover 213 and the second rear surface cover 223 may be formed as a curved surface. In an embodiment, at least a portion of the first support member 212 is substituted with the first rear surface cover 213, and at least a portion of the second support member 222 may be substituted with the second rear surface cover 223.

According to an embodiment, the electronic device 200 may include the flexible display 230 disposed to be supported by at least a portion of the first housing 210 and the second housing 220. According to an embodiment, the flexible display 230 may include a first portion 230a (e.g., a planar portion) that is visible from the outside, and a second portion 230b (e.g., a bendable portion) that extends from the first portion 230a and is at least partially retracted into an interior space of the second housing 220 so that the second portion 230b is not visible from the outside in a closed state. According to an embodiment, the first portion 230a may be disposed to be supported by the first housing 210, and the second portion 230b may be disposed to be at least partially supported by the bendable member.

According to an embodiment, the flexible display 230 may be disposed such that, in a state where the first housing 210 is withdrawn along a designated first direction (direction ①), the flexible display 230 extends from the first portion 230a while supported by the bendable member, forms a substantially same plane as the first portion 230a, and is visible from the outside. According to an embodiment, the second portion 230b of the flexible display 230 may be disposed such that, in a state where the first housing 210 is retracted along a designated second direction (direction ②), the second portion 230b is retracted into an interior space of the second housing 220 and is not visible from the outside. Therefore, the electronic device 200 may have a variable display area of the flexible display 230 as the first housing 210 moves in a sliding method along a designated direction from the second housing 220.

According to an embodiment, the first housing 210 and the second housing 220 may operate in a sliding method such that an overall width is variable relative to each other. According to an embodiment, the electronic device 200 may be constituted to have, in a closed state, a first width W1 ranging from the second side surface 2112 to the fourth side surface 2211. According to an embodiment, the electronic device 200 may be constituted to have a third width W3 that is greater than the first width W1 as a portion of the bendable member retracted into an interior space of the second housing 210 is moved to have an additional second width W2 in an open state. For example, the flexible display 230 may have a display area substantially corresponding to the first width W1 in a closed state, and an expanded display area substantially corresponding to the third width W3 in an open state.

According to an embodiment, a withdrawal operation of the electronic device 200 may be performed through a user's manipulation. For example, the electronic device 200 may transition from a closed state to an open state through an operation of the flexible display 230, which is pushed in a designated first direction (direction ①) by a user's manipulation. According to an embodiment, the electronic device 200 may transition from an open state to a closed state through an operation of the flexible display 230, which is pushed in a designated second direction (direction ②) by a user's manipulation. According to an embodiment, the electronic device 200 may be maintained in an open state and/or a closed state through a slide hinge module (not illustrated) disposed between the first housing 210 and the second housing 220 as the first housing 210 is pressed in a direction to be retracted or withdrawn from the second housing 220 relative to a designated inflection point.

In an embodiment, the electronic device 200 may be constituted such that the first housing 210 is withdrawn in a designated first direction (e.g., ① direction) through manipulation of a locker exposed through the rear surface 200b of the electronic device 200. In an embodiment, the electronic device 200 may be automatically operated by a drive mechanism (e.g., a drive motor, a speed reduction module, and/or a gear assembly) disposed in an interior space of the first housing 210 and/or an interior space of the second housing 220. According to an embodiment, the electronic device 200 may be configured, through a processor (e.g., the processor 120 in FIG. 1), to control an operation of the second housing 220 through a drive mechanism upon detecting an event for transitioning the electronic device 200 to a closed/open state. In an embodiment, a processor (e.g., the processor 120 in FIG. 1) of the electronic device 200 may control the flexible display 230 to display visual information (e.g., an object and/or an application execution screen) in various methods in response to a changed display area of the flexible display 230, according to a closed state, an open state, or an intermediate state (e.g., including a free stop state).

According to an embodiment, the electronic device 200 may include at least one of an input module 203 (e.g., the input module 150 in FIG. 1), a sound output module 206 or 207 (e.g., the sound output module 155 in FIG. 1), a sensor module 204 or 217, a camera module 205 or 216, a connector port 208, a key input device 219, or an indicator (not illustrated). As an embodiment, the electronic device 200 may be constituted to exclude at least one of the above-mentioned constituent elements or further include other constituent elements.

According to an embodiment, the input module 203 may include a microphone. In an embodiment, the input module 203 may include a plurality of microphones disposed to detect a direction of sound. According to an embodiment, the sound output modules 206 and 207 may include a speaker. The sound output modules 206 and 207 may include a receiver 206 for calls and an external speaker 207.

According to an embodiment, the external speaker 207 may be disposed in the second housing 220 and may be constituted to transmit sound to the outside through a first speaker hole 207a. According to an embodiment, the external speaker 207 may be disposed in an interior space of the second housing 220 to provide superior quality of sound to a user, regardless of a sliding operation of the first housing 210.

According to an embodiment, the connector port 208 may be disposed in an interior space of the second housing 220 along with the external speaker 207. In an embodiment, the connector port 208 may be disposed in an interior space of the first housing 210 and, in a closed state, may face the outside through a connector port hole (not illustrated) formed in the second housing 220. In this case, the connector port 208 may be constituted to be concealed and invisible from the outside through the second housing 220 in a closed state.

According to an embodiment, the receiver 206 may be constituted to correspond to an external environment in an interior space of the first housing 210. In an embodiment, the sound output modules 206 and 207 may include a speaker (e.g., a piezo speaker) that operates without a separate speaker hall.

According to an embodiment, the sensor modules 204 and 217 may generate electrical signals or data values corresponding to an internal operating state of the electronic device 200 or an external environment state. The sensor modules 204 and 217 may include, for example, a first sensor module 204 (e.g., a proximity sensor or an illuminance sensor) disposed on the front surface 200a of the electronic device 200 and/or a second sensor module 217 disposed on the rear surface 200b.

According to an embodiment, the first sensor module 204 may be disposed on the front surface 200a of the electronic device 200 and provided below the flexible display 230. According to an embodiment, the first sensor module 204 and/or the second sensor module 217 may include at least one of a proximity sensor, an illuminance sensor, a TOF (time of flight) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, and a humidity sensor.

According to an embodiment, the camera modules 205 and 216 may include a first camera module 205 disposed on the front surface 200a of the electronic device 200 and a second camera module 216 disposed on the rear surface 200b. According to an embodiment, the electronic device 200 may include a flash 218 positioned near the second camera module 216. According to an embodiment, the camera modules 205 and 216 may each include one or a plurality of lens, an image sensor, and/or an image signal processor. According to an embodiment, the first camera module 205 may be disposed below the flexible display 230 and constituted to capture an image of a subject through a portion of an activation area of the flexible display 230. According to an embodiment, the flash 218 may include, for example, a light-emitting diode or a xenon lamp.

According to an embodiment, the first camera module 205 of the camera modules 205 and 216 and/or some of the sensor modules 204 and 217 may be disposed to be in contact with an external environment, in an interior space of the electronic device 200, through an opening formed through or a transmissive area in the flexible display 230. According to an embodiment, an area of the flexible display 230, which faces the first camera module 205, is a portion of the display area for displaying content and may be formed to be a transmissive area having a designated transmittance rate. According to an embodiment, the transmissive area may be formed to have a transmittance in the range of about 5% to about 20%. The transmissive area may include an area that overlaps an effective area (e.g., a view angle area) of the first camera module 205 through which light, which enters an image sensor to create an image, passes. For example, the transmissive area of the flexible display 230 may include an area having a lower pixel density and/or wiring density than the periphery thereof. For example, the transmissive area may be substituted with the above-mentioned opening. For example, some camera modules 205 may include a under display camera (UDC).

In an embodiment, some sensor modules 204 may be disposed in an interior space of the electronic device 200 and perform the function thereof without being visually exposed through the flexible display 230. According to an embodiment, the second camera module 216 of the camera modules 205 and 216 and/or some sensor modules 217 of the sensor modules 204 and 217 may be disposed to correspond to an external environment through at least a portion of the first housing 210 (e.g., the first rear surface cover 213) in an interior space of the electronic device 200. In this case, the second camera module 216 and/or some sensor modules 217 may be disposed in a designated position of the first housing 210 that is visible from the outside, regardless of being in a closed state and/or an open state.

According to an embodiment, the electronic device 101 or 200 may include a display having the structure of FIGS. 2A to 2D. According to an embodiment, the electronic device 101 may include a variety of form factors that enable a display to be expandable in various forms, in addition to the form factors described in the description with reference to FIGS. 2A to 2D. For example, the electronic device 101 may be implemented in various form factors on the basis of a sliding (or rolling) method according to the form factor structure of the electronic device 101 or 200 of FIGS. 2A to 2D. Examples related to this are illustrated in the drawings (e.g., FIGS. 5A to 5G) that will be described below.

Figure 3A:
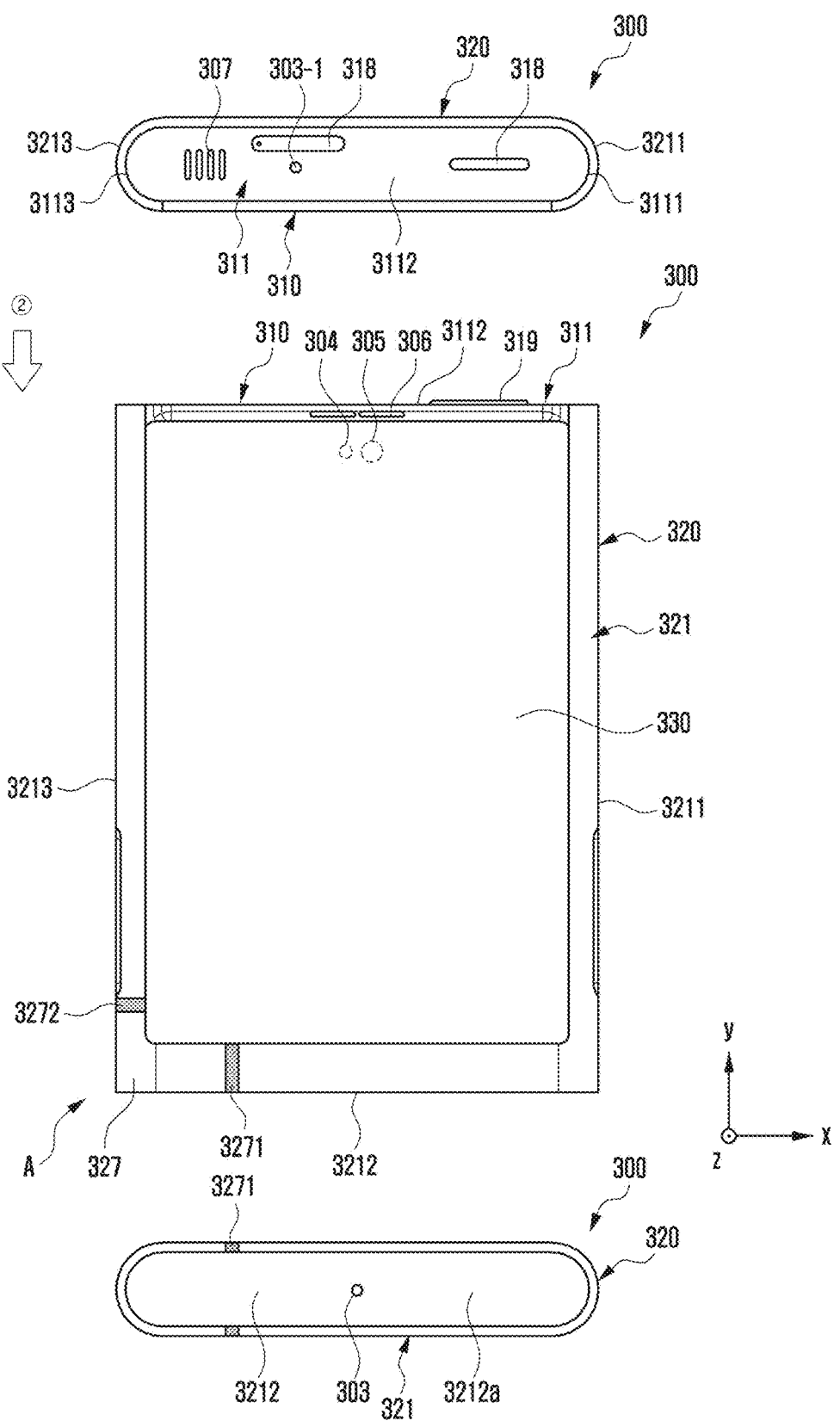
FIGS. 3A and 3B are views illustrating a front and rear view of an electronic device in a closed state of the electronic device having a form factor according to an embodiment.
Figure 3B:
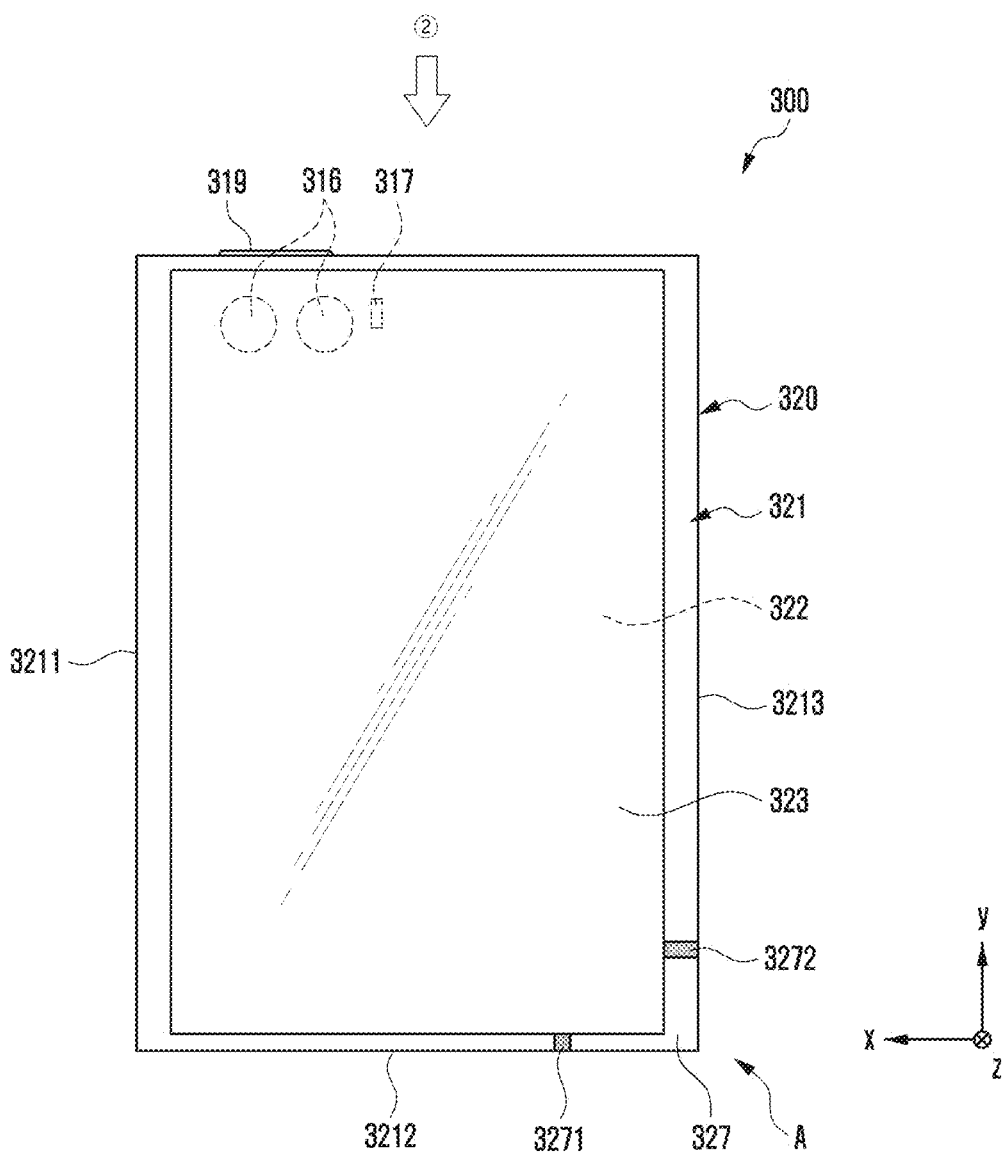
Figure 3C:
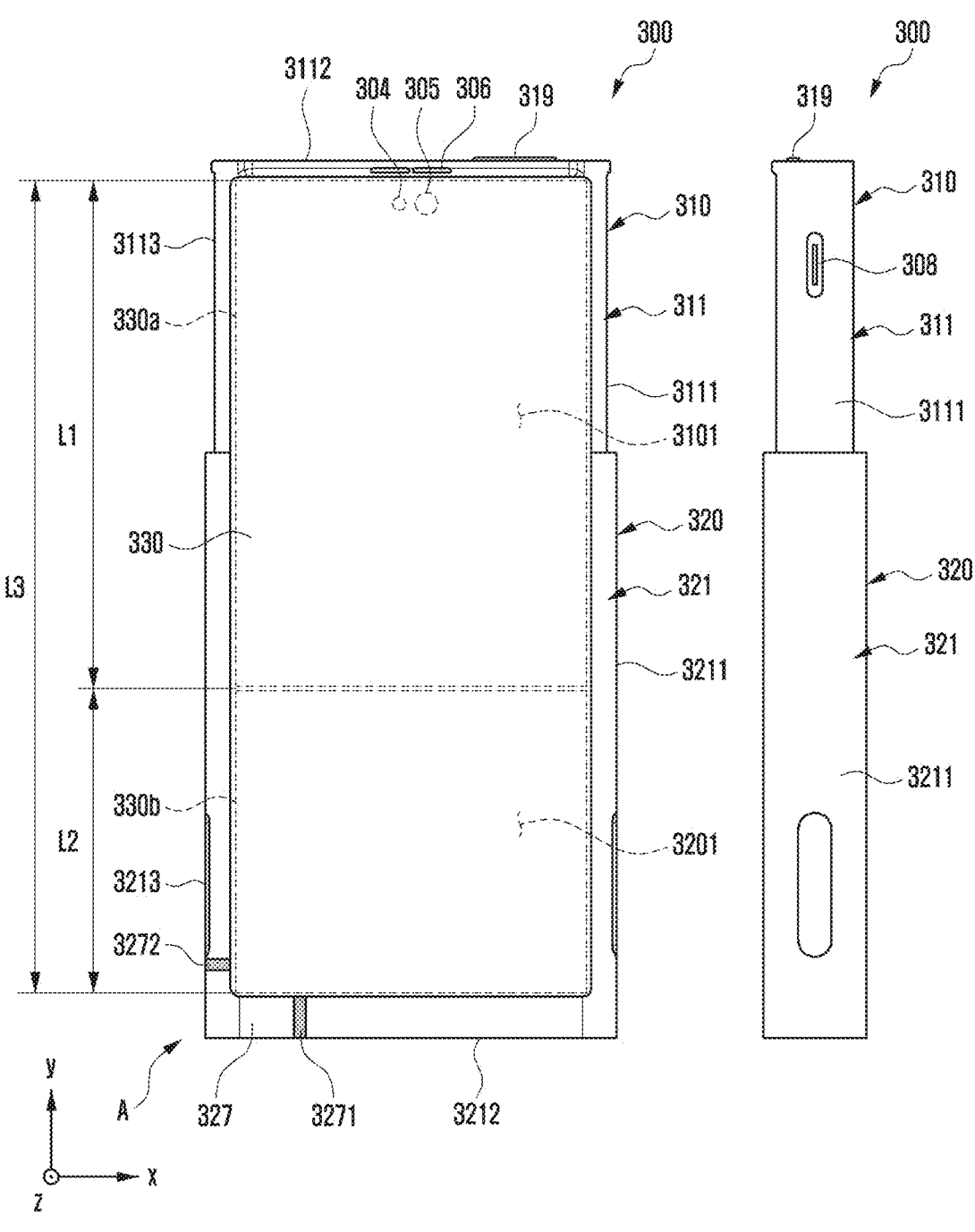
FIGS. 3C and 3D are views illustrating a front and rear view of an electronic device in an open state of the electronic device having a form factor according to an embodiment.
Figure 3D:
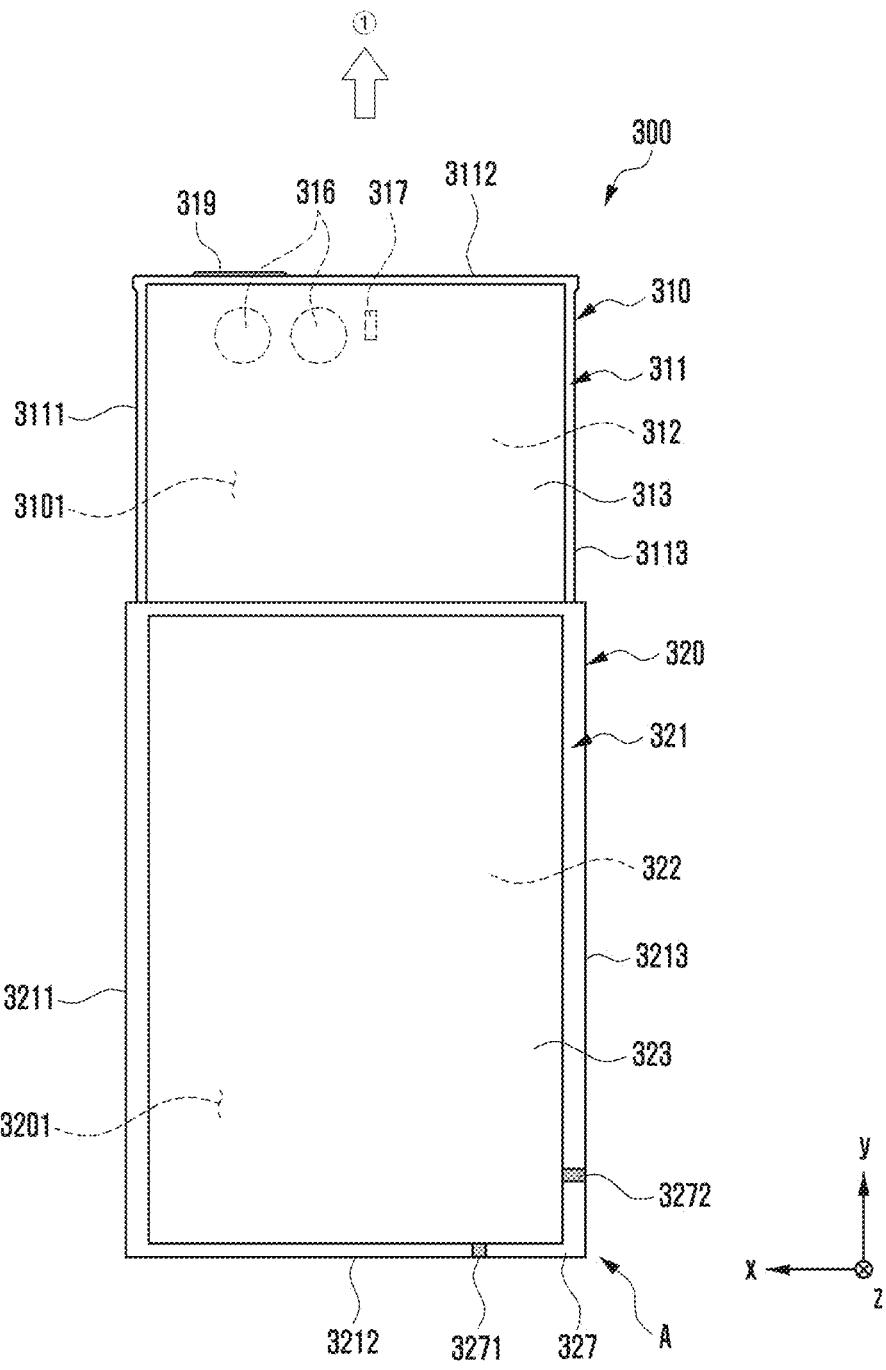

FIGS. 3A and 3B are views illustrating a front and rear view of an electronic device in a closed state of the electronic device having a form factor according to an embodiment. FIGS. 3C and 3D are views illustrating a front and rear view of an electronic device in an open state of the electronic device having a form factor according to an embodiment.

An electronic device 300 in FIGS. 3A to 3D may be at least partially similar to the electronic device 101 in FIG. 1, include the electronic device 101 in FIG. 1, or further include other embodiments of the electronic device 101 in FIG. 1.

With reference to FIGS. 3A to 3D, the electronic device 300 may include a first housing 310 (e.g., a first housing structure, a moving part, or a slide housing), a second housing 320 (e.g., a second housing structure, a fixed part, or a base housing) coupled to the first housing 310 and constituted to be movable (e.g., sliding) in a designated direction (e.g., direction ① or direction ②) (e.g., y-axis direction), and a flexible display 330 (e.g., an expandable display or a stretchable display) disposed to be supported by at least a portion of the first housing 310 and the second housing 320.

According to an embodiment, the electronic device 300 may be disposed such that the first housing 310 is withdrawn (slide-out) in a first direction (direction ①) or retracted (slide-in) in a second direction (direction ②) opposite to the first direction (direction ①) relative to the second housing 320 gripped by a user. According to an embodiment, at least a portion of the first housing 310 that includes a first space 3101 may be received in a second space 3201 of the second housing 320, thereby changing to a closed state (or retracted state).

According to an embodiment, the electronic device 300 may include a bendable member (or a bendable support member) (e.g., a bendable member 340 in FIG. 4) (e.g., an articulated hinge module or a multi-bar assembly) that forms at least partially a same plane as at least a portion of the first housing 310 in an open state (or withdrawn state) and is at least partially received in the second space 3201 of the second housing 320 in a closed state.

According to an embodiment, in a closed state, at least a portion of the flexible display 330 may be disposed to be supported by the bendable member (e.g., the bendable member 340 in FIG. 4) and received in an internal space 3201 of the second housing 320 without being visible from the outside. According to an embodiment, at least a portion of the flexible display 330 may be disposed to be visible from the outside while being supported by the bendable member (e.g., the bendable member 340 in FIG. 4) that forms at least partially a same plane as the first housing 310 in an open state.

According to an embodiment, the electronic device 300 may include a first housing 310 including a first lateral member 311, and a second housing 320 including a second lateral member 321. According to an embodiment, the first lateral member 311 may include a first side surface 3111 having a first length along a first direction (e.g., y-axis direction), a second side surface 3112 extending along a substantially perpendicular direction (e.g., x-axis direction) from the first side surface 3111 and having a second length shorter than the first length, and a third side surface 3113 extending substantially in parallel with the first side surface 3111 from the second side surface 3112 and having the first length.

According to an embodiment, the first lateral member 311 may be at least partially made of a conductive material (e.g., metal). In an embodiment, the first lateral member 311 may be made of a combination of a conductive material and a non-conductive material (e.g., polymer). According to an embodiment, the first housing 310 may include a first support member 312 extending from at least a portion of the first lateral member 311 to at least a portion of the first space 3101. According to an embodiment, the first support member 312 may be formed integrally with the first lateral member 311. In an embodiment, the first support member 312 may be constituted separately from the first lateral member 311 and structurally coupled to the first lateral member 311.

According to an embodiment, the second lateral member 321 may include a fourth side surface 3211 at least partially corresponding to the first side surface 3111 and having a third length, a fifth side surface 3212 extending substantially in parallel with the second side surface 3112 from the fourth side surface 3211 and having a fourth length longer than the third length, and a sixth side surface 3213 extending from the fifth side surface 3212 in correspondence to the third side surface 3113, and having the third length. According to an embodiment, the first lateral member 321 may be at least partially made of a conductive material (e.g., metal). In an embodiment, the second lateral member 321 may be made of a combination of a conductive material and a non-conductive material (e.g., polymer).

According to an embodiment, at least a portion of the second lateral member 321 may include a second support member 322 extending to at least a portion of the second space 3201 of the second housing 320. According to an embodiment, the second support member 322 may be formed integrally with the second lateral member 321. In an embodiment, the second support member 322 may be constituted separately from the second lateral member 321 and structurally coupled to the second lateral member 321.

According to an embodiment, the first side surface 3111 and the fourth side surface 3211 may be slidably coupled to each other. According to an embodiment, the third side surface 3113 and the sixth side surface 3213 may be slidably coupled to each other. According to an embodiment, in a closed state, the first side surface 3111 may overlap the fourth side surface 3211, such that the first side surface 3111 may be disposed to be substantially invisible from the outside. According to an embodiment, in a closed state, the third side surface 3113 may overlap the sixth side surface 3213, such that the third side surface 3113 may be disposed to be substantially invisible from the outside. In an embodiment, in a closed state, at least a portion of the first side surface 3111 and the third side surface 3113 may be disposed to be at least partially visible from the outside.

According to an embodiment, in a closed state, the first support member 312 may overlap the second support member 322, such that the first support member 212 may be disposed to be substantially invisible from the outside. In an embodiment, in a closed state, a portion of the first support member 312 may overlap the second support member 322, such that the portion of the first support member 312 may be disposed to be invisible from the outside, and a remaining portion of the first support member 212 may be disposed to be visible from the outside.

According to an embodiment, the electronic device 300 may include a first rear surface cover 313 coupled to the first housing 310 on a rear surface of the electronic device 200. According to an embodiment, the first rear surface cover 313 may be disposed through at least a portion of the first support member 312. In an embodiment, the first rear surface cover 313 may be formed integrally with the first lateral member 311. According to an embodiment, the first rear surface cover 313 may be made of polymer, coated or colored glass, ceramic, metal (e.g., aluminum, stainless steel (STS), or magnesium), or a combination of at least two of these materials. In an embodiment, the first rear surface cover 313 may extend to at least a portion of the first lateral member 311. In an embodiment, at least a portion of the first support member 312 may be substituted with the first rear surface cover 313.

According to an embodiment, the electronic device 300 may include a second rear surface cover 323 coupled to the second housing 320 on a rear surface of the electronic device 200. According to an embodiment, the second rear surface cover 323 may be disposed through at least a portion of the second support member 322. In an embodiment, the second rear surface cover 323 may be formed integrally with the second lateral member 321. According to an embodiment, the second rear surface cover 323 may be made of polymer, coated or colored glass, ceramic, metal (e.g., aluminum, stainless steel (STS), or magnesium), or a combination of at least two of these materials. In an embodiment, the second rear surface cover 323 may extend to at least a portion of the second lateral member 321. In an embodiment, at least a portion of the second support member 322 may be substituted with the second rear surface cover 323.

According to an embodiment, the electronic device 300 may include the flexible display 330 disposed to be supported by at least a portion of the first housing 310 and the second housing 320. According to an embodiment, the flexible display 330 may include a first portion 330a (e.g., a planar portion) constituted to be visible from the outside, and a second portion 330b (e.g., a bendable portion) extending from the first portion 330a and at least partially received in the second space 3201 of the second housing 320 so as to be at least partially invisible from the outside in a closed state.

Figure 4:
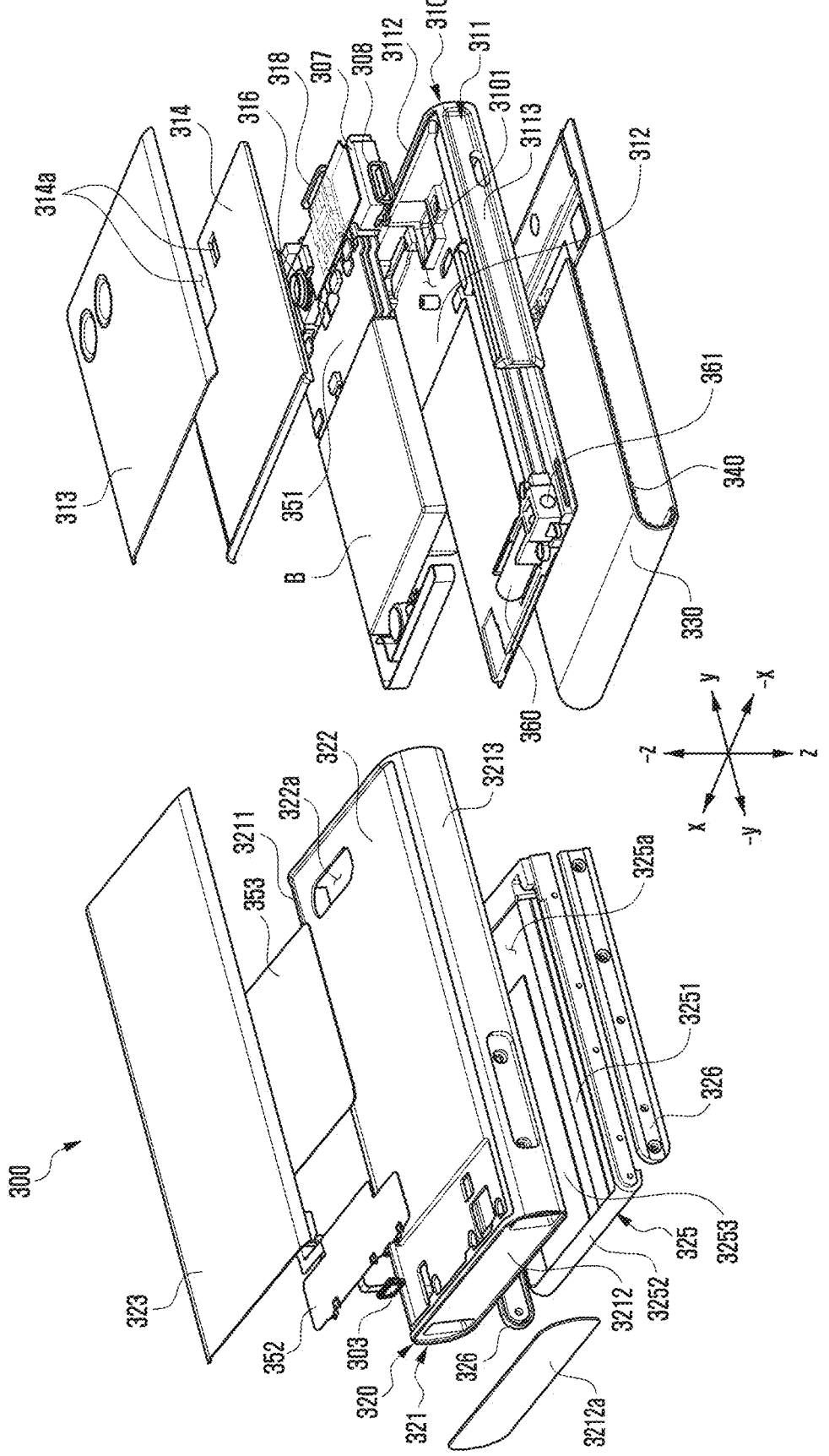
FIG. 4 is a disassembled perspective view of an electronic device having a form factor according to an embodiment.

According to an embodiment, the first portion 330a may be disposed to be supported by the first housing 310, and the second portion 330b may be disposed to be supported at least partially by the bendable member (e.g., the bendable member 340 in FIG. 4). According to an embodiment, in a state in which the first housing 310 is withdrawn along a first direction (direction ①)), the second portion 330b of the flexible display 330 may extend from the first portion 330a while being supported by the bendable member (e.g., the bendable member 340 in FIG. 4), form substantially a same plane as the first portion 330a, and be disposed to be visible from the outside.

According to an embodiment, in a state in which the second housing 320 is retracted along a second direction (direction ②), the second portion 330b of the flexible display 330 may be received in the second space 3201 of the second housing 320 and disposed to be invisible from the outside. Therefore, the electronic device 300 may guide the display area of the flexible display 330 to vary as the first housing 310 moves in a sliding method from the second housing 320 along a designated direction (e.g., y-axis direction).

According to an embodiment, a length of the flexible display 330 in a first direction (direction ①) may vary in response to the sliding movement of the first housing 310 that moves relative to the second housing 320. For example, in a closed state, the flexible display 330 may have a first display area (e.g., an area corresponding to the first portion 330a) corresponding to a first length L1. According to an embodiment, in an open state, the flexible display 330 may be expanded to have a third display area (e.g., an area including the first portion 330a and the second portion 330b) larger than the first display area and corresponding to a third length L3 longer than the first length L1, in response to the sliding movement of the first housing 310 that additionally moves by a second length L2 relative to the second housing 320.

According to an embodiment, the electronic device 300 may include at least one of an input device (e.g., microphone 303-1) disposed in the first space 3101 of the first housing 310, a sound output device (e.g., a receiver 306 for calls or a speaker 307), sensor modules 304 and 317, camera modules (e.g., a first camera module 305 or a second camera module 316), a connector port 308, a key input device 319, or an indicator (not illustrated). According to an embodiment, the electronic device 300 may include another input device (e.g., a microphone 303) disposed on the second housing 320. As an embodiment, the electronic device 300 may be constituted to exclude at least one of the above-mentioned constituent elements or further include other constituent elements. As an embodiment, at least one of the above-mentioned constituent elements may be disposed in the second space 3201 of the second housing 320.

According to an embodiment, the input device may include the microphone 303-1. In an embodiment, the input device (e.g., the microphone 303-1) may include a plurality of microphones disposed to detect a direction of sound. For example, the sound output device may include the receiver 306 for calls and the speaker 307. According to an embodiment, the speaker 307 may correspond to the outside through at least one speaker hole formed in the first housing 310, in a position that is exposed to the outside (e.g., the second side surface 3112), regardless of being in a closed/open (or retracted/withdrawn) state.

According to an embodiment, in an open state, the connector port 308 may correspond to the outside through a connector port hole formed in the first housing 310. In an embodiment, in a closed state, the connector port 308 may correspond to the outside through an opening formed in the second housing 320 and corresponding to the connector port hole. In an embodiment, the receiver 306 for calls may include a speaker (e.g., a piezoelectric speaker) operating without a separate speaker hole.

According to an embodiment, the sensor modules 304 and 317 may generate electrical signals or data values corresponding to an internal operating state of the electronic device 300 or an external environment state. For example, the sensor module 304 and 317 may include a first sensor module 304 (e.g., a proximity sensor or an illuminance sensor) disposed on a front surface of the electronic device 300, and/or a second sensor module 317 (e.g., a heart rate monitoring (HRM) sensor) disposed on a rear surface of the electronic device 300. According to an embodiment, the first sensor module 304 may be disposed on the front surface of the electronic device 300 and provided below the flexible display 330.

According to an embodiment, the first sensor module 304 and/or the second sensor module 317 may include at least one of a proximity sensor, an illuminance sensor, a TOF (time of flight) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, or a humidity sensor.

According to an embodiment, the camera modules may include a first camera module 305 disposed on the front surface of the electronic device 300, and a second camera module 316 disposed on the rear surface of the electronic device 300. According to an embodiment, the electronic device 300 may include a flash (not illustrated) positioned in the vicinity of the second camera module 316. According to an embodiment, the camera modules 305 and 316 may each include one or a plurality of lens, an image sensor, and/or an image signal processor. According to an embodiment, the first camera module 305 may be disposed below the flexible display 330 and constituted to capture an image of a subject through a portion of an activation area (e.g., an display area) of the flexible display 330.

According to an embodiment, the first camera module 305 among the camera modules and some sensor modules 304 among the sensor module 304 and 317 may be disposed to detect an external environment through the flexible display 330. For example, the first camera module 305 or some sensor modules 304 may be disposed in the first space 3201 of the first housing 310 and constituted to be in contact with an external environment through a transmissive area formed in the flexible display 330 or an opening formed through the flexible display 330. According to an embodiment, an area of the flexible display 330, which faces the first camera module 305, is a portion of the display area for displaying content and may be formed to be a transmissive area having a designated transmittance rate.

According to an embodiment, the transmissive area may be formed to have a transmittance in the range of about 5% to about 20%. The transmissive area may include an area that overlaps an effective area (e.g., a view angle area) of the first camera module 305 through which light, which enters an image sensor to create an image, passes. For example, the transmissive area of the flexible display 330 may include an area having a lower pixel arrangement density and/or wiring density than the periphery thereof. For example, the transmissive area may be substituted with the above-mentioned opening. For example, some camera modules 305 may include a under display camera (UDC). In an embodiment, some sensor modules 304 may be disposed in an interior space of the electronic device 300 and perform the function thereof without being visually exposed through the flexible display 330.

According to an embodiment, the electronic device 300 may include at least one antenna (e.g., the antenna 197 in FIG. 1) electrically connected to a wireless communication circuit (e.g., the wireless communication module 192 in FIG. 1) disposed in the second housing 310. According to an embodiment, the electronic device 300 may include a bezel antenna A disposed through the conductive second lateral member 321 of the second housing 310. For example, the bezel antenna A may include a conductive portion 327 disposed on at least a part of the fifth side surface 3212 and at least a portion of the sixth side surface 3213 of the second lateral member 321 and electrically segmented by one or more segmenting portions 3271 and 3272 made of a non-conductive material (e.g., polymer).

According to an embodiment, a wireless communication circuit (e.g., the wireless communication module 192 in FIG. 1) may be configured to transmit or receive a wireless signal in at least one designated frequency band (e.g., about 800M Hz to 6000 MHz) (e.g., a legacy band) through the conductive portion 327. According to an embodiment, the electronic device 300 may include a side surface cover 3212a disposed on the fifth side surface 3212 to cover at least a portion of the at least one segmenting portion 3271.

In an embodiment, the bezel antenna A may also be disposed on at least one of the second side surface 3112, the fourth side surface 3211, the fifth side surface 3212, or the sixth side surface 3213. In an embodiment, the electronic device 300 may further include at least one antenna module (e.g., a 5G antenna module or an antenna structure) disposed in an interior space (e.g., the first space 3101 or the second space 3201) and constituted to transmit or receive a wireless signal in a frequency band within a range of about 3G Hz to 100 GHz through another wireless communication circuit (e.g., the wireless communication module 192 in FIG. 1).

According to an embodiment, a retraction/withdrawal operation of the electronic device 300 may be automatically performed For example, a retraction/withdrawal operation of the electronic device 300 may be performed by a drive motor (e.g., a drive motor 360 in FIG. 4) including a pinion gear 361 disposed in the first space 3101 of the first housing 310 and by a gearing operation of a rack gear (e.g., a rack gear 3251 in FIG. 4) disposed in the second space 3201 of the second housing 320 and constituted to engage with the pinion gear 361. For example, a processor of the electronic device 300 (e.g., the processor 120 in FIG. 1) may operate a drive motor (e.g., the drive motor 360 in FIG. 4) disposed inside the electronic device 300 when a triggering operation is detected to change from a closed state to an open state, or to change from an open state to a closed state. According to an embodiment, the triggering operation may include select-ing (e.g., touching) an object displayed on the flexible display 330 or manipulation of a physical button (e.g., a key button) included in the electronic device 300.

FIG. 4 is a disassembled perspective view of an electronic device having a form factor according to an embodiment.

To describe the electronic device 300 in FIG. 4, the constituent elements, which are substantially the same as the constituent elements of the electronic device 300 in FIGS. 3A to 3D, will be designated by the same reference numer-als, and a detailed description thereof will be omitted.

With reference to FIG. 4, the electronic device 300 may include the first housing 310 including the first space 3101, the second housing 320 slidably coupled to the first housing 310 and including a second space (e.g., the second space 3201 in FIG. 3C), the bendable member 340 disposed in the second space 3201 and constituted to be at least partially rotatable, the flexible display 330 disposed to be supported by at least a portion of the bendable member 340 and the first housing 310, and a drive module constituted to drive the first housing 310 in a direction (e.g., −y-axis direction) in which the first housing 310 is retracted into the second housing 320 and/or a direction (e.g., y-axis direction) in which the first housing 310 is withdrawn from the second housing 320.

According to an embodiment, the drive module may include the drive motor 360 disposed in the first space 3101 and including the pinion gear 361, and a rack gear 3251 disposed in the second space 3201 and constituted to engage with the pinion gear 361. According to an embodiment, the drive module may further include a speed reduction module coupled to the drive motor 360 and thus disposed to reduce a rotational speed and increase a driving force. According to an embodiment, the drive motor 360 may be disposed to be supported by at least a portion of the first support member 312, in the first space 3101 of the first housing 310. According to an embodiment, the drive motor 360 may be fixed to an end (e.g., edge) of the first support member 312, in the first space 3101, in a direction of being retracted (e.g., −y-axis direction).

According to an embodiment, the electronic device 300 may include a plurality of electronic components disposed in the first space 3101. According to an embodiment, the plurality of electronic components may include a first sub-strate 351 (e.g., a main substrate), the camera module 316 disposed at the periphery of the first substrate 351, a socket module 318 (e.g., a SIM tray), the speaker 307, the connec-tor port 308, and a battery B. According to an embodiment, the plurality of electronic components, together with the drive motor 360, are disposed, in the first space 3101 of the first housing 310, at the periphery of the first substrate 351, thereby enabling efficient electrical connection.

According to an embodiment, the electronic device 300 may include a rear bracket 314 disposed to cover at least some of the plurality of electronic components between the first rear surface cover 313 and the first support member 312 of the first housing 310. According to an embodiment, the bracket 314 may be structurally coupled to at least a portion of the first support member 312. In an embodiment, the rear bracket 314 may be omitted. According to an embodiment, the rear bracket 314 may be disposed to cover the plurality of electronic components and support the first rear surface cover 313. According to an embodiment, the rear bracket 314 may include a notch area 314a or an opening 314a (e.g., a through-hole) formed in an area corresponding to the camera module 316 and/or a sensor module (e.g., the sensor module 317 in FIG. 3B).

According to an embodiment, the camera module 316 and/or the sensor module 317 may be disposed to detect an external environment through the notch area 314a or the opening 314a. According to an embodiment, at least an area of the first rear surface cover 313, which corresponds to the camera module 316 and/or the sensor module 317, may be treated to be transparent. In an embodiment, the camera module 316 and/or the sensor module 317 may be consti-tuted to operate only in case that the electronic device 300 is in an open state.

According to an embodiment, the electronic device 300 may include a plate type of support bracket 325 (e.g., a DSB or a display support bar) disposed in the second space 3201 of the second housing 320 and slidably coupled to at least a portion of the first support member 312. According to an embodiment, the support bracket 325 may include an open-ing 325a having a designated size. According to an embodi-ment, the support bracket 325 may include a support portion 3252 disposed at one end and having an outer surface formed in a curved shape to support a rear surface of the bendable member 340 that is bent during a sliding motion. According to an embodiment, the support bracket 325 may include a support plate 3253 extending from at least a portion of the support portion 3252 to at least a portion of the opening 325a to be formed to support the rear surface of the bendable member 340 in an open state.

According to an embodiment, the support bracket 325 may include the rack gear 3251 constituted to traverse the opening 325a and fixed to have a length along a direction parallel to a sliding direction. In an embodiment, the rack gear 3251 may be formed integrally with the support bracket 325. According to an embodiment, the electronic device 300 may include a pair of guide rails 326 disposed on two opposite surfaces of the support bracket 325 to guide two opposite ends of the bendable member 340 in a sliding direction.

According to an embodiment, the second housing 320 may include an opening 322a (e.g., a through-hole) disposed in an area corresponding to the camera module 316 and/or the sensor module 317 disposed in the first housing 310 when the electronic device 300 is in a closed state, in the second support member 322. According to an embodiment, the camera module 316 and/or the sensor module 317 may detect an external environment through the opening 322a formed in the second housing 320 when the electronic device 300 is in a closed state. In this case, at least an area of the second rear surface cover 323, which corresponds to the camera module 316 and/or the sensor module 317, may be treated to be transparent.

According to an embodiment, the electronic device 300 may include a second substrate 352 and an antenna member 353 disposed in a space between the second rear surface cover 323 and the second support member 322 of the second housing 320. According to an embodiment, the second substrate 352 and the antenna member 353 may be electrically connected to the first substrate 351 through at least one electrical connection member (e.g., a flexible printed circuit board (FPCB) or a flexible RF cable (FRC)). In an embodiment, as the antenna member 353 is electrically connected to the second substrate 352, the antenna member 253 may be electrically connected to the first substrate 351 through the second substrate 352.

According to an embodiment, the electronic device 101 or 300 may include a display having the structure of FIGS. 3A to 3D. According to an embodiment, the electronic device 101 may include a variety of form factors that enable a display to be expandable in various forms, in addition to the form factors described in the description with reference to FIGS. 3A to 3D. For example, the electronic device 101 may be implemented in various form factors on the basis of a sliding (or rolling) method according to the form factor structure of the electronic device 101 or 300 of FIGS. 3A to 3D. Examples related to this are illustrated in the drawings (e.g., FIGS. 5A to 5G) that will be described below.

FIG. 5A, FIG. 5B, FIG. 5C, FIG. 5D, FIG. 5E, FIG. 5F, and FIG. 5G are views illustrating various examples of structures of an expandable display of an electronic device, according to an embodiment.

With reference to FIGS. 5A to 5G, an electronic device (e.g., the electronic device 101 in FIG. 1) according to an embodiment of the present disclosure may include a housing structure in which a display may be expandable in at least one direction of up, down, left, or right. For example, FIGS. 5A through 5G may illustrate examples of various form factors of an electronic device including a display having a variable display area, according to an embodiment.

Figure 5A:
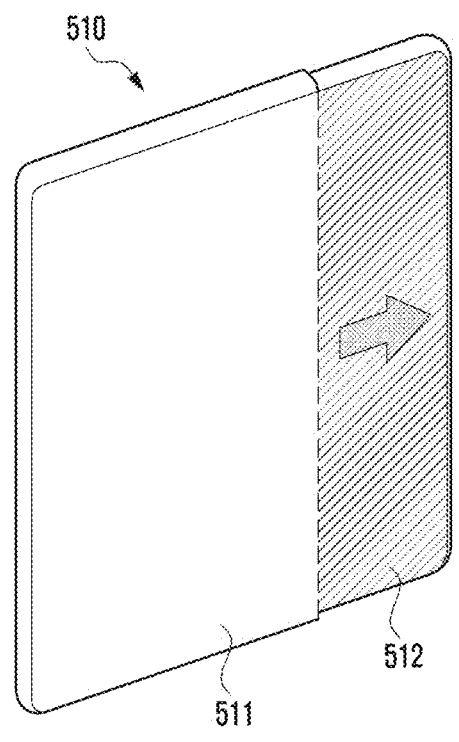
FIG. 5A, FIG. 5B, FIG. 5C, FIG. 5D, FIG. 5E, FIG. 5F, and FIG. 5G are views illustrating various examples of structures of an expandable display of an electronic device, according to an embodiment.
Figure 5A:
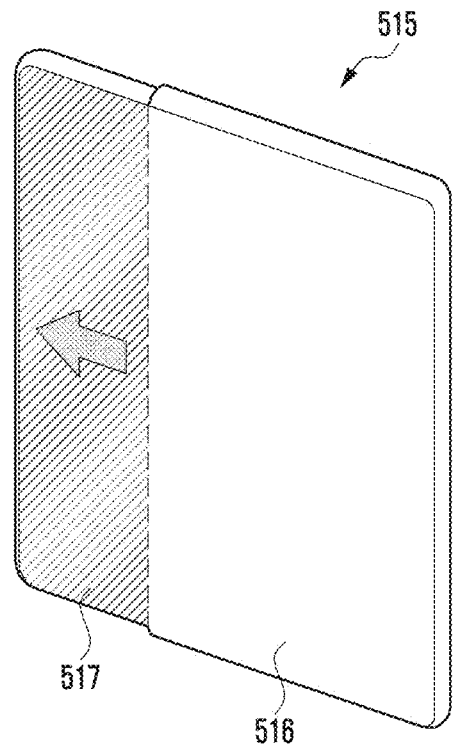

As illustrated in FIG. 5A, the electronic device may be implemented to enable a sliding motion in one direction. For example, the electronic device may include a display 510 that is expandable in a first direction (e.g., a rightward direction). For example, in the first state (e.g., a closed state or a contracted state) in which the display 510 is not expanded, a screen may be displayed through the first display area 511, and the second display area 512 may be received in a housing and thus be in an inactive state.

According to an embodiment, the electronic device may be switched from a first state to a second state (e.g., an open state or an expanded state) by a user's manipulation or a pre-configured input.

According to an embodiment, when the electronic device is switched from the first state to the second state, the second display area 512 may be withdrawn in a first direction and exposed to the outside. The electronic device may, in a second state in which the display 510 is expanded, switch the second display area 512 to an active state and display a screen through the first display area 511 and the second display area 512. According to an embodiment, when the electronic device is switched from the first state to the second state, at least a portion of the display 510 received in the first housing (e.g., corresponding to a partial area to the left of the first display area 511 in the drawing illustrated) may be withdrawn when a second housing slides in one direction (e.g., the first direction) relative to a first housing, and thus a display area of the display 510 may be expanded. When the electronic device is switched from the second state to the first state, and the second housing slides in a second direction relative to the first housing, a portion of the display 510 (e.g., corresponding to a partial area to the left of the first display area 511 in the drawing illustrated) may be retracted into the first housing, and thus the display area of the display 510 may be contracted. According to an embodiment, in case of the electronic device, for example, the display area (e.g., the first display area 511) of the display 510 has a ratio of 4:3 in the first state (e.g., a closed state), and for example, the display area (e.g., the first display area 511 and the second display area 512) of the display 510 is expanded to a ratio of 21:9 in the second state (e.g., an open state).

According to an embodiment, the electronic device may include a first display area 516 for displaying a screen in the first state (e.g., a closed state) where the display 515 is not expanded, and a second display area 517 which is expandable in the second direction (e.g., a leftward direction) and displays a screen in the second state (e.g., an open state) in which the display 515 is expanded.

Figure 5B:
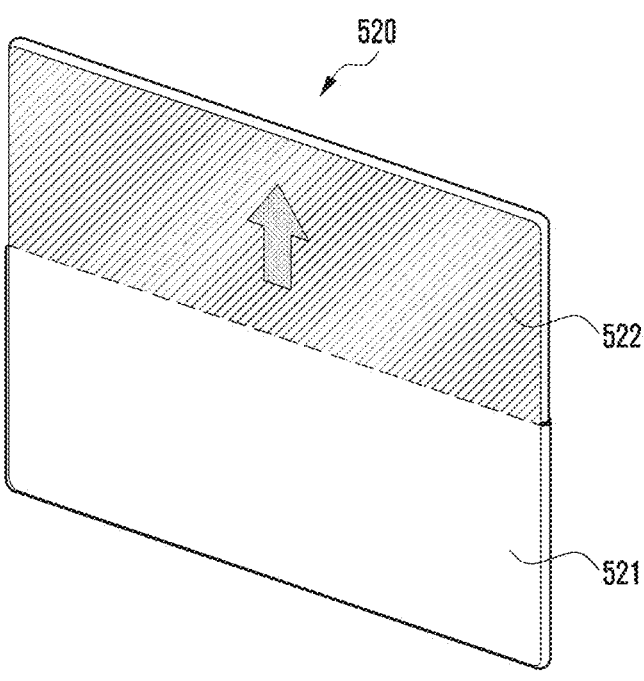
Figure 5B:
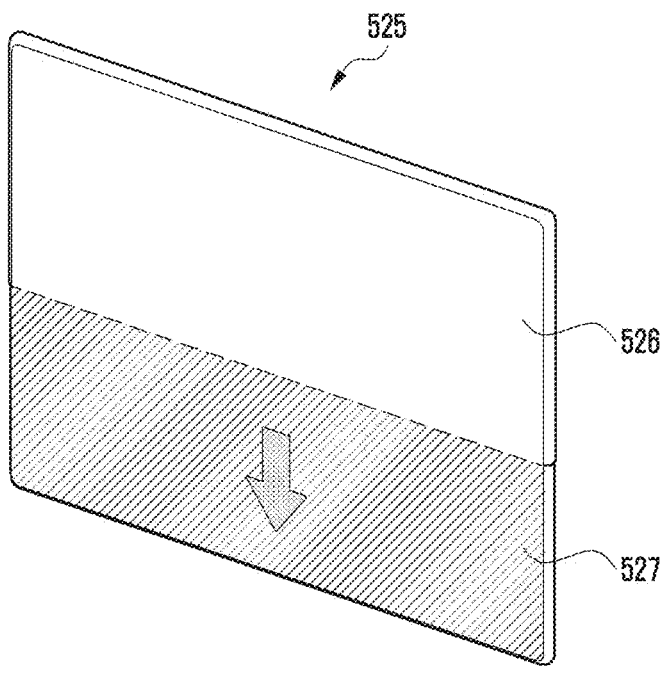

With reference to FIG. 5B, the electronic device may include a display that is expandable in a third direction (e.g., an upward direction) or a fifth direction (e.g., a downward direction).

According to an embodiment, the electronic device may include a first display area 521 that displays a screen in the first state where the display 520 is not expanded, and a second display area 522 which is expandable in a third direction and displays a screen in the second state of being expanded. According to an embodiment, the electronic device may include a first display area 526 that displays a screen in the first state where the display 525 is not expanded, and a second display area 527 which is expandable in a fourth direction and displays a screen in the second state of being expanded.

Figure 5C:
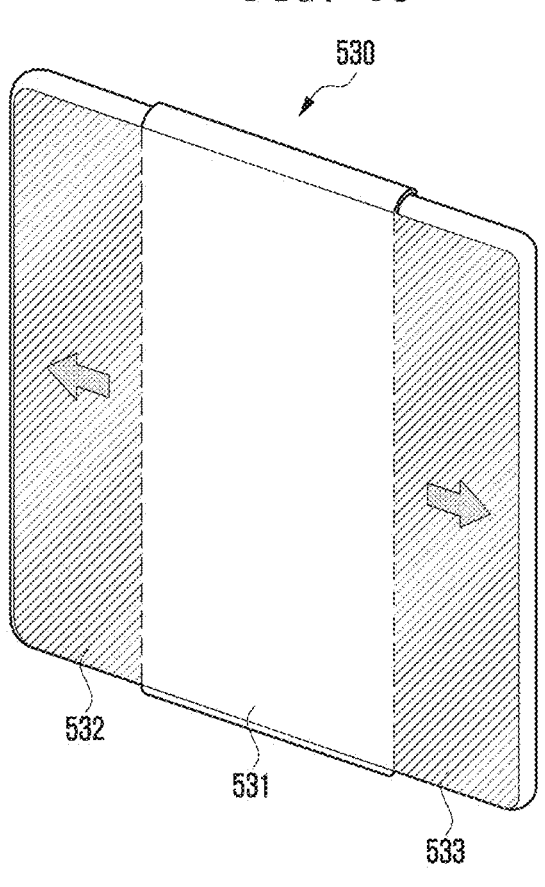
Figure 5C:
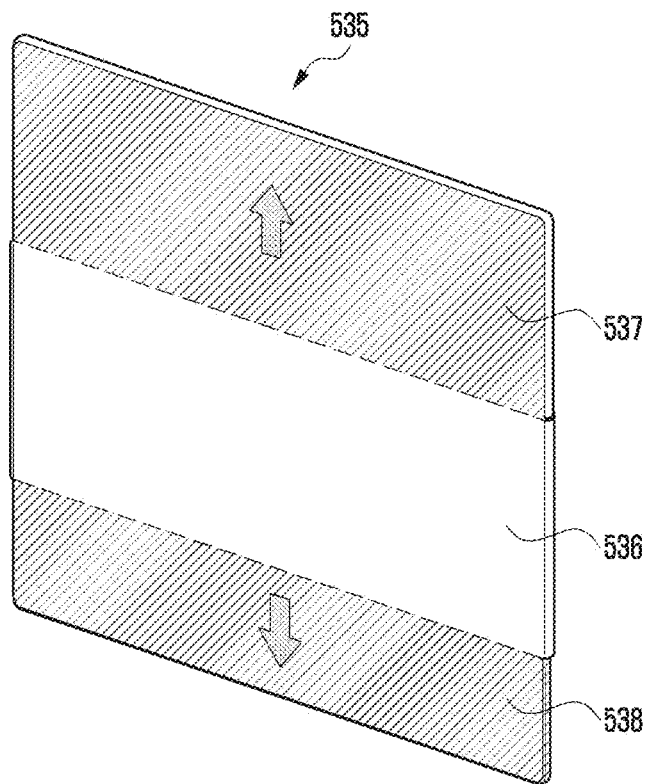

With reference to FIG. 5C, the electronic device may include a display that is expandable in both leftward and rightward directions or both upward and downward directions.

According to an embodiment, the electronic device may include a first display area 531 that displays a screen in the first state where the display 530 is not expanded, a second display area 532 which is expandable in a first direction and displays a screen in the second state of being expanded, and a third display area 533 which is expandable in a second direction and displays a screen in the second state of being expanded. In this case, at least one of the second display area 532 or the third display area 533 may be expanded according to a user's manipulation, a pre-configured input, or a type of output content.

According to an embodiment, the electronic device having the housing structure illustrated in FIG. 5C may be implemented to enable a sliding motion in both directions. For example, in the electronic device, a display area (e.g., the first display area 531) of the display 530 may have a ratio of 21:9 in the first state (e.g., a closed state), and for example, a display area (e.g., the first display area 531, the second display area 532, and the third display area 533) of the display 530 may be expanded to a ratio of 4:3 in the second state (e.g., an open state). When a second housing and a third housing slide relative to a first housing in both directions, for example, in a first direction (e.g., a leftward direction) and a second direction (e.g., a rightward direction), respectively, upon the electronic device being switched from the first state to the second state, a portion of the display 530 received in the first housing (e.g., the second display area 532) may be withdrawn in the first direction, and another portion of the display 530 (e.g., the third display area 533) may be withdrawn in the second direction, respectively, and thus a display area of the display 530 may be expanded. Although not illustrated in the drawings, in the electronic device, only a portion of the display 530 may be expanded in the first direction (e.g., the first display area 531 and the second display area 532), or only another portion of the display 530 may be expanded in the second direction (e.g., the first display area 531 and the third display area 533).

According to an embodiment, the electronic device may include a first display area 536 that displays a screen in the first state where the display 535 is not expanded, a second display area 537 which is expandable in a third direction and displays a screen in the second state of being expanded, and a third display area 538 which is expandable in a fourth direction and displays a screen in the second state of being expanded.

According to an embodiment, the electronic device may include a display that is expandable in both upward (or downward) directions and rightward (or leftward) directions.

Figure 5D:
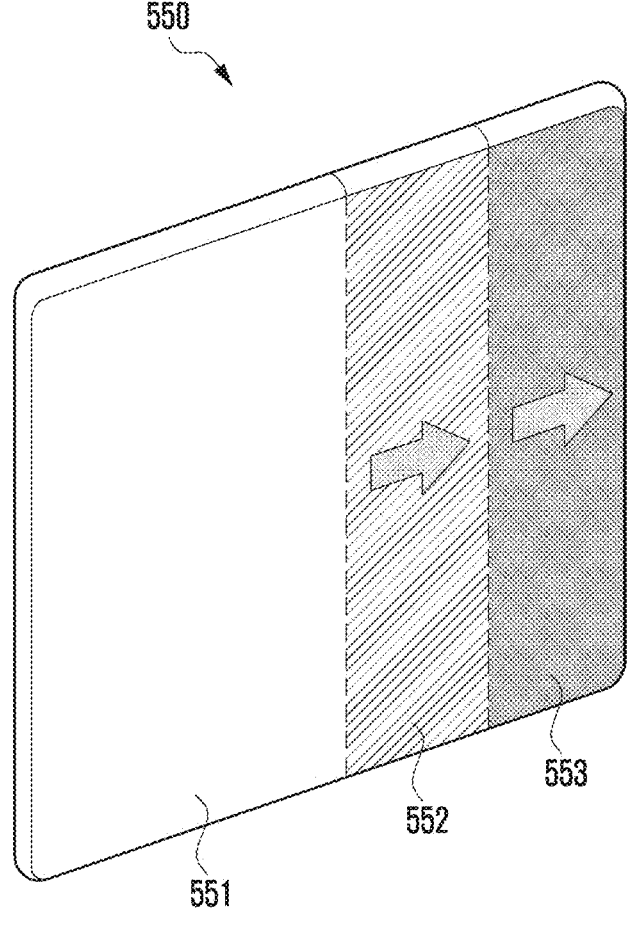

As illustrated in FIG. 5D, the electronic device may include a display that is capable of being expanded in a stepwise manner, and the display may only be partially expanded.

According to an embodiment, the electronic device may include a first display area 551 that displays a screen in the first state in which the display 550 is not expanded, a second display area 552 that is expandable in a first direction (e.g., a rightward direction) and displays a screen in a second state in which the display 550 is expanded, and a third display area 553 that is further expandable in a first direction (e.g., a rightward direction) and displays a screen in a third state of being further expanded.

According to an embodiment, the electronic device may only activate the second display area 552 of the display 550 to display a screen. According to an embodiment, the electronic device may activate both the second display area 552 and the third display area 553 of the display 550 to display a screen. For example, the display 550 may be fixed through a support structure when being expanded to the second display area 552, and may be expanded from the second display area 552 to the third display area 553 in response to an additional force.

Figure 5E:
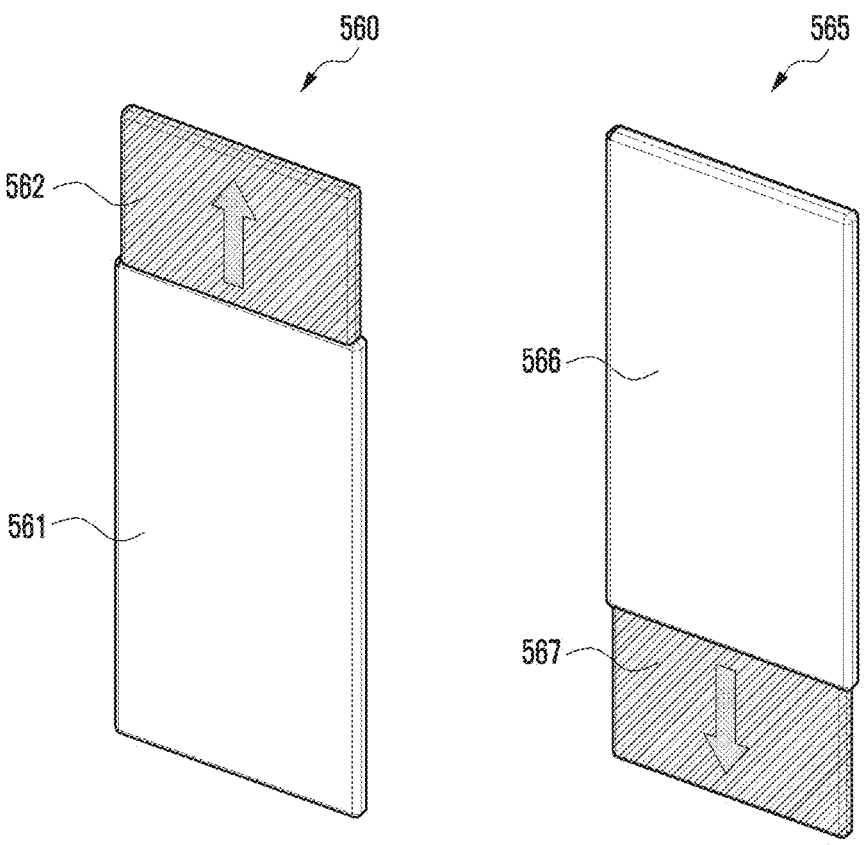

With reference to FIG. 5E, the electronic device may include a display that is expandable in a third direction (e.g., an upward direction) or a fourth direction (e.g., a downward direction). According to an embodiment, the electronic device illustrated in FIG. 5E may include a bar type of form factor in a closed state.

According to an embodiment, the electronic device may include a first display area 561 that displays a screen in the first state where the display 560 is not expanded, and a second display area 562 which is expandable in a third direction and displays a screen in the second state of being expanded. According to an embodiment, the electronic device may include a first display area 566 that displays a screen in the first state where the display 565 is not expanded, and a second display area 567 which is expandable in a fourth direction and displays a screen in the second state of being expanded.

Figure 5F:
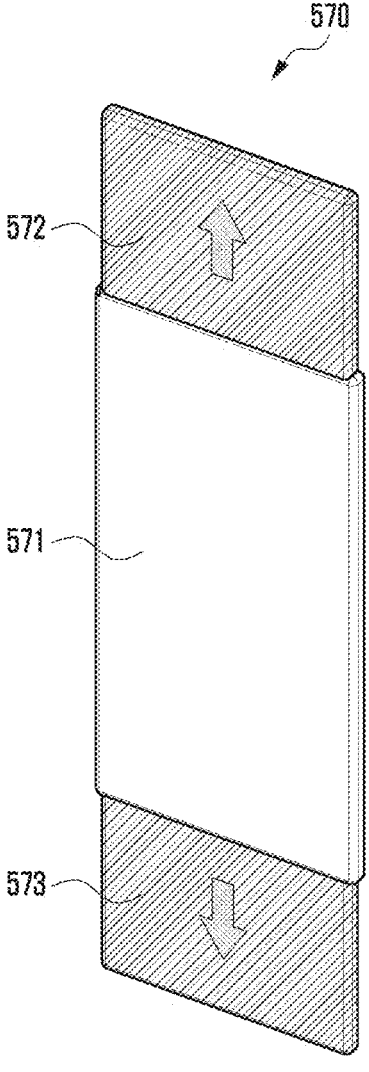

With reference to FIG. 5F, the electronic device may include a display that is expandable in both upward and downward directions. According to an embodiment, the electronic device illustrated in FIG. 5F may include a bar type of form factor in a closed state.

According to an embodiment, the electronic device may include a first display area 571 that displays a screen in the first state where the display 570 is not expanded, a second display area 572 which is expandable in a third direction and displays a screen in the second state of being expanded, and a third display area 573 which is expandable in a fourth direction and displays a screen in the second state of being expanded. In this case, at least one of the second display area 532 or the third display area 533 may be expanded according to a user's manipulation, a pre-configured input, or a type of output content.

The electronic device 101 in various embodiments described below may include a display having a structure of at least one of FIGS. 2A to 5F. According to an embodiment, in addition to the form factors described in FIGS. 2A to 5F, various form factors may be included to enable a display to be expandable in various forms.

According to an embodiment, in addition to the form factors of the electronic device 101 of FIGS. 5A to 5F, the electronic device 101 may be implemented in various form factors based on various sliding motions of a display. An example related to this is illustrated in FIG. 5G.

Figure 5G:
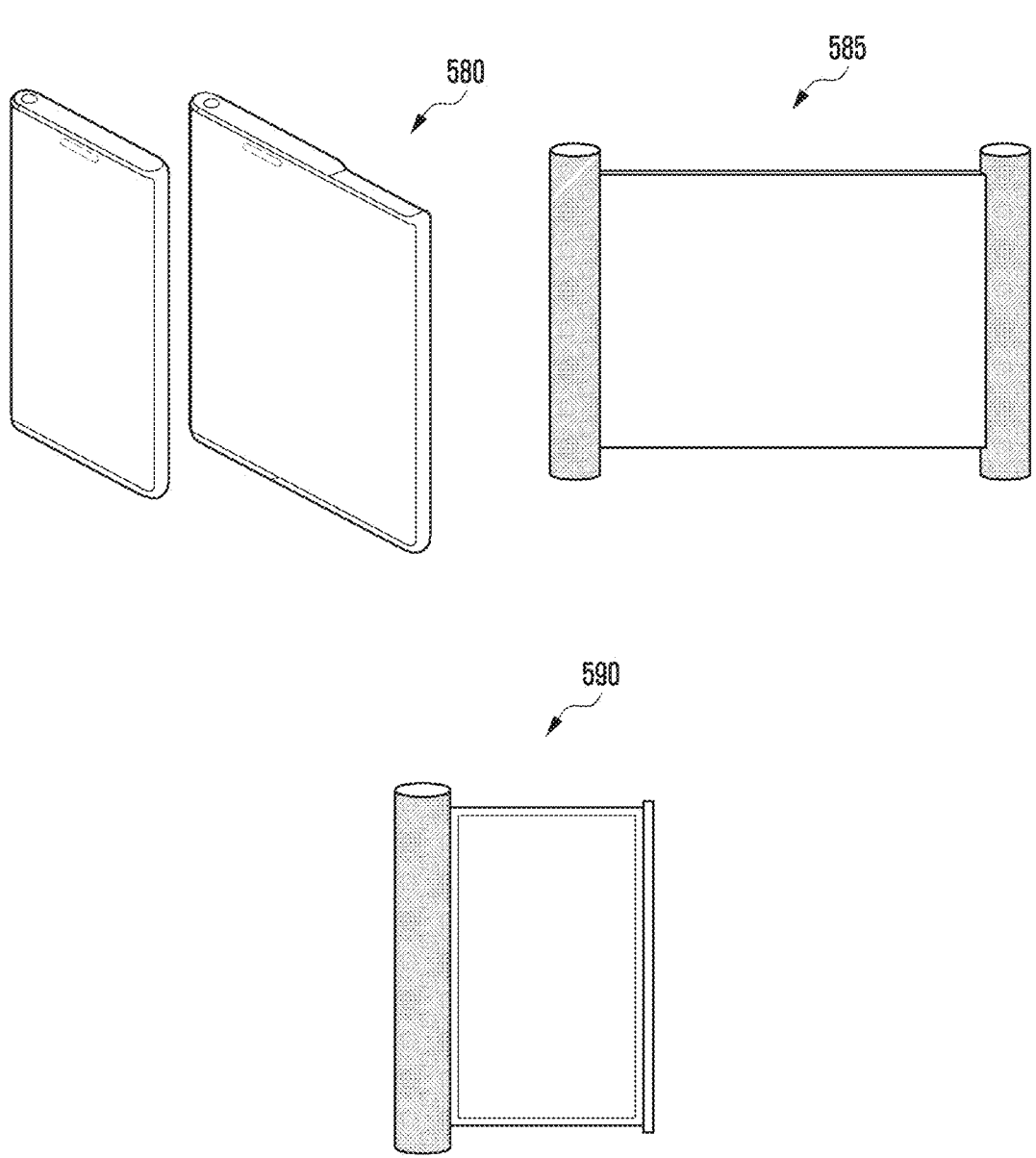

For example, as illustrated in FIG. 5G, the electronic device may include a variety of form factors, such as rollable (or slidable) devices 580, 585, and 590 that enable an area of a display to be expanded in a rolling method and/or a sliding method. According to an embodiment, as illustrated in FIG. 5G, the electronic device may be implemented in various forms, and a display may be provided in various methods depending on the implemented form of the electronic device.

According to an embodiment, the electronic device (e.g., 580, 585, or 590) may include a display (e.g., a rollable display) in a housing in a roll-up method. According to an embodiment, the electronic device may mean an electronic device in which a display is capable of being bent and deformed so that at least a portion of the display may be wound or rolled, and received in a housing (not illustrated). The electronic device may enable a display to be unfolded or may expose a larger area of the display to the outside, depending on a user's needs, so that a screen display area may be expanded for use. For example, in the electronic device 101, an area of the display exposed to the outside may vary depending on the extent to which a user unfolds the display.

According to an embodiment, the electronic device 101 includes a housing structure for protecting a circularly rolled display, and may operate in a structure such that the display is open (e.g., expanded) inside the housing. For example, as illustrated in FIG. 5G, at least a portion of the display may be received in a cylindrical housing or a flat housing.

According to an embodiment, the electronic device 101 may be manually switched by a user in a change in a state of the display (e.g., an open state, an intermediated state, or a closed state), or automatically switched through a drive mechanism (e.g., a drive motor, a speed reduction gear module, and/or a gear assembly) disposed inside the housing. According to an embodiment, in the drive mechanism, an operation may be triggered on the basis of a user input. According to an embodiment, the user input for triggering the operation of the drive mechanism may include a touch input, a force touch input, and/or a gesture input through the display module 160. For example, when a signal is generated from various sensors such as a pressure sensor, the electronic device 101 may be switched from a closed state to an open state or from an open state to a closed state. For example, a sensor may detect a squeeze gesture when a part of a user's hand (e.g., palm or finger) presses a designated section of the electronic device 101 when the user carries or grips the electronic device 101, and the electronic device 101 may be switched from a closed state to an open state or from an open state to a closed state in response to the squeeze gesture. In an embodiment, the user input for triggering an operation of the drive mechanism may include a voice input, or input from a physical button visibly exposed to an exterior of a housing.

As illustrated above, according to various embodiments, the electronic device 101 may be implemented as a device capable of changing a display area of a display in various rolling (or sliding) methods.

Figure 6:
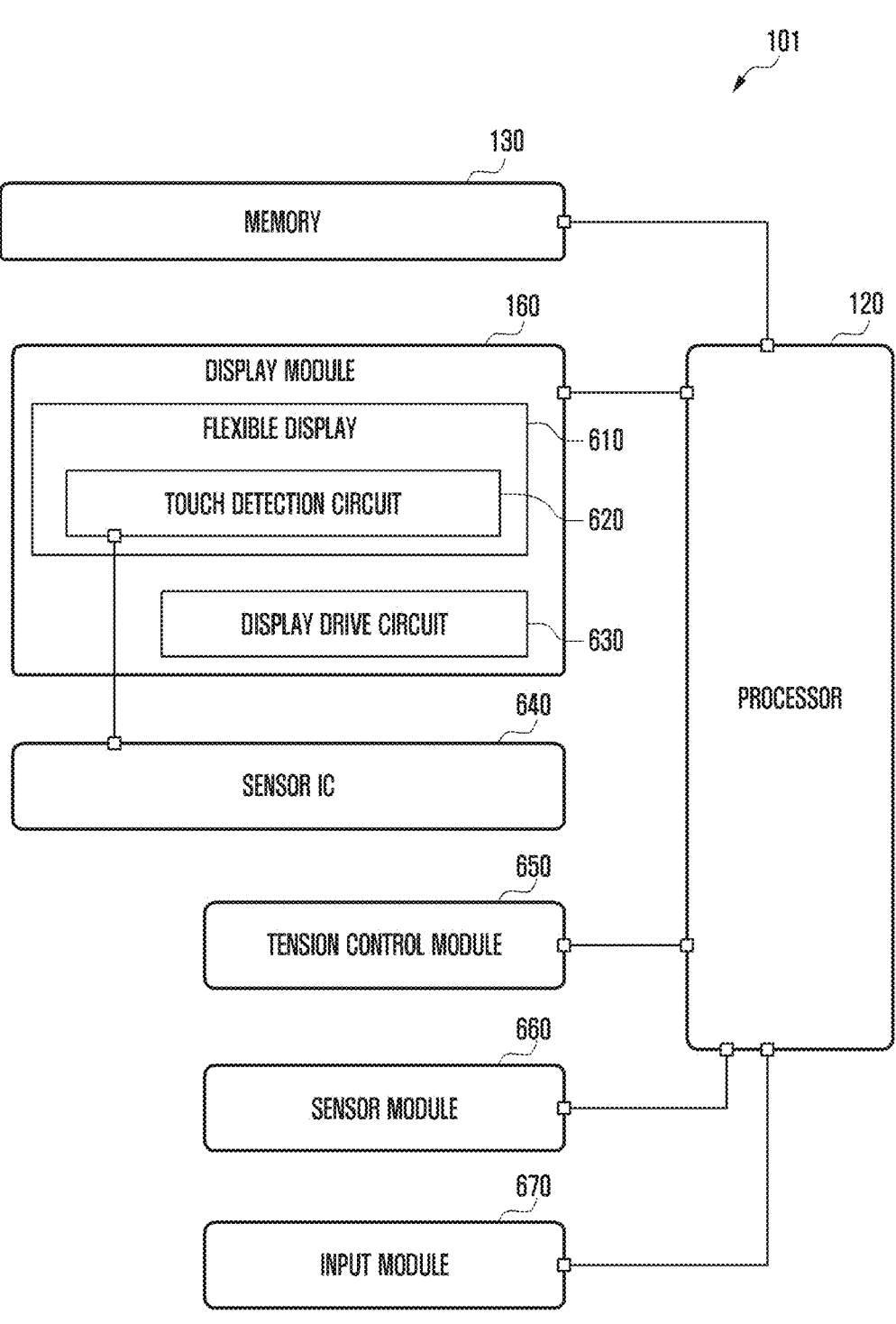
FIG. 6 is a view schematically illustrating a constitution of an electronic device according to an embodiment of the present disclosure.

FIG. 6 is a view schematically illustrating a constitution of an electronic device according to an embodiment of the present disclosure.

With reference to FIG. 6, in an embodiment, the electronic device 101 (e.g., the electronic devices 200 and 300) may include a processor 120 (e.g., the processor 120 in FIG. 1), a memory 130 (e.g., the memory 130 in FIG. 1), a display module 160 (e.g., the display module 160 in FIG. 1), a sensor integrated circuit (IC) 640, a tension control module 650, a sensor module 660 (e.g., the sensor module 176 in FIG. 1), and/or an input module 670 (e.g., the input module 150 in FIG. 1). According to an embodiment, the electronic device 101 may be the electronic device in FIG. 1, may be implemented by including at least some of the constituent elements of the electronic device in FIG. 1, or further including other constituent elements.

According to an embodiment, the electronic device 101 may include a first housing 210 or 410, and a second housing 220 or 420 that is coupled to the first housing 210 or 410 in a first state of the electronic device 101 (e.g., a closed state) and slides in a designated direction from the first housing 210 or 410 in the first state to support a second state in which a display of the electronic device 101 is at least partially expanded.

According to an embodiment, the display module 160 may include a flexible display 610 (e.g., the flexible displays 230 or 430) in which an area of a display is partially variable in conjunction with the sliding movement of the second housing 220 or 420, and a display drive circuit 630 to drive the display module 160.

According to an embodiment, the flexible display 610 may include a first display area (e.g., a fixed area) that is fixedly disposed in the first housing 210 or 410 and a second display area (e.g., an expandable area) that is rollably mounted in the second housing 220 or 420. In an embodiment, the first display area may be visually exposed in a first state (e.g., a closed state or a retracted state) and/or a second state (e.g., an open state or a withdrawn state) of the electronic device 101. In an embodiment, the second display area is visually exposed in a second state of the electronic device 101 and may partially expand an area of the flexible display 610 in response to the sliding movement of the second housing 220 or 420.

According to an embodiment, the flexible display 610 may be implemented such that a portion thereof (e.g., a bendable section) is capable of being withdrawn from an interior space of the second housing 220 or 420 of the electronic device 101. For example, when the electronic device 101 is switched from a closed state to an open state or a partially open state, the bendable section of the flexible display 610 may be slidingly withdrawn from an interior space of the electronic device 101, which may cause a screen to be expanded fully or partially. When the electronic device 101 is switched from an open state or a partially open state to a closed state, the bendable section may be slidingly retracted into an interior space of the electronic device 101, which may cause a screen to be fully or partially contracted.

According to an embodiment, the display drive circuit 630 is a circuit for controlling the flexible display 610, and may include, for example, a display drive integrated circuit (DDI) or DDI chip. According to an embodiment, the display drive circuit 630 may include a touch DDI (TDDI) that is disposed in a chip on panel (COP) or chip on film (COF) method. The display drive circuit 630 may receive signals commanded by the processor 120 and control at least one display of the flexible display 610 to display a corresponding screen. The display drive circuit 630 may serve as a pathway for signals between the flexible display 610 and the processor 120, thereby controlling pixels through thin film transistors (TFTs) in the flexible display 610. For example, the display drive circuit 630 may have a function of turning on or off pixels included in the flexible display 610 and may be electrically coupled to a gate electrode of the TFT.

The display drive circuit 630 may have a function of adjusting an amount of RGB (red, green, and blue) signals in a pixel to create a color difference, and may be electrically connected to a source electrode of the TFT. The TFT may include a gate line (or scan line) electrically connecting the display drive circuit 630 to the gate electrode of the TFT, and a data line (or source line) electrically connecting the display drive circuit 632 to the source electrode of the TFT. According to an embodiment, the display drive circuit 630 may operate in response to a red, green, blue, and white (RGBW) method in which a white pixel is added to an RGB pixel.

According to an embodiment, the display drive circuit 630 may be a DDI package. The DDI package may include a DDI (or DDI chip), a timing controller (T-CON), a graphics RAM (GRAM), or power generating circuits. According to an embodiment, the graphics RAM may be omitted, or a memory provided separately from the display drive circuit 630 may be used.

The timing controller may convert a data signal input from the processor 120 into a signal required by the DDI.

The timing controller may serve to adjust input data information into appropriate signals for a gate driver (or gate IC) and source driver (or source IC) of the DDI.

The graphics RAM may serve as a memory to temporarily store data for input to the driver (or IC) of the DDI. The graphics RAM may store input signals and export these signals back to the driver of the DDI, in which case the graphics RAM may interact with the timing controller to process the signals.

The power generating circuits may generate a voltage to drive the flexible display 610 to supply a voltage required for the gate driver and source driver of the DDI.

According to an embodiment, the electronic device may be implemented by including one or more DDIs. According to an embodiment, the electronic device 101 may include one DDI operatively or electrically coupled to the processor 120 and the flexible display 610 (e.g., a first display area and a second display area). For example, the first display area and the second display area may be connected to a single DDI. According to an embodiment, the electronic device 101 may include two DDIs (e.g., a first DDI, a second DDI) operatively or electrically coupled to the processor 120 and the flexible display 610. For example, the first display area may be connected to the first DDI, and the second display area may be connected to the second DDI. According to an embodiment, the first DDI and the second DDI may be operatively or electrically connected to each other.

According to an embodiment, the flexible display 610 may include a plurality of gate lines G to transmit a gate signal (or scan signal), a plurality of data lines D to transmit a data signal in response to a gate signal from the gate lines G, and a plurality of pixels P defined by the gate lines G and the data lines D. According to an embodiment, the gate line G may extend in a first direction (e.g., Y direction) and the data line D may extend in a second direction (e.g., X direction) that intersects the first direction, which is not limited thereto. For example, the direction of extension of the gate line G and the data line D may be switched. The gate driver of the DDI may be constituted to drive a plurality of gate lines G, and the source driver (or data driver) of the DDI may be constituted to drive a plurality of data lines D.

According to an embodiment, the flexible display 610 may include a touch detection circuit 620 (or a touch sensor). The touch detection circuit 620 may include, for example, a transmission unit (Tx, transmitter) including a plurality of first electrode lines (or a plurality of driving electrodes), and a reception unit (Rx, receiver) including a plurality of second electrode lines (or a plurality of receiving electrodes).

According to an embodiment, the sensor integrated circuit (IC) 640 may supply a current (e.g., alternating current) to the touch detection circuit 620, and an electric field may be formed between the transmission unit and the reception unit of the touch detection circuit 620. The sensor IC 640 may convert an analog signal obtained through the touch detection circuit 620 to a digital signal. For example, when a finger comes into contact with a screen, or reaches a threshold distance from the screen, a change in the electric field occurs, which may result in a change in capacitance (or voltage drop) related thereto. When the change in capacitance is equal to or greater than a threshold value, the sensor IC 640 may generate an electrical signal regarding on-screen coordinates as a valid touch input or hovering input and output the signal to the processor 120. The processor 120 may recognize on-screen coordinates on the basis of electrical signals received from the sensor IC 640.

According to an embodiment, the sensor IC 640 may include a touch controller integrated circuit (touch controller IC). The touch controller IC may perform a variety of functions such as noise filtering, denoising, or sensing data extraction in relation to the touch detection circuit 620. According to an embodiment, the touch controller IC may include various circuits, such as an analog-to-digital converter (ADC), a digital signal processor (DSP), and/or a micro control unit (MCU).

According to an embodiment, the tension control module 650 may be included in, or coupled to, a tension structure that provides a tension that acts on the flexible display 610, for example. The tension control module 650 may control the tension acting on the flexible display 610 in response to control signals from the processor 120.

According to an embodiment, the sensor module 660 (e.g., the sensor module 176 in FIG. 1) may measure, for example, a physical quantity or detect an operational state of the electronic device 101 and thus generate an electrical signal or data value corresponding thereto. According to an embodiment, the sensor module 660 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. According to an embodiment, the sensor module 660 may further include at least one control circuit for controlling at least one sensor therein.

According to an embodiment, the sensor module 660 may be a device for detecting a tilted angle of the electronic device 101 with respect to a ground surface and/or a direction in which the electronic device 101 is directed in a three-dimensional coordinate system using sensing data obtained from at least one of a plurality of sensors. However, the present disclosure is not limited thereto, and various sensors may be used to obtain information related to the tilted angle (e.g., azimuth) of the electronic device 101.

For example, an acceleration sensor may sense information on linear motion of the electronic device 101 and/or acceleration along three axes of the electronic device 101. A gyro sensor may sense information related to the rotation of the electronic device 101, and a geomagnetic sensor may sense information on the direction in which the electronic device 101 is directed within an absolute coordinate system. According to an embodiment, the processor 120 may use nine-axis motion data obtained using a gyro sensor and a geomagnetic sensor. For example, the processor 120 may form a virtual coordinate space on the basis of an measured azimuth (e.g., yaw, pitch, and/or roll values) in the nine-axis motion data, and may distinguish one area of the virtual coordinate space as being a horizontal direction range (landscape) and another area of the virtual coordinate space as being a vertical direction range (portrait).

According to an embodiment, the input module 670 (e.g., the input module 150 in FIG. 1) may receive, for example, a user input. The input module 670 may include, for example, a key input device. According to an embodiment, the key input device may include keys of various methods, such as, for example, a physical key, a capacitive key, or an optical key. The input module 670 may include various other forms of user interfaces.

According to an embodiment, the memory 130 may store various configuration information and/or instructions related to operating the display module 160 according to a closed state, a partially open state (e.g., an intermediate state), and an open state of the electronic device 101. In an example, the memory 130 may include at least one configuration that causes a screen display to be operated differently according to a closed state, a partially open state, and an open state. In an example, the memory 130 may include at least one instruction that causes the memory 130 to identify the switching between a closed state, a partially open state, and an open state, and, in the identified state, to process a corresponding screen display. In an example, the memory 130 may include an instruction that causes the processor 120 to adjust the tension of the flexible display 610 using the tension control module 650.

According to an embodiment, the processor 120 may include, for example, a microcontroller unit (MCU), and may control a plurality of hardware constituent elements connected to the processor 120 by running an operating system (OS) or embedded software program. The processor 120 may control a plurality of hardware constituent elements, for example, according to instructions stored in the memory 130 (e.g., the program 140 in FIG. 1).

According to an embodiment, the processor 120 may display an execution screen (e.g., wallpaper) of an application in response to an amount of withdrawal of the display module 160 in a state where the display module 160 is open or partially open. According to an embodiment, the processor 120 may detect a change in a state of the display module 160 and determine an exposed screen area on the basis of the detection of the change in a state of the display module 160. According to an embodiment, the processor 120 may control the display module 160 to constitute and display an execution screen on the basis of an exposed screen area.

According to an embodiment, the processor 120 may control the display module 160 to display a screen through a first display area (e.g., a fixed area) of the flexible display 610 in a first state (e.g., a closed state).

According to an embodiment, when a second display area is slid (rolled) in response to a sliding movement of the second housing 220, 420 to form a second state in which the electronic device 101 is partially open, the processor 120 may control the display module 160 to display a screen in conjunction with the first display area and the second display area (e.g., an expanded area) in the second state, or to display a screen through the second display area independently of the first display area.

According to an embodiment, the processor 120 may display a first execution screen on the basis of the first display area and detect a change in a state of the display (sliding detection) while displaying the first execution screen. According to an embodiment, the processor 120 may, on the basis of detecting the change in state, maintain the first execution screen displayed through the first display area and display the second execution screen through the second display area. According to an embodiment, the processor 120 may, on the basis of identifying the change in a state of the display, control the display module 160 such that the first execution screen is changed (e.g., expanded) in correspondence to the conjunction of the first display area and the second display area.

According to an embodiment, the processor 120 may control the display module 160 such that the screen display operates differently according to a closed state, a partially open state, and an open state, at least on the basis of a type of application running and/or a configuration of the electronic device 101 designated by a user.

According to an embodiment, the processor 120 may control an operation related to providing wallpaper and supporting a configuration of the wallpaper in the electronic device 101.

According to an embodiment, the processor 120 may control the display module 160 (e.g., a rollable display supporting a first display area and a second display area that is expanded from the first display area) such that a first image area corresponding to first wallpaper displayed in the first display area is configured, and a first preview image corresponding to the configured first image area is displayed. According to an embodiment, the processor 120 may control the display module 160 such that a second image area corresponding to second wallpaper displayed in the second display area is configured, and a second preview image corresponding to the configured second image area is displayed.

According to an embodiment, the processor 120 may perform operations of detecting a trigger related to displaying wallpaper, determining a state of a display, displaying wallpaper on the basis of a first image area designated to a first state (e.g., a closed state or an open state) in a wallpaper image, detecting a state change in which the electronic device 101 is changed from the first state to a second state (e.g., an open state or a closed state), providing a continuous change effect on the basis of the wallpaper image while the electronic device 101 is being switched to the second state, and displaying wallpaper on the basis of a second image area corresponding to a ratio designated to the second state in the wallpaper image.

According to an embodiment, the processor 120 may control an operation related to configuring wallpaper in the electronic device 101. According to an embodiment, the processor 120 may perform operations of detecting a trigger related to a wallpaper setting, displaying simultaneously a plurality of first preview images and second preview images corresponding to a first display area in a first state and a second display area in a second state of the electronic device (or rollable display), respectively, and performing an object analysis of various image objects on the basis of an entire area of a wallpaper image corresponding to the first preview image and the second preview image.

According to an embodiment, the processor 120 may perform operations of identifying a recommendable image area on the basis of a result of the object analysis, and generating a recommended object on the basis of the recommendable image area. According to an embodiment, the processor 120 may generate at least one recommended object related to at least one image object in the wallpaper image on the basis of the result of the object analysis.

According to an embodiment, the processor 120 may perform an operation of providing at least one recommended object to a wallpaper preview area for wallpaper. According to an embodiment, the processor 120 may perform operations of detecting a user input of selecting a recommended object on the basis of at least one recommended object, and configuring, in response to the user input, wallpaper in correspondence to a size for each state on the basis of the selected recommended object. For example, the processor 120 may operate to identify a second image area for second wallpaper, and configure the second wallpaper on the basis of the second image area.

According to an embodiment, the processor 120 may perform an operation of displaying a preview image (e.g., a second preview image) for wallpaper (e.g., second wallpaper) configured on the basis of a recommended object through a wallpaper preview area.

According to an embodiment, an operation of the electronic device 101 and/or the processor 120 of the electronic device 101 will be described with reference to the drawings described below.

According to an embodiment, the processor 120 may perform application layer processing functions that are required by a user of the electronic device 101. According to an embodiment, the processor 120 may provide controls and commands of functions for various blocks of the electronic device 101. According to an embodiment, the processor 120 may perform calculations or data processing related to control and/or communication of the respective constituent elements of the electronic device 101. For example, the processor 120 may include at least some of the constitutions and/or functions of the processor 120 in FIG. 1. The processor 120 may be operatively coupled to, for example, constituent elements of the electronic device 101. The processor 120 may load commands or data received from other constituent elements of the electronic device 101 into the memory 130, process the commands or data stored in the memory 130, and store resultant data.

According to an embodiment, the processor 120 may include processing circuitry and/or executable program elements. According to an embodiment, the processor 120 may control (or process), on the basis of processing circuitry and/or executable program elements, an operation related to reducing an amount of calculations during indoor position measurement in the electronic device 101.

According to an embodiment, the operations performed by the processor 120 may be implemented on a recording medium (or computer program product). For example, the recording medium may include a non-transitory computer-readable recording medium that records a program for executing various operations performed by the processor 120.

The embodiments disclosed herein may be implemented in a recording medium readable by a computer or similar device using software, hardware, or combinations thereof. According to hardware implementations, the operations described in an embodiment may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for performing other functions.

In an embodiment, the recording medium (or computer program product) may include a computer-readable recording medium that records a program for executing various operations related to providing wallpaper in the electronic device 101, and various operations related to configuring wallpaper in the electronic device 101.

In an embodiment, the recording medium (or computer program product) may include a computer-readable recording medium that records a program for executing operations of detecting a trigger related to a wallpaper setting, displaying simultaneously, on the basis of detecting the trigger, a first preview image and a second preview image corresponding to a first display area in a first state and a second display area in a second state, respectively, performing an object analysis of various image objects on the basis of an entire area of a wallpaper image corresponding to the first preview image and the second preview image, generating, on the basis of a result of the object analysis, at least one recommended object related to the at least one image object, and providing the at least one recommended object to a wallpaper preview area for wallpaper.

The electronic device 101, according to an embodiment of the present disclosure, may include a display (e.g., the display module 160 in FIG. 1 or FIG. 6), and a processor (e.g., the processor 120 in FIG. 1 or FIG. 6). According to an embodiment, the processor 120 may operate such that the processor 120 simultaneously displays, on the basis of detecting a trigger related to a wallpaper setting, a plurality of preview images corresponding to a plurality of states (e.g., a first state and a second state) of the electronic device 101, performs an object analysis on the basis of a wallpaper image corresponding to the preview image, generates at least one recommended object on the basis of the object analysis, provides the recommended object to a wallpaper preview area, and displays a preview image of wallpaper configured based on the recommended object, on the basis of detecting a user input for the recommended object.

The electronic device 101 according to an embodiment of the present disclosure may include a first housing (e.g., the first housing 310 in FIGS. 3A to 3D), a second housing disposed to slidingly move relative to the first housing (e.g., the second housing 320 in FIGS. 3A to 3D), a rollable display (e.g., the flexible display 330 in FIGS. 3A to 3D) having a first display area (e.g., a display area in a closed state (or a contracted state)) and a second display area (e.g., a display area in an open state (or an expanded state)) that is expanded from the first display area, a memory for storing instructions (e.g., the memory 130 in FIG. 1 or FIG. 6), and at least one processor operatively connected to the rollable display and the memory (e.g., the processor 120 in FIG. 1 or FIG. 6).

According to an embodiment, the at least one processor 120 may operate to configure a first image area corresponding to first wallpaper displayed in a first display area and to display a first preview image corresponding to the configured first image area. According to an embodiment, the at least one processor 120 may operate to configure a second image area corresponding to second wallpaper displayed in a second display area and to display a second preview image corresponding to the configured second image area.

According to an embodiment, the second housing may be coupled to the first housing in a first state (e.g., a closed state or a contracted state) of the electronic device 101, and may slide from the first housing in the first state in a designated direction to support a second state (e.g., an open state or an expanded state) that partially expands an area of the rollable display.

According to an embodiment, the rollable display may include a flexible display (e.g., the flexible display 330 in FIGS. 3A to 3D) in which an area of the rollable display is at least partially variable in conjunction with a sliding movement of the second housing.

According to an embodiment, the first display area may include an area that is visually exposed in a first state. According to an embodiment, the second display area may include an area that is visually exposed in a second state different from the first state, and that expands an area of the first display area in response to a sliding movement of the second housing.

According to an embodiment, the at least one processor 120 may be configured to change a size of the second preview image in proportion to a change in a size of the second display area in response to a sliding movement of the second housing.

According to an embodiment, the at least one processor 120 may detect a trigger related to a wallpaper setting and, on the basis of detecting the trigger, operate to simultaneously display the first preview image and the second preview image corresponding to the first display area in the first state and the second display area in the second state, respectively. According to an embodiment, the at least one processor 120 may operate to enter a wallpaper setting mode on the basis of detecting the trigger and, upon entering the wallpaper setting mode, provide a user interface that includes a plurality of preview images (e.g., a first preview image and a second preview image) corresponding to a first state (e.g., a closed state) and a second state (e.g., an open state) of the electronic device, respectively.

According to an embodiment, the at least one processor 120 may operate to perform an object analysis of various image objects on the basis of an entire area of a wallpaper image corresponding to the first preview image and the second preview image, generate at least one recommended object related to at least one image object on the basis of a result of the object analysis, and provide the at least one recommended object to a wallpaper preview area for wallpaper.

According to an embodiment, the recommended object may include an icon, an image, and/or a text that indicates at least one information related to at least one image object included in another image area not designated as an image area for wallpaper in the wallpaper image.

According to an embodiment, the at least one information may include first information indicating a person, a user face, an animal, a plant, a food, an automobile, and/or an object, and second information indicating a number corresponding to each one of the first information.

According to an embodiment, the at least one processor 120 may operate to detect a user input of selecting a recommended object on the basis of the at least one recommended object, and in response to the user input, identify the second image area for the second wallpaper on the basis of the selected recommended object, configure the second wallpaper based on the second image area, and display the second preview image for the second wallpaper through the wallpaper preview area.

According to an embodiment, the at least one processor 120 may operate to simultaneously provide a wallpaper preview area with a first preview image to be displayed in the first state and a second preview image to be displayed in the second state. According to an embodiment, the first preview image may include a preview image based on a first image area that is to be shown as wallpaper in the first state in the wallpaper image. According to an embodiment, the second preview image may include a preview image based on a second image area that is to be shown as wallpaper in the second state in the wallpaper image.

According to an embodiment, the first preview image and the second preview image may be provided on the basis of a designated image area of one identical wallpaper image or different wallpaper images.

According to an embodiment, the object analysis may include recognizing and extracting characteristics, patterns, and/or types that are implicit in the wallpaper image.

According to an embodiment, the at least one processor 120 may operate, on the basis of the result of the object analysis, to identify a recommendable image area on the basis of an area that includes an image object in an entire area of the wallpaper image, and to provide the at least one recommended object on the basis of at least one image object of the recommendable image area.

According to an embodiment, the at least one processor 120 may operate to provide a recommended object on the basis of at least one wallpaper preview area designated among a first wallpaper preview area related to the first state and second wallpaper preview area related to the second state.

According to an embodiment, the at least one processor 120 may operate, in response to a user input of selecting the recommended object, to change and display an existing preview image in a wallpaper preview area from the wallpaper image to a preview image based on an image area recommended according to the recommended object.

According to an embodiment, the at least one processor 120 may, upon changing to the preview image based on the recommended image area, operate to zoom the recommended image area across an entire area of the wallpaper image to correspond to an output resolution of the second state.

According to an embodiment, the at least one processor 120 may operate to complete a wallpaper setting operation based on a user input, or to provide a wallpaper preview based on an image area configured for each state (e.g., a first state or a second state).

According to an embodiment, the at least one processor 120 may operate to detect a user input on the basis of a completion object for completing a wallpaper setting, and in response to the user input of selecting the completion object, configure the first wallpaper for the first state on the basis of a first image area corresponding to a first preview image in the wallpaper image, and configure the second wallpaper for the second state on the basis of a second image area corresponding to a second preview image in the wallpaper image.

According to an embodiment, the at least one processor 120 may operate to complete a configuration of the first wallpaper for the first state and the second wallpaper for the second state, determine the first state or the second state when displaying the wallpaper, and, on the basis of a result of the determination, display the first preview image in the first state or the second preview image in the second state.

According to an embodiment, the at least one processor 120 may operate, while displaying a preview image, to detect a change in state between the first state and the second state and, in response to detecting the change in state, to change a display ratio of a corresponding image area in the wallpaper image in correspondence to the first state or the second state, thereby displaying a preview image in accordance with the corresponding state.

According to an embodiment, the at least one processor 120 may operate to switch and display the first preview image or the second preview image successively in response to a change between the first state and the second state.

According to an embodiment, the at least one processor 120 may operate to detect a user input on the basis of a preview object for a wallpaper preview, and, in response to the user input of selecting the preview object, switch a first user interface related to a wallpaper setting to a second user interface related to a preview of the wallpaper, and, upon switching the user interfaces, determine the first state or the second state, and, on the basis of a result of the determination, display a preview of the wallpaper based on a preview image configured in response to the first state or the second state.

Hereinafter, a method of operating the electronic device 101 according to various embodiments will be described in detail. The operations performed by the electronic device 101, according to various embodiments, may be executed by the processor 120, which includes various processing circuitry and/or executable program elements of the electronic device 101. According to an embodiment, the operations performed by the electronic device 101 may be executed by instructions that are stored in the memory 130 and allow the processor 120 to be operated when executed.

Figure 7:
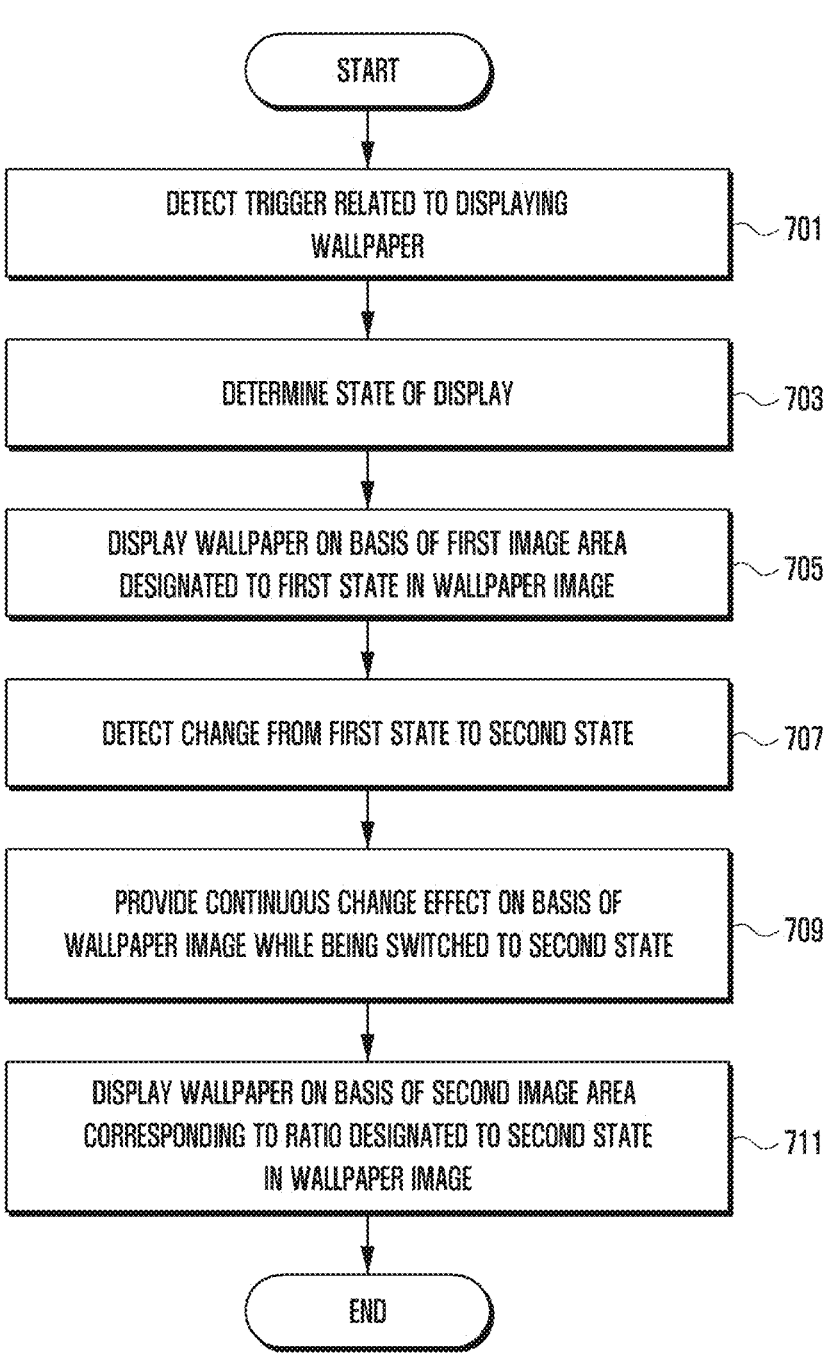
FIG. 7 is a flowchart illustrating a method of operating an electronic device according to an embodiment of the present disclosure.

FIG. 7 is a flowchart illustrating a method of operating an electronic device according to an embodiment of the present disclosure.

According to an embodiment, FIG. 7 may illustrate an example of an operation of providing wallpaper in the electronic device 101 (e.g., the electronic device 200 and/or the electronic device 300), according to an embodiment.

According to an embodiment, the electronic device 101 may include a first housing (e.g., the first housing 310 in FIGS. 3A to 3D) and a second housing (e.g., the second housing 320 in FIGS. 3A to 3D) disposed to slidingly move relative to the first housing. According to an embodiment, the electronic device 101 may include a rollable display (e.g., the flexible display 330 in FIGS. 3A to 3D) that supports a first display area (e.g., a display area in a closed state (or contracted state)) and a second display area (e.g., a display area in an open state (or expanded state)) that is expanded from the first display area.

According to an embodiment, an electronic device 101 including a first housing, a second housing, and a rollable display may, by the processor 120, provide a wallpaper display in response to a change in a state of expansion or contraction of the rollable display and a wallpaper setting therefor. According to an embodiment, the processor 120 may configure a first image area corresponding to first wallpaper displayed in a first display area. According to an embodiment, the processor 120 may operate to display a first preview image corresponding to the configured first image area through a first display area. According to an embodiment, the processor 120 may configure a second image area corresponding to second wallpaper displayed in a second display area. According to an embodiment, the processor 120 may operate to display a second preview image corresponding to the configured second image area through a second display area.

According to an embodiment, in the electronic device 101, a specific method of displaying wallpaper and providing a wallpaper setting therefor, may include, as illustrated in FIG. 7, operation 701, by the processor 120 of the electronic device 101, of detecting a trigger related to a wallpaper display, operation 703 of determining a state (e.g., a first state or a second state) of a display, operation 705 of displaying the wallpaper on the basis of a first image area designated in the first state (e.g., a closed state or an open state) in a wallpaper image, operation 707 of detecting a state change in which the electronic device 101 changes from the first state to the second state (e.g., an open state or a closed state), operation 709 of providing a continuous change effect on the basis of the wallpaper image while the electronic device 101 is switched to the second state, and operation 711 of displaying the wallpaper on the basis of a second image area corresponding to a ration designated to the second state in the wallpaper image.

Hereinafter, with reference to the drawings, a detailed description of embodiments of each of the operations illustrated in FIG. 7 will be described. Hereinafter, in describing details of embodiments of each of the operations illustrated in FIG. 7, embodiments performed in the electronic device 101 (e.g., a vertically rollable electronic device (e.g., the electronic device 300)) that includes a vertically expandable display (e.g., a rollable display) will be described.

With reference to FIG. 7, at operation 701, the processor 120 of the electronic device 101 may detect a trigger related to a wallpaper display. In an embodiment, the trigger related to the wallpaper display may include, for example, operations of turning on a display of the electronic device 101 (e.g., the display module 160 in FIG. 1), terminating an execution screen of an application (e.g., moving to a home screen), and/or detecting a user input designated to display the wallpaper. The present disclosure is not limited thereto, and the trigger related to the wallpaper display may include various triggers related to displaying the wallpaper through the display of the electronic device 101.

At operation 703, the processor 120 may determine a state of the display on the basis of detecting the trigger. For example, the processor 120 may determine whether the electronic device 101 exists in a closed state or an open state at an occasion of trigger detection. According to an embodiment, the processor 120 may determine a first state (or current state) of the display (e.g., an open state, an intermediate state, or a closed state). According to an embodiment, the processor 120 may determine a first state of the display on the basis of a sliding or receiving state of a first housing and a second housing of the electronic device 101. For example, the processor 120 may identify a state on the basis of an amount of change in display (e.g., amount of withdrawal or amount of retraction). The present disclosure is not limited thereto, and a state of the electronic device 101 (or a state of the display) may be determined using at least one sensor (e.g., a sensor module (e.g., the sensor module 176 in FIG. 1 and/or the sensor module 660 in FIG. 6) designated for sensing a state of the display in the electronic device 101.

At operation 705, the processor 120 may determine a first state (e.g., a closed state, an intermediate state, or an open state) and may control the display such that the wallpaper is displayed on the basis of a first image area designated to the first state in a designated wallpaper image. According to an embodiment, the processor 120 may display the wallpaper on the basis of a first image area corresponding to a ratio designated to a first state in a wallpaper image configured for the wallpaper. According to an embodiment, the processor 120 may configure a first image area corresponding to first wallpaper displayed in a first display area of the display from a designated wallpaper image. According to an embodiment, the processor 120 may display a first preview image corresponding to a first image area configured on the basis of a wallpaper image as wallpaper through a first display area. According to an embodiment, a first display area may include an area that is visually exposed in a first state.

At operation 707, the processor 120 may detect a state change from the first state to the second state. According to an embodiment, the processor 120 may detect a state change in which a first state (or current state) (e.g., a closed state, an intermediate state, or an open state) of the display is changed to a second state (e.g., an open state, an intermediate state, or a closed state) that is different from the first state. For example, the processor 120 may detect a state change in which a resolution of the display changes (or a display ratio of a display area changes). According to an embodiment, the processor 120 may detect switching of the display from an open state to a closed state, or from a closed state to an open state. In an embodiment, the state change may include changing a display ratio of a display area of the display, on the basis of the display being switched from an open state to a closed state, or from a closed state to an open state.

According to an embodiment, the processor 120 may identify a state change on the basis of an amount of change in display (e.g., amount of withdrawal or amount of retraction). According to an embodiment, when the change from a first state to a second state is a state change from a closed state to an open state, the processor 120 may identify a state change on the basis of (or in proportion to) an amount of withdrawal of the display (or a ratio of a display area being changed to be expanded). According to an embodiment, when the change from a first state to a second state is a state change from an open state to a closed state, the processor 120 may identify a state change on the basis of (or in proportion to) an amount of retraction of the display (or a ratio of a display area being changed to be contracted).

At operation 709, the processor 120 may provide a continuous change effect on the basis of the wallpaper image while being switched to the second state. According to an embodiment, the processor 120 may provide a visual effect in which the wallpaper changes from a first image area to a second image area of a wallpaper image. For example, the processor 120 may visually provide a change between a first image area and a second image area on the basis of a switching effect, such as an animation that continuously changes between the first image area and the second image area, a frame in/out (or slide in/out) effect, and/or a fade in/out effect. According to an embodiment, the processor 120 may change and provide a size of a preview image in proportion to a change in a size of a display area (e.g., a display area in a first state or a second state) in response to a sliding movement of a housing (e.g., a second housing).

At operation 711, the processor 120 may control the display to display the wallpaper on the basis of the second image area corresponding to a ratio designated to the second state in the designated wallpaper image. According to an embodiment, the processor 120 may display the wallpaper on the basis of a second image area corresponding to a ratio designated to a second state in a wallpaper image configured for the wallpaper. According to an embodiment, the processor 120 may configure a second image area corresponding to second wallpaper displayed in a second display area of the display from a designated wallpaper image. According to an embodiment, the processor 120 may display a second preview image corresponding to a second image area configured on the basis of a wallpaper image as wallpaper through a second display area. According to an embodiment, a second display area may include an area that is visually exposed in a second state that is different from a first state.

Figure 8A:
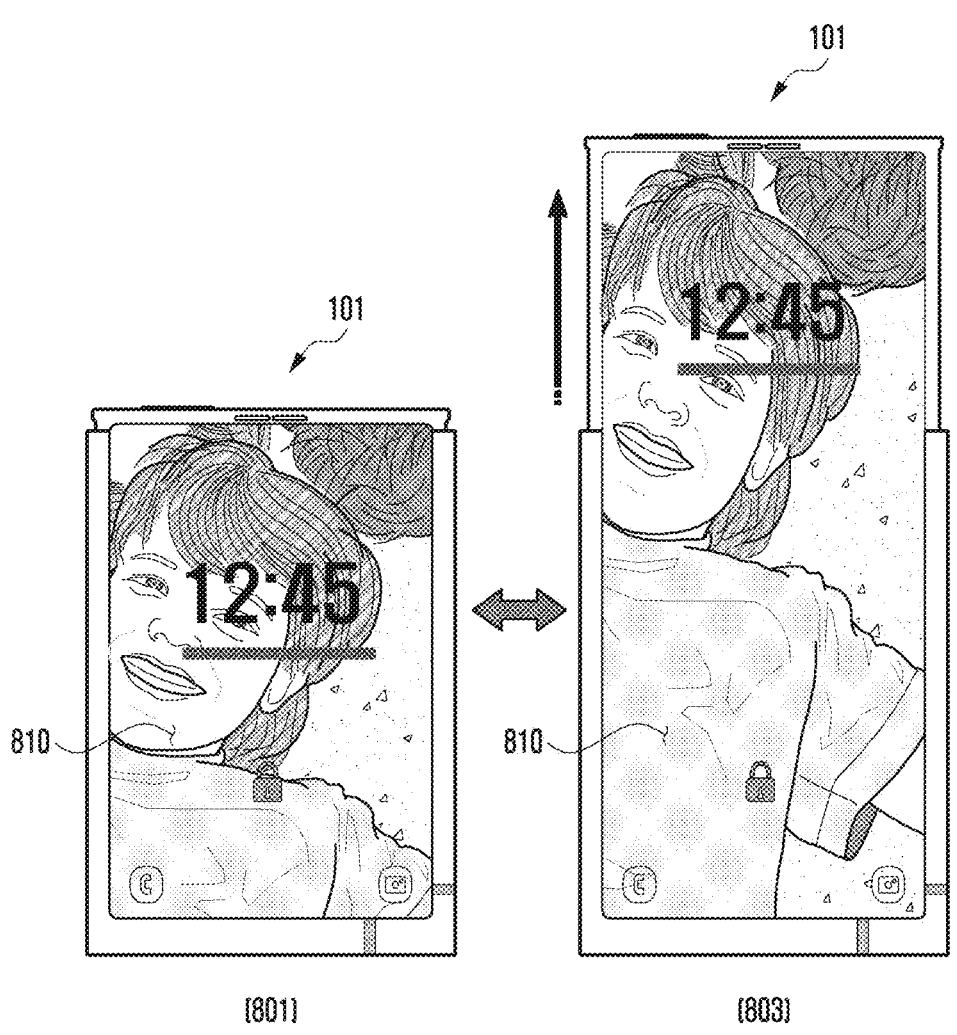
FIG. 8A and FIG. 8B are views for describing examples of providing wallpaper in an electronic device according to an embodiment of the present disclosure.
Figure 8B:

FIG. 8A and FIG. 8B are views for describing examples of providing a wallpaper in an electronic device according to an embodiment of the present disclosure.

According to an embodiment, FIG. 8A and FIG. 8B may illustrate an example of providing wallpaper on the basis of a general method of configuring wallpaper. According to an embodiment, FIG. 8A and FIG. 8B may illustrate an example of providing wallpaper in response to a state change (e.g., a closed state↔an open state) of the electronic device 101.

With reference to FIG. 8A and FIG. 8B, in example 801, the electronic device 101 may display wallpaper 810 on the basis of a first image area 820 of a designated wallpaper image 800 in a first state (e.g., a closed state). For example, example 801 may be a state in which the electronic device 101 displays the wallpaper 810 through a display on the basis of the first image area 820 of the wallpaper image 800 in the first state. According to an embodiment, the electronic device 101 may display the wallpaper 810 on the basis of a first output resolution in the first state of the display. According to an embodiment, the first output resolution may include a resolution corresponding to a full screen in correspondence to a closed state of the display. According to an embodiment, the electronic device 101 may display the wallpaper 810 in the first image area 820 on the basis of the first output resolution according to the first state.

According to an embodiment, the electronic device 101 may be switched from a first state to a second state (e.g., an open state) that is different from the first state on the basis of a user input, as illustrated in example 803. According to an embodiment, the electronic device 101 may be switched from a first state to a second state on the basis of a user input to change a state of the electronic device 101 while displaying the wallpaper 810 through the display based on the first image area 820. For example, the electronic device 101 may detect a state change in which an output resolution of the display changes (or a display ratio of a display area changes) while displaying the wallpaper 810. According to an embodiment, a state change may include a change in a display ratio of a display area of the display, on the basis of the display being switched from a closed state to an open state, or from an open state to a closed state.

In example 803, the electronic device 101 may display wallpaper 810 on the basis of a second image area 820+830 of a designated wallpaper image 800 in a second state (e.g., an open state). For example, example 803 may be a state in which the electronic device 101 displays the wallpaper 810 through a display on the basis of the second image area 820+830 of the wallpaper image 800 in the second state. According to an embodiment, the electronic device 101 may display the wallpaper 810 on the basis of the second output resolution in the second state of the display. According to an embodiment, the second output resolution may include a resolution corresponding to a full screen in correspondence to an open state of the display. According to an embodiment, the electronic device 101 may display the wallpaper 810 in the second image area 820+830 on the basis of the second output resolution according to the second state.

According to an embodiment, a user may select the wallpaper image 800 to be used as the wallpaper 810 in the electronic device 101 in a closed state, and designate an image area (e.g., the first image area 820) to be displayed as the wallpaper 810 in the wallpaper image 800. For example, a user may designate the wallpaper 810 displayed when the electronic device 101 is in a closed state as the first image area 820 using the wallpaper image 800. For example, the configuration of the wallpaper 810 is supported with reference to a closed state of the electronic device 101. For example, a user may configure the wallpaper 810 for a state in which the electronic device 101 is closed, and the wallpaper 810 for an open state may be provided by further including the image area 830 corresponding to a ratio of output resolution (e.g., height to be expanded) that is expanded according to the open state, with reference to the designated first image area 810.

In this case, when the electronic device 101 undergoes a state change from a closed state (or contracted state) to an open state (or expanded state), the wallpaper 810 in the open state may be displayed by vertically expanding to (or including) a cropped image area 830 below the first image area 820 on the basis of the first image area 820 configured in the closed state. For example, the wallpaper 810 may be provided in a state where an image area (e.g., the image area 830) is simply added by a height that the display is expanded to when being switched to an open state.

Therefore, a user may only configure the wallpaper 810 for a closed state when configuring the wallpaper 810 in the closed state, and have difficulty predicting in advance how the wallpaper 810 will display when the electronic device 101 is changed to an open state. Therefore, after configuring the wallpaper 810, the user may find it cumbersome to perform actual operation of the electronic device 101 (e.g., a state change from a state of displaying the wallpaper), then manually identify the wallpaper for the open state, and repeatedly perform the wallpaper setting when the wallpaper does not meet the user's needs.

With reference to FIG. 8A and FIG. 8B, in example 803, the electronic device 101 may display wallpaper 810 on the basis of a second image area 820+830 of a designated wallpaper image 800 in a second state (e.g., on open state). For example, example 803 may be a state in which the electronic device 101 displays the wallpaper 810 through a display on the basis of the second image area 820+830 of the wallpaper image 800 in the second state. According to an embodiment, the electronic device 101 may display the wallpaper 810 on the basis of the second output resolution in the second state of the display. According to an embodiment, the second output resolution may include a resolution corresponding to a full screen in correspondence to an open state of the display. According to an embodiment, the electronic device 101 may display the wallpaper 810 in the second image area 820+830 on the basis of the second output resolution according to the second state.

According to an embodiment, the electronic device 101 may be switched from a second state to a first state (e.g., a closed state) that is different from the second state on the basis of a user input, as illustrated in example 801. According to an embodiment, the electronic device 101 may be switched from a second state to a first state on the basis of a user input to change a state of the electronic device 101 while displaying the wallpaper 810 through the display based on the second image area 820+830. For example, the electronic device 101 may detect a state change in which an output resolution of the display changes (or a display ratio of a display area changes) while displaying the wallpaper 810.

In example 801, the electronic device 101 may display wallpaper 810 on the basis of a first image area 820 of a designated wallpaper image 800 in a first state (e.g., a closed state). For example, example 801 may be a state in which the electronic device 101 displays the wallpaper 810 through a display on the basis of the first image area 820 of the wallpaper image 800 in the first state. According to an embodiment, the electronic device 101 may display the wallpaper 810 on the basis of a first output resolution in the first state of the display. According to an embodiment, the first output resolution may include a resolution corresponding to a full screen in correspondence to a closed state of the display. According to an embodiment, the electronic device 101 may display the wallpaper 810 in the first image area 820 on the basis of the first output resolution according to the first state.

According to an embodiment, a user may select the wallpaper image 800 to be used as the wallpaper 810 in the electronic device 1010 in an open state, and designate an image area (e.g., the second image area 820+830) to be displayed as the wallpaper 810 in the wallpaper image 800. For example, a user may designate the wallpaper 810 displayed when the electronic device 101 is in an open state as the second image area 820+830 using the wallpaper image 800. For example, the configuration of the wallpaper 810 is supported with reference to an open state of the electronic device 101. For example, a user may configure the wallpaper 810 for a state in which the electronic device 101 is open, and the wallpaper 810 for a closed state may be provided by excluding the image area 830 corresponding to a ratio of output resolution (e.g., height to be contracted) that is contracted according to the closed state, with reference to the designated second image area 820+830.

In this case, when the electronic device 101 undergoes a state change from an open state to a closed state, the wallpaper 810 in the closed state may be displayed by excluding an image area 830 below the first image area 820 on the basis of the second image area 820+830 configured in the open state. For example, the wallpaper 810 may be provided in a state where an image area (e.g., the image area 830) simply disappears by a height that the display is contracted to when being switched to a closed state. Therefore, a user may only configure the wallpaper 810 for an open state when configuring the wallpaper 810 in the open state, and have difficulty predicting in advance how the wallpaper 810 will display when the electronic device 101 is changed to a closed state.

Therefore, after configuring the wallpaper 810, the user may find it cumbersome to perform actual operation of the electronic device 101 (e.g., a state change from a state of displaying the wallpaper), then manually identify the wallpaper for the closed state, and repeatedly perform the wallpaper setting when the wallpaper does not meet the user's needs.

Figure 9A:
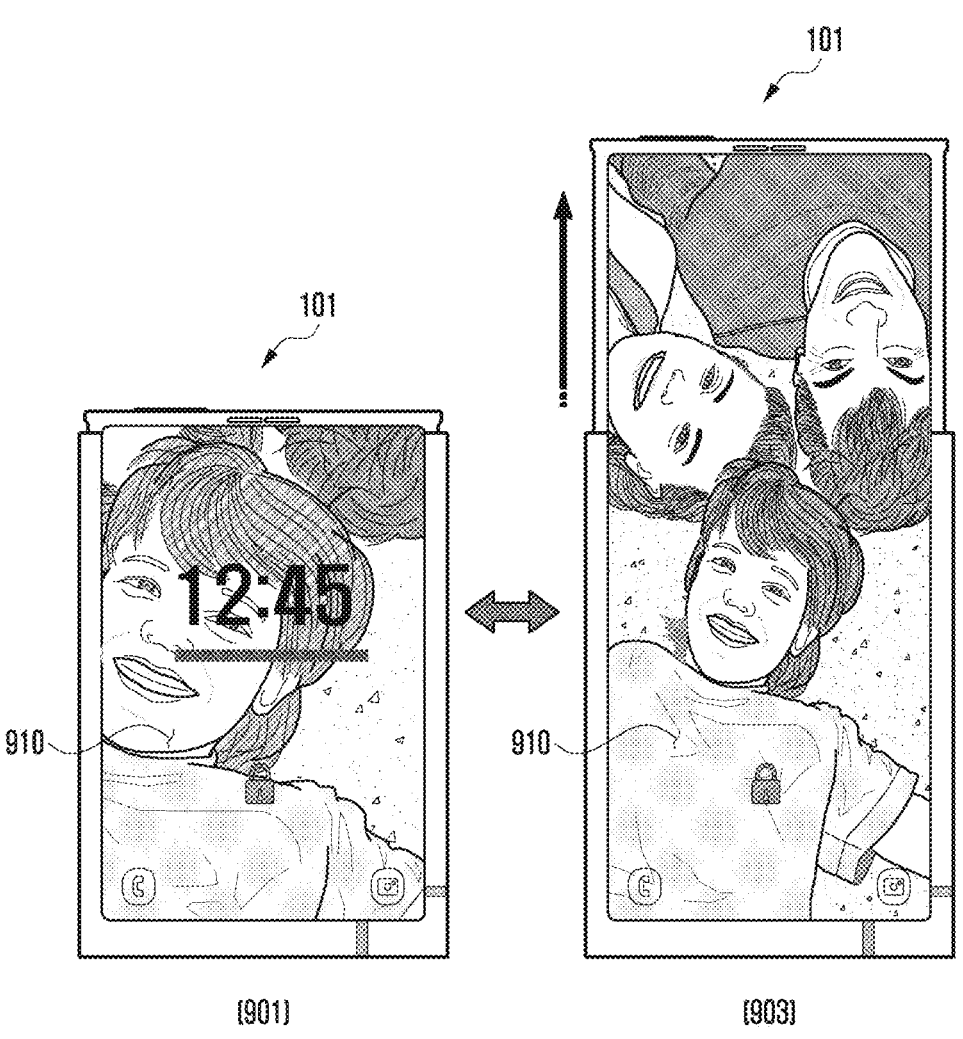
FIGS. 9A and 9B are views for describing examples of providing wallpaper in an electronic device according to an embodiment of the present disclosure.
Figure 9B:
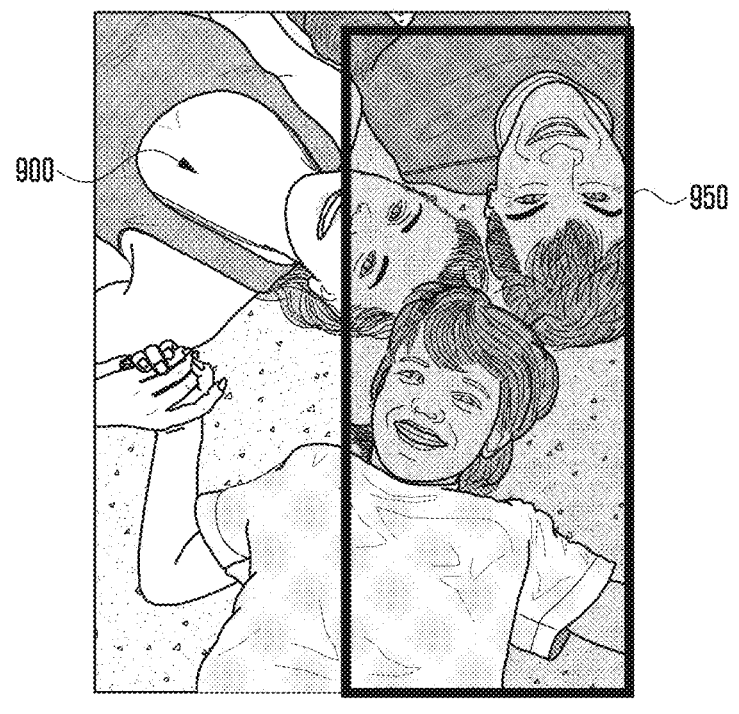

FIGS. 9A and 9B are views for describing examples of providing wallpaper in an electronic device according to an embodiment of the present disclosure.

According to an embodiment, FIG. 9A and FIG. 9B may illustrate an example of providing wallpaper on the basis of a wallpaper setting method according to the present disclosure. According to an embodiment, FIG. 9A and FIG. 9B may illustrate an example of providing wallpaper in response to a state change (e.g., a closed state↔an open state) of the electronic device 101.

With reference to FIG. 9A and FIG. 9B, in example 901, the electronic device 101 may display wallpaper 910 on the basis of a first image area (e.g., the first image area 820 in FIG. 8) of a designated wallpaper image 900 in a first state (e.g., a closed state). For example, example 901 may be a state in which the electronic device 101 displays the wallpaper 910 through a display on the basis of the first image area 820 of the wallpaper image 900 in the first state. According to an embodiment, the electronic device 101 may display the wallpaper 910 on the basis of a first output resolution in the first state of the display. According to an embodiment, the first output resolution may include a resolution corresponding to a full screen in a closed state of the display. According to an embodiment, the electronic device 101 may display the wallpaper 910 in the first image area 820 on the basis of the first output resolution according to the first state.

According to an embodiment, the electronic device 101 may be switched from a first state to a second state (e.g., an open state) that is different from the first state on the basis of a user input, as illustrated in example 903. According to an embodiment, the electronic device 101 may be switched from a first state to a second state on the basis of a user input to change a state of the electronic device 101 while displaying the wallpaper 910 through the display based on the first image area 820. For example, the electronic device 101 may detect a state change in which an output resolution of the display changes (or a display ratio of a display area changes) while displaying the wallpaper 910. According to an embodiment, a state change may include a change in a display ratio of a display area of the display, on the basis of the display being switched from a closed state to an open state, or from an open state to a closed state.

In example 903, the electronic device 101 may display wallpaper 910 on the basis of a second image area 950 of a designated wallpaper image 900 in a second state (e.g., an open state). For example, example 903 may be a state in which the electronic device 101 displays the wallpaper 910 through a display on the basis of the second image area 950 of the wallpaper image 900 in the second state. According to an embodiment, the electronic device 101 may display the wallpaper 910 on the basis of the second output resolution in the second state of the display. According to an embodiment, the second output resolution may include a resolution corresponding to a full screen in an open state of the display. According to an embodiment, the electronic device 101 may display the wallpaper 910 in the second image area 950 on the basis of the second output resolution according to the second state.

According to the present disclosure, the second image area 950 may represent an area that is actually displayed (e.g., displayed to be zoomed in) in correspondence to the output resolution of the open state of the electronic device 101. According to an embodiment, in an open state of the electronic device 101, the wallpaper image 910 may be zoomed (e.g., zoomed out or contracted) on the basis of (or in proportion to) an amount of change in display (e.g., amount of withdrawal or amount of retraction) so that at least a portion of the zoomed wallpaper image 900 is included in the second image area 950, and at least a portion of the wallpaper image 900 included in the second image area 950 is provided as the wallpaper 910.

With reference to FIG. 9A and FIG. 9B, in example 903, the electronic device 101 may display wallpaper 910 on the basis of a second image area 950 of a designated wallpaper image 900 in a second state (e.g., on open state). For example, example 903 may be a state in which the electronic device 101 displays the wallpaper 910 through a display on the basis of the second image area 950 of the wallpaper image 900 in the second state. According to an embodiment, the electronic device 101 may display the wallpaper 910 on the basis of the second output resolution in the second state of the display. According to an embodiment, the second output resolution may include a resolution corresponding to a full screen in an open state of the display. According to an embodiment, the electronic device 101 may display the wallpaper 910 in the second image area 950 in which the wallpaper image 900 is contracted on the basis of the first output resolution according to the second state.

According to an embodiment, the electronic device 101 may be switched from a second state to a first state (e.g., a closed state) that is different from the second state on the basis of a user input, as illustrated in example 901. According to an embodiment, the electronic device 101 may be switched from a second state to a first state on the basis of a user input to change a state of the electronic device 101 while displaying the wallpaper 910 through the display based on the second image area 950. For example, the electronic device 101 may detect a state change in which an output resolution of the display changes (or a display ratio of a display area changes) while displaying the wallpaper 910.

In example 901, the electronic device 101 may display wallpaper 910 on the basis of a first image area (e.g., the first image area 820 in FIG. 8) of a designated wallpaper image 900 in a first state (e.g., a closed state). For example, example 901 may be a state in which the electronic device 101 displays the wallpaper 910 through a display on the basis of the first image area 820 of the wallpaper image 900 in the first state. According to an embodiment, the electronic device 101 may display the wallpaper 910 on the basis of a first output resolution in the first state of the display. According to an embodiment, the first output resolution may include a resolution corresponding to a full screen in a closed state of the display. According to an embodiment, the electronic device 101 may display the wallpaper 910 in the first image area 820 on the basis of the first output resolution according to the first state.

According to the present disclosure, the first image area 820 may represent an area that is actually displayed in correspondence to the output resolution of the closed state of the electronic device 101. According to an embodiment, in the wallpaper 910 in a closed state of the electronic device 101, the wallpaper image 910 may be zoomed (e.g., zoomed-in or expanded) on the basis of (or in proportion to) an amount of change in display (e.g., amount of withdrawal or amount of retraction) so that at least a portion of the zoomed wallpaper image 900 is included in the first image area 820, and at least a portion of the wallpaper image 900 included in the first image area 820 is provided as the wallpaper 910.

Hereinafter, various operations that support a wallpaper setting in the electronic device 101 will be described in detail in order to provide wallpaper according to the embodiment of the present disclosure.

Figure 10:
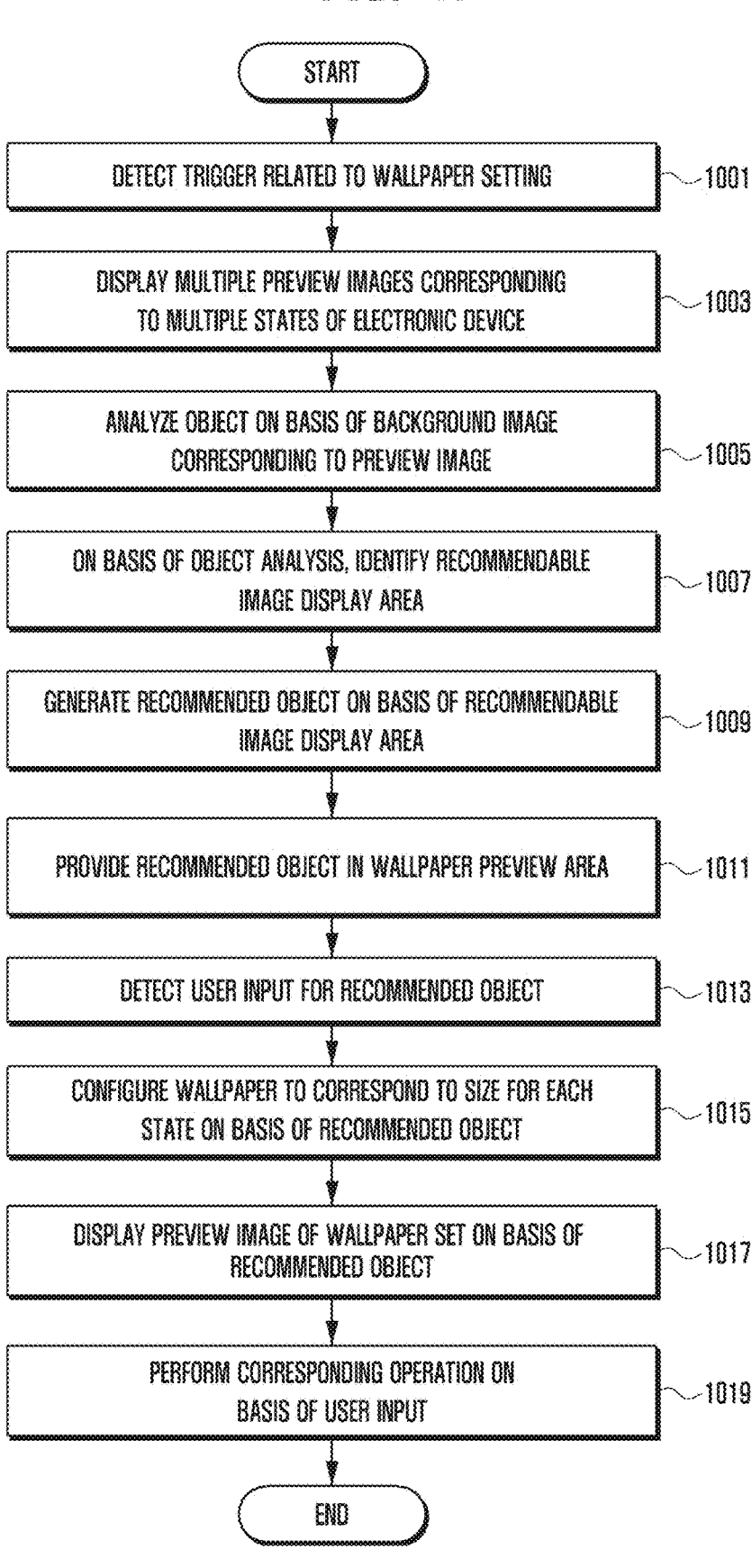
FIG. 10 is a flowchart illustrating a method of operating an electronic device according to an embodiment of the present disclosure.
Figure 11A:
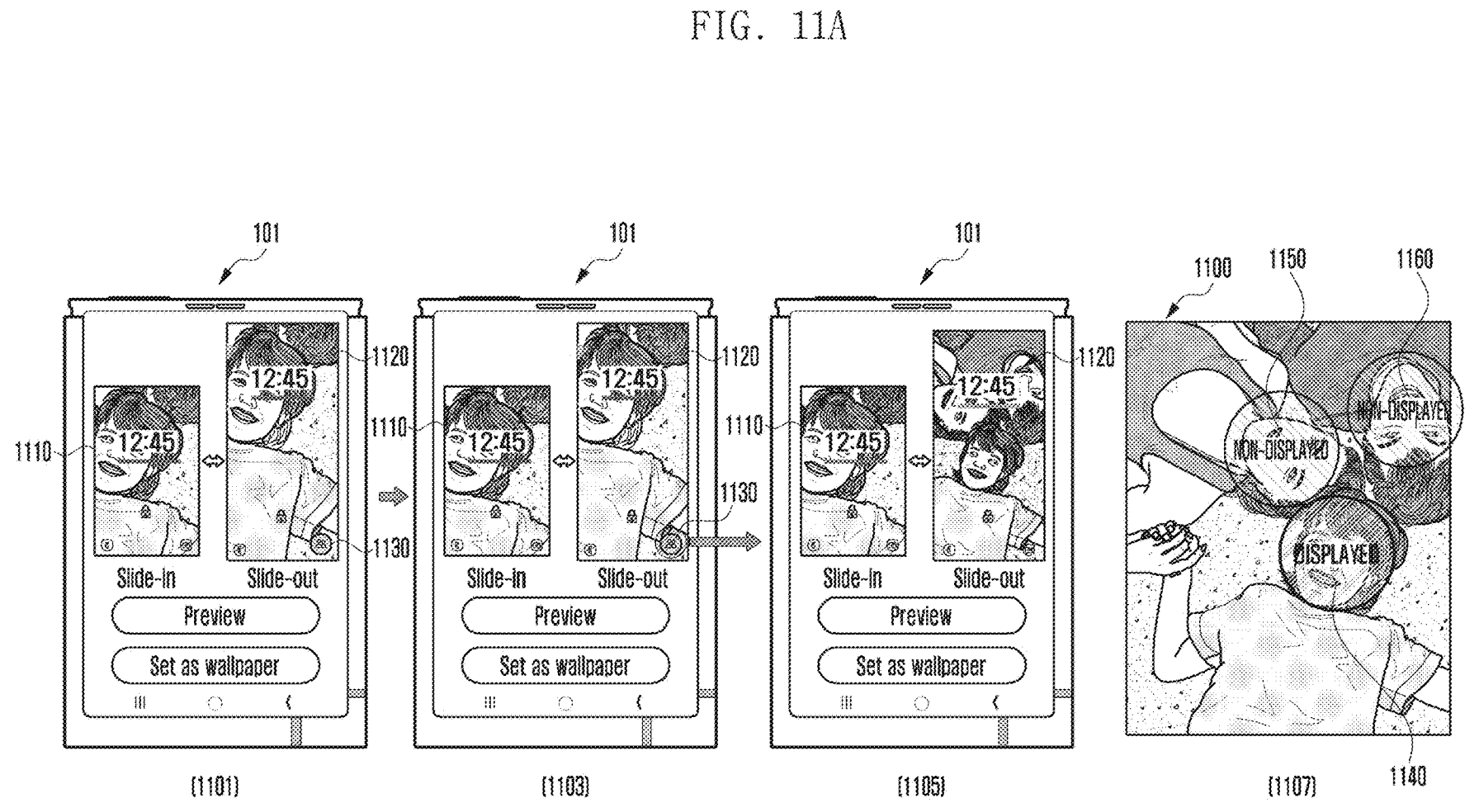
Figure 11B:
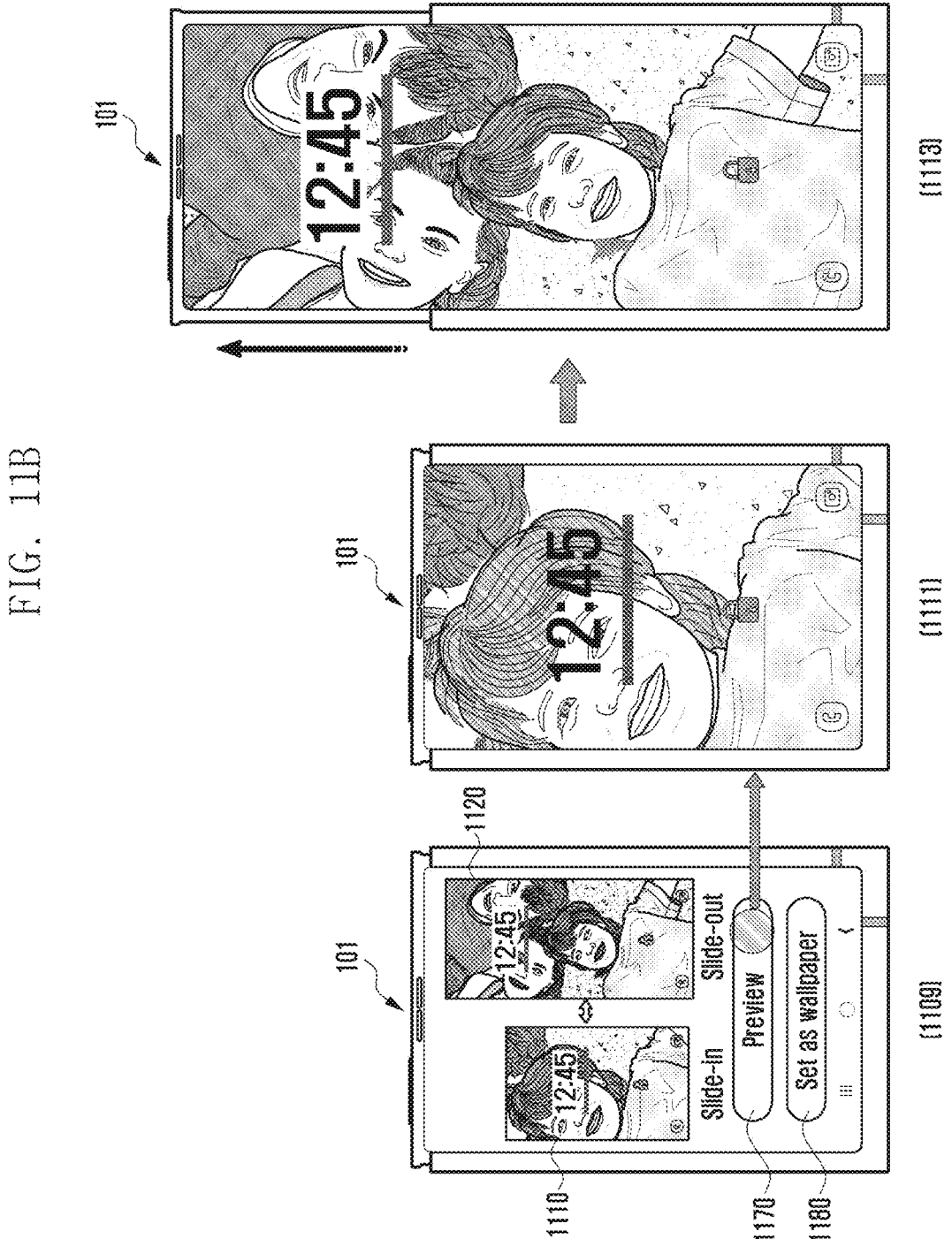
Figure 12:
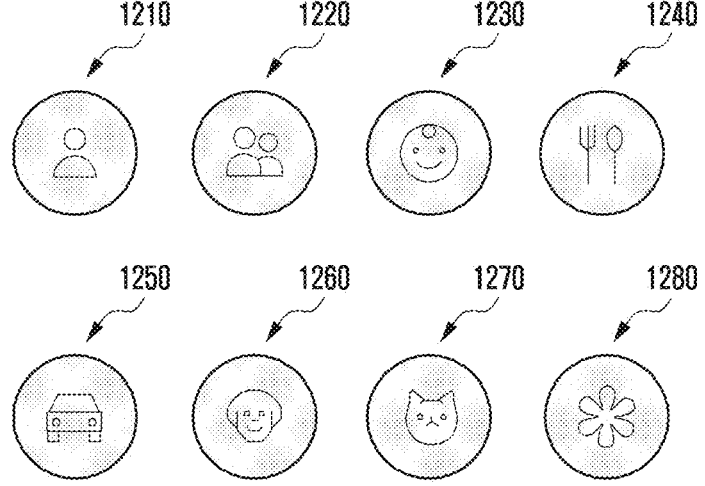
FIG. 12 is a view illustrating various examples of recommended objects provided when wallpaper is configured in an electronic device according to an embodiment of the present disclosure.

FIG. 10 is a flowchart illustrating a method of operating an electronic device according to an embodiment of the present disclosure. FIGS. 11A and 11B are views for describing examples of configuring wallpaper on an electronic device according to an embodiment of the present disclosure. FIG. 12 is a view illustrating various examples of recommended objects provided when wallpaper is set in an electronic device according to an embodiment of the present disclosure.

According to an embodiment, FIG. 10 may illustrate an example of an operation of supporting a wallpaper setting in the electronic device 101 (e.g., the electronic device 200 and/or the electronic device 300), according to an embodiment.

According to an embodiment, the electronic device 101 may include a first housing (e.g., the first housing 310 in FIGS. 3A to 3D) and a second housing (e.g., the second housing 320 in FIGS. 3A to 3D) disposed to slidingly move relative to the first housing. According to an embodiment, the electronic device 101 may include a rollable display (e.g., the flexible display 330 in FIGS. 3A to 3D) that has a first display area (e.g., a display area in a closed state (or contracted state)) and a second display area (e.g., a display area in an open state (or expanded state)) that is expanded from the first display area.

According to an embodiment, an electronic device 101 including a first housing, a second housing, and a rollable display may, by the processor 120, provide a wallpaper setting in response to a change in a state of expansion or contraction of the rollable display. According to an embodiment, the processor 120 may configure a first image area corresponding to a first wallpaper displayed in a first display area. According to an embodiment, the processor 120 may operate to display a first preview image corresponding to the configured first image area through a first display area. According to an embodiment, the processor 120 may configure a second image area corresponding to a second wallpaper displayed in a second display area. According to an embodiment, the processor 120 may operate to display a second preview image corresponding to the configured second image area through a second display area.

A method of providing a wallpaper setting in the electronic device 101, according to an embodiment, as illustrated in FIG. 10, may include operation 1001 of detecting, by the processor 120 of the electronic device 101, a trigger related to the wallpaper setting, and operation 1003 of displaying, by the processor 120 of the electronic device

101, a plurality of preview images (e.g., a first preview image and a second preview image) corresponding to a plurality of states (e.g., a first state and a second state) of the electronic device. According to an embodiment, the processor 120 may, on the basis of detecting the trigger, control a display to simultaneously display a first preview image and a second preview image corresponding to a first display area in a first state and a second display area in a second state, respectively.

The method of providing a wallpaper setting in the electronic device 101, according to an embodiment, may include operation 1005 of performing, by the processor 120 of the electronic device 101, an object analysis of an image object on the basis of a wallpaper image corresponding to a preview image. According to an embodiment, the processor 120 may, on the basis of an entire area of a wallpaper image corresponding to a first preview image and a second preview image, perform an object analysis of various image objects.

The method of providing a wallpaper setting in the electronic device 101, according to an embodiment, may include operation 1007 of identifying, by the processor 120 of the electronic device 101, a recommendable image area on the basis of the entire area of the wallpaper image based on a result of the object analysis, operation 1009 of generating a recommended object on the basis of the recommendable image area, and operation 1011 of providing the recommended object in a wallpaper preview area. According to an embodiment, the processor 120 may, on the basis of the result of the object analysis, generate at least one recommended object related to at least one image object, and provide the at least one recommended object to a wallpaper preview area for wallpaper.

According to an embodiment, at least one recommended object may include an icon, an image, and/or a text that indicates at least one information related to at least one image object included in another image area not designated as an image area for wallpaper in a wallpaper image. According to an embodiment, at least one information may include first information indicating a person, a user face, an animal, a plant, a food, an automobile, and/or an object, and second information indicating a number corresponding to each one of the first information.

The method of providing a wallpaper setting in the electronic device 101, according to an embodiment, may include operation 1013 of detecting, by the processor 120 of the electronic device 101, a user input for a recommended object, operation 1015 of configuring wallpaper to correspond to a size for each state of the electronic device 101 based on a recommended object, operation 1017 of displaying a preview image of wallpaper configured based on the recommended object, and operation 1019 of performing a corresponding operation based on the user input. According to an embodiment, the processor 120 may detect a user input of selecting a recommended object on the basis of at least one recommended object, and identify, in response to the user input, an image area (e.g., a second image area) for wallpaper (e.g., second wallpaper) on the basis of the selected recommended object. According to an embodiment, the processor 120 may configure wallpaper (e.g., second wallpaper) on the basis of an image area for wallpaper, and display a preview image (e.g., second preview image) for the wallpaper (e.g., second wallpaper) configured through a wallpaper preview area.

Hereinafter, with reference to the drawings, a detailed description of embodiments of each of the operations illustrated in FIG. 10 will be described. Hereinafter, in describing details of embodiments of each of the operations illustrated in FIG. 10, embodiments performed in the electronic device 101 (e.g., a vertically rollable electronic device (e.g., the electronic device 300)) that includes a vertically expandable display (e.g., a flexible display) will be described.

With reference to FIG. 10, FIG. 11A, FIG. 11B, and FIG. 12, at operation 1001, the processor 120 of the electronic device 101 may detect a trigger related to a wallpaper setting. In an embodiment, a trigger related to a wallpaper setting may include, for example, an operation of detecting a designated user input (e.g., manipulating a menu) to enter a wallpaper setting mode in the electronic device 101. The present disclosure is not limited thereto, and the trigger related to a wallpaper setting may include various triggers related to configuring the wallpaper of the electronic device 101 (e.g., inputting a voice command, inputting a designated gesture (e.g., shaking) using the electronic device 101).

At operation 1003, the processor 120 may, on the basis of detecting the trigger, control the display to display a plurality of preview images corresponding to a plurality of states (e.g., a closed state and an open state) of the electronic device 101. According to an embodiment, the processor 120 may, on the basis of detecting the trigger, enter a wallpaper setting mode, and display a user interface related to a wallpaper setting upon entering the wallpaper setting mode. In an embodiment, the user interface related to a wallpaper setting may include a plurality of preview images. Examples related to this are illustrated in example 1101 in FIG. 11A.

With reference to example 1101 in FIG. 11A, the processor 120 may simultaneously provide preview images 1110 and 1120 corresponding to a first state (e.g., a closed state) and a second state (e.g., an open state), respectively, of the electronic device 101 (or display). According to an embodiment, the processor 120 may simultaneously provide a first preview image 1110 to be displayed in a first state and a second preview image 1120 to be displayed in a second state to a wallpaper preview area. According to an embodiment, the first preview image may represent a preview image based on a first image area that is to be shown as wallpaper in the first state in the wallpaper image. According to an embodiment, the second preview image may represent a preview image based on a second image area that is to be shown as wallpaper in the second state in the wallpaper image. According to an embodiment, the first preview image and the second preview image may be provided on the basis of a designated image area of one identical wallpaper image or different wallpaper images.

For example, the processor 120 may provide an intuitive preview of how the wallpaper configured by a user changes according to each state and/or state change of the electronic device 101 (or display). According to an embodiment, the processor 120 may provide each of the preview images 1110 and 1120 on the basis of a default area (e.g., on the basis of a cropped area) in a designated wallpaper image when an occasion of entering a wallpaper setting is an initial configuration.

At operation 1005, the processor 120 may perform an object analysis on the basis of a wallpaper image corresponding to a preview image. According to an embodiment, the processor 120 may recognize and analyze various image objects (e.g., a person, a user face, an animal, a plant, food, an automobile, and/or an object) on the basis of an entire area of a wallpaper image 1100, as illustrated in example 1107 in FIG. 11A. According to an embodiment, the object analysis may use a variety of intelligent image analysis technologies. For example, the intelligent image analysis technology may include a technology that analyzes images to recognize implicit characteristics and extract patterns. For example, the intelligent image analysis technology may include various functions such as object recognition (e.g., recognition of faces, colors, letters, numbers, and/or objects), object tracking, and object search, depending on a subject.

At operation 1007, the processor 120 may identify a recommendable image area in an entire area of a wallpaper image on the basis of a result of an object analysis based on a wallpaper image. According to an embodiment, the processor 120 may identify a recommendable image area on the basis of an area that includes an image object in an entire area of a wallpaper image. For example, the processor 120 may recognize a plurality of image objects 1140, 1150, and 1160 (e.g., face objects) in an entire area of the wallpaper image 1100, and identify a recommendable image area on the basis of an area that includes the image objects 1140 and 1150 that are not included in a current preview image when at least some of the recognized image objects are not included in the current preview image (e.g., in a non-displayed state).

According to an embodiment, the recommendable image area may be configured to correspond to a resolution (or display ratio) that corresponds to a state of the electronic device 101 with reference to the image objects 1140 and 1150 that are not currently included in the preview image. According to an embodiment, the recommendable image area may be configured to correspond to a resolution (or display ratio) corresponding to a state of the electronic device 101, such that the recommendable image area may include the image objects 1140 and 1150 that are not included with reference to the image object 1140 currently included in the preview image.

At operation 1009, the processor 120 may generate at least one recommended object (e.g., an icon, an image, and/or a text) on the basis of at least one image object in the recommendable image area. According to an embodiment, the processor 120 may generate one or more recommended objects related to the result of the object analysis. An example of a recommended object according to an embodiment is illustrated in FIG. 12.

With reference to FIG. 12, the recommended objects may include various recommended objects 1210 to 1280 according to characteristics, patterns, and/or types implicit in the wallpaper image 1100 on the basis of the object analysis in the wallpaper image 1100.

According to an embodiment, the recommended objects 1210 to 1280 may include an icon, an image, and/or a text that indicates at least one information related to at least one image object included in another image area not designated as an image area for wallpaper in the wallpaper image 1100. According to an embodiment, at least one information may include first information indicating a person, a user face, an animal, a plant, a food, an automobile, and/or an object, and second information indicating a number corresponding to each one of the first information.

According to an embodiment, the recommended objects 1210 to 1280 may include, a first information object 1210 indicating a case in which there is one person not configured as wallpaper in the wallpaper image 1100, a second information object 1220 indicating a case in which there are two or more persons not configured as wallpaper in the wallpaper image 1100, a third information object 1230 indicating a case in which there is a baby not configured as wallpaper in the wallpaper image 1100, a fourth information object 1240 indicating a case in which there is food not configured as wallpaper in the wallpaper image 1100, a fifth information object 1250 indicating a case in which there is an automobile not configured as wallpaper in the wallpaper image 1100, a sixth information object 1260 indicating a case in which there is an animal (e.g., a dog) not configured as wallpaper in the wallpaper image 1100, a seventh information object 1270 indicating a case in which there is an animal (e.g., a cat) not configured as wallpaper in the wallpaper image 1100, and/or an eighth information object 1280 indicating a case in which there is a plant (e.g., a flower) not configured as wallpaper in the wallpaper image 1100. The present disclosure is not limited thereto, and the recommended objects 1210 to 1280 may include various information objects according to the characteristics, patterns, and/or types implicit in the wallpaper image 1100, such as, for example, a person, a user face, an animal, a plant, food, an automobile, and/or an object.

With continued reference to FIG. 10, at operation 1011, the processor 120 may provide a recommended object on the basis of the wallpaper preview area. According to an embodiment, the processor 120 may display one or more recommended objects in a wallpaper preview area through a designated area of a preview image. For example, the processor 120 may provide a recommended object on the basis of at least one wallpaper preview area designated among a first wallpaper preview area related to a first state and a second wallpaper preview area related to a second state. Examples related to this are illustrated in example 1101 or example 1103 in FIG. 11A.

With reference to example 1101 or example 1103 in FIG. 11A, the processor 120 may provide a recommended object 1130 on the basis of an area (e.g., right side lower end area) designated in the second preview image 1120 related to a second state (e.g., an open state) of the wallpaper preview area. According to an embodiment, the recommended object 1130 may be provided, respectively, on the basis of respective designated areas in both the first preview image 1110 related to a first state (e.g., a closed state) and the second preview image 1120 related to a second state, of the wallpaper preview area.

According to an embodiment, FIG. 11A may illustrate an example where, on the basis of the result of the object analysis, one recommended object 1130 is provided to represent a case in which there are two or more persons not configured as wallpaper in the wallpaper image 1100 (e.g., non-displayed objects 1150 and 1160), as illustrated in example 1107. While FIG. 11A illustrates an example in which one recommended object 1130 is provided, the recommended object 1130 may be provided as a plurality of recommended objects on the basis of the result of the object analysis in the wallpaper image 1100.

At operation 1013, the processor 120 may detect a user input of selecting a recommended object. According to an embodiment, a user may recognize the recommendation for a wallpaper setting through the recommended object 1130 displayed in the preview image, and may select (e.g., touch) the recommended object 1130 to receive the recommendation, as illustrated in example 1103 in FIG. 11A.

At operation 1015, the processor 120 may configure wallpaper to correspond to a size for each state on the basis of the recommended object. According to an embodiment, the processor 120 may change an existing preview image in a wallpaper preview area to a preview image based on an image area recommended according to a recommended object in a wallpaper image, in response to a user input of selecting the recommended object.

According to an embodiment, the processor 120 may configure the wallpaper of a preview image corresponding to a user input. For example, the processor 120 may change and configure wallpaper related to a second state (e.g., an open state) as a recommended image area according to the recommended object 1130. According to an embodiment, the processor 120 may configure wallpaper on the basis of a second image area corresponding to a ratio designated to a second state in the wallpaper image 1100.

According to an embodiment, the processor 120 may, upon changing to the preview image based on a recommended image area, zoom the recommended image area across an entire area of the wallpaper image 1100 to correspond to an output resolution of a second state. For example, the processor 120 may contract (e.g., zoom out effect) the wallpaper image 1100 to correspond to an output resolution in a second state so that an image area recommended according to the recommended object 1130 is included as wallpaper in an entire area of the wallpaper image 1100.

For example, the processor 120 may recognize a plurality of image objects 1140, 1150, and 1160 (e.g., face objects) in an entire area of the wallpaper image 1100 and contract the wallpaper image 1100 to correspond to a resolution (or display ratio) corresponding to a second state with reference to the image objects 1140, 1150, and 1160 to configure the wallpaper image 1100 as wallpaper. For example, the processor 120 may configure wallpaper to display all the face objects 1150 and 1160 that are not displayed in the wallpaper image 1100 according to the recommended object 1130.

At operation 1017, the processor 120 may control the display to display a preview image of wallpaper configured on the basis of the recommended object. According to an embodiment, the processor 120 may change an existing preview image in a wallpaper preview area to a preview image based on an image area recommended according to a recommended object in a wallpaper image and display the preview image. Examples related to this are illustrated in example 1105 in FIG. 11A.

With reference to example 1103 and example 1105 in FIG. 11A, the processor 120 may change and provide the second preview image 1120 to be displayed in a second state. For example, the processor 120 may provide the second preview image 1120 as a wallpaper preview that fits a display size of the electronic device 101 (or display) in a second state (e.g., an open state) on the basis of the recommended object 1130. According to an embodiment, the processor 120 may display, according to the recommended object 1130, a wallpaper preview including all of the face objects 1150 and 1160 that are not displayed in the wallpaper image 1100 through the second preview image 1120.

At operation 1019, the processor 120 may perform a corresponding operation on the basis of the user input. According to an embodiment, the processor 120 may complete a wallpaper setting operation based on a user input, or provide a wallpaper preview based on an image area configured for each state. An example related to this is illustrated in FIG. 11B.

With reference to FIG. 11B, in example 1109, the processor 120 may complete a wallpaper setting operation when a user input (e.g., touch) is detected through a completion object 1180 (e.g., a completion button) that completes a wallpaper setting. For example, the processor 120 may, in response to the user input of selecting the completion object 1180, configure wallpaper (e.g., a first preview image) for a first state on the basis of an image area (e.g., a first image area) corresponding to the first preview image 1110 in the wallpaper image 1100. For example, the processor 120 may, in response to the user input of selecting the completion object 1180, configure wallpaper (e.g., a second preview image) for a second state on the basis of an image area (e.g., a second image area) corresponding to the second preview image 1120 in the wallpaper image 1100.

According to an embodiment, the processor 120 may complete the configuration of first wallpaper for a first state and second wallpaper for a second state on the basis of the wallpaper image 1100. According to an embodiment, the processor 120 has been completed the configuration of the wallpaper for the first state and the second state, and may then determine the first state or the second state when displaying the wallpaper. According to an embodiment, the processor 120 may operate to display the first preview image in the first state, or to display the second preview image in the second state as wallpaper, on the basis of a result of determining the state.

According to an embodiment, the processor 120 may detect a state change in which a state changes between a first state and a second state while displaying a preview image (e.g., a first preview image or a second preview image). According to an embodiment, the processor 120 may, in response to detecting a state change, operate to change a display ratio of an image area corresponding to the wallpaper image 1100 to correspond to a first state or a second state, and to display a preview image according to the corresponding state.

According to an embodiment, the processor 120 may operate to switch and display a first preview image or a second preview image successively in response to a change between a first state and a second state (e.g., a state change).

With reference to FIG. 11B, in example 1109, the processor 120 may detect a user input (e.g., touch) through a preview object 1170 (e.g., a preview execution button). According to an embodiment, the processor 120 may, in response to the user input of selecting the preview object 1170, switch a user interface (e.g., a first user interface) related to a wallpaper setting to a user interface (e.g., a second user interface) related to a wallpaper preview and provide the user interface, as illustrated in example 1111.

According to an embodiment, the processor 120 may determine a first state or a second state upon switching of a user interface. According to an embodiment, the processor 120 may, on the basis of a result of the determination, display a wallpaper preview based on a preview image configured in correspondence to the first state or the second state. According to an embodiment, the processor 120 may provide a wallpaper preview based on an image area of the first preview image 1110 in correspondence to a current state (e.g., a first state or a closed state) of the electronic device 101. For example, the processor 120 may provide a wallpaper preview in which wallpaper is configured with an image area related to a first state (e.g., includes the face object 1140 of the wallpaper image 1100).

According to an embodiment, a user may confirm a wallpaper preview according to a first state, and then perform a user input (e.g., a roll out operation of the electronic device 101) to switch the electronic device 101 from the first state (e.g., a closed state) to a second state (e.g., an open state), as illustrated in example 1113. In example 1113, the processor 120 may provide a wallpaper preview on the basis of an image area of the second preview image 1120 in correspondence to the second state, on the basis of detecting a state change in which the electronic device 101 changes from the first state to the second state. For example, the processor 120 may provide a wallpaper preview in which wallpaper is configured with a recommended image area according to the recommended object 1130 (e.g., includes all of the face objects 1140, 1150, and 1160 of the wallpaper image 1100). According to an embodiment, the processor 120 may change and provide a size of a preview image in proportion to a change in a size of a display area (e.g., a display area in a second state).

According to an embodiment, the processor 120 may support continuous screen switching for changes in display, by changing a display ratio of an image area to correspond to each state on the basis of a single wallpaper image 1100, upon switching from a first state (e.g., a closed state) to a second state (e.g., an open state), such as switching from example 1111 to example 1113, or upon switching from a second state to a first state, such as switching from example 1113 to example 1111. An example related to this will be described with reference to the drawings described below.

Figure 13:
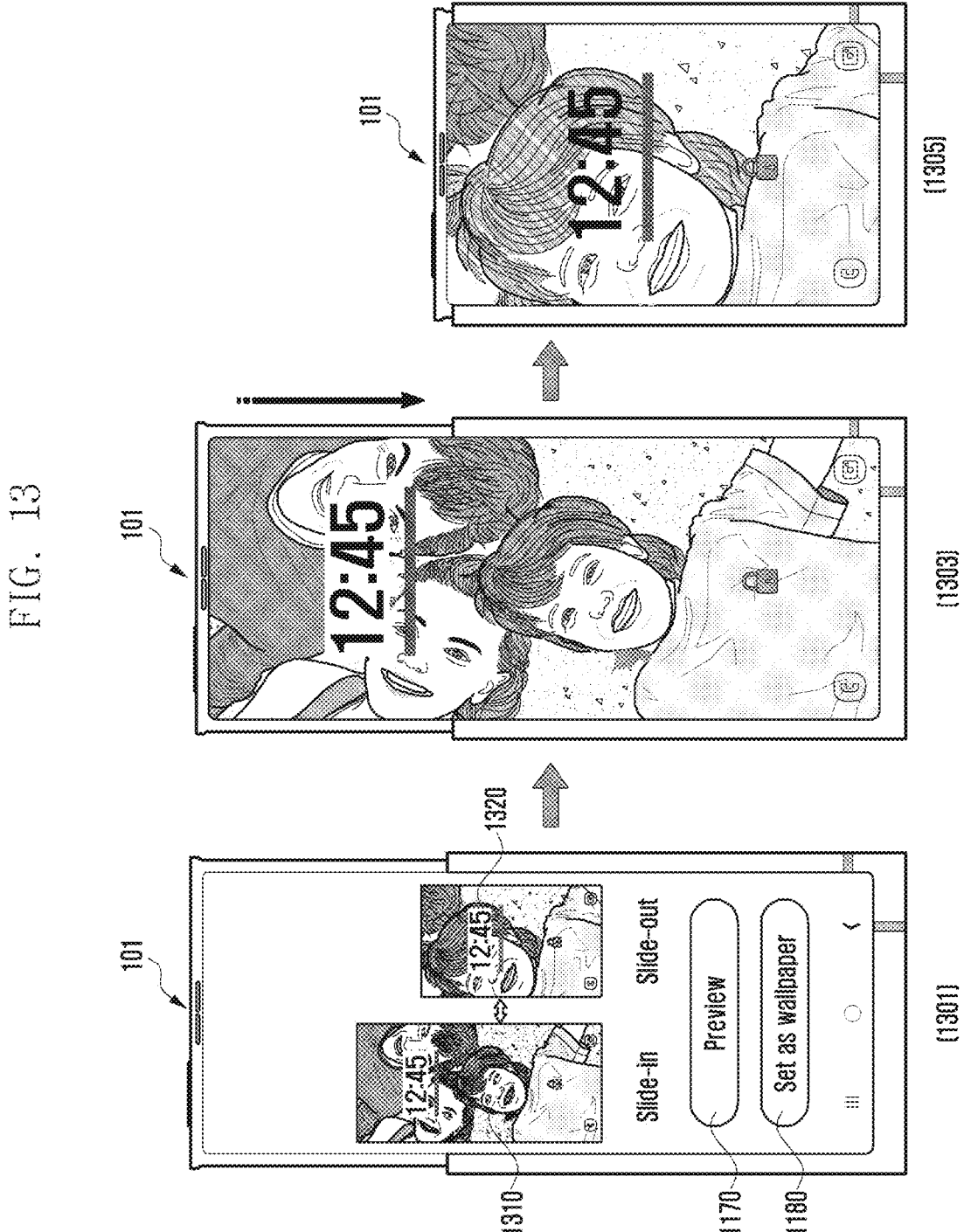
FIG. 13 is a view for describing an example of configuring wallpaper in an electronic device according to an embodiment of the present disclosure.

FIG. 13 is a view for describing an example of configuring wallpaper in an electronic device according to an embodiment of the present disclosure.

According to an embodiment, FIG. 13 may illustrate an example of an operation of supporting a wallpaper setting in the electronic device 101 (e.g., the electronic device 300), according to an embodiment. According to an embodiment, FIG. 13 may illustrate an example of a case in which the electronic device 101 enters a wallpaper setting mode in an open state. According to an embodiment, the operations according to FIG. 13 may include the operations corresponding to FIG. 11A and FIG. 11B, and redundant specific descriptions will be omitted.

With reference to FIG. 13, in example 1301, the processor 120 may display a user interface related to a wallpaper setting that includes a plurality of preview images 1310 and 1320 corresponding to a plurality of states (e.g., a closed state and an open state) of the electronic device 101.

With reference to example 1301, the processor 120 may simultaneously provide preview images 1310 and 1320 corresponding to an open state and a closed state of the electronic device 101 (or display), respectively. According to an embodiment, the processor 120 may simultaneously provide a preview image 1310 to be displayed in an open state and a preview image 1320 to be displayed in a closed state to a wallpaper preview area.

For example, with reference to FIG. 11A compared to FIG. 13, the processor 120 may provide a different position of a preview image in a wallpaper preview area (e.g., a switch between positions) in response to a state of the electronic device 101 (e.g., an open state or a closed state) at an occasion when the processor 120 enters a wallpaper setting mode. According to an embodiment, the processor may, depending on a state upon entering a wallpaper setting mode, switch a position of a preview image according to a corresponding state so that a user may intuitively recognize wallpaper corresponding to each state. For example, the processor 120 may provide an intuitive preview of how the wallpaper configured by a user changes according to each state and/or state change of the electronic device 101 (or display).

In example 1301, the processor 120 may complete a wallpaper setting operation based on a user input, or provide a wallpaper preview based on an image area configured for each state.

According to an embodiment, the processor 120 may complete a wallpaper setting operation when a user input (e.g., touch) is detected through a completion object 1180 (e.g., a completion button) that completes a wallpaper setting.

According to an embodiment, when the processor 120 detects a user input (e.g., touch) through the preview object 1170 (e.g., a preview execution button), the processor 120 may switch a user interface related to a wallpaper setting to a user interface related to a wallpaper preview, as in example 1303 and provide the user interface. According to an embodiment, the processor 120 may provide a wallpaper preview based on an image area of the preview image 1310 in correspondence to a current state (e.g., an open state) of the electronic device 101. For example, the processor 120 may provide a wallpaper preview in which wallpaper is configured with an image area related to an open state (e.g., includes all of the face objects 1140, 1150, and 1160 of the wallpaper image 1100).

According to an embodiment, a user may confirm a wallpaper preview according to an open state, and then perform a user input (e.g., a roll in operation of the electronic device 101) to switch the electronic device 101 from an open state to a closed state, as illustrated in example 1305. In example 1305, the processor 120 may provide a wallpaper preview on the basis of an image area of the preview image 1320 in correspondence to a closed state, on the basis of detecting a state change in which the electronic device 101 changes from an open state to the closed state. For example, the processor 120 may provide a wallpaper preview in which wallpaper is configured with an image area related to a closed state (e.g., includes the face object 1140 of the wallpaper image 1100).

According to an embodiment, the processor 120 may support continuous screen switching for changes in display, by changing a display ratio of an image area to correspond to each state on the basis of a single wallpaper image 1100, upon switching from an open state to a closed state, such as switching from example 1303 to example 1305, or upon switching from a closed state to an open state, such as switching from example 1305 to example 1303. An example related to this will be described with reference to the drawings described below.

Figure 14:
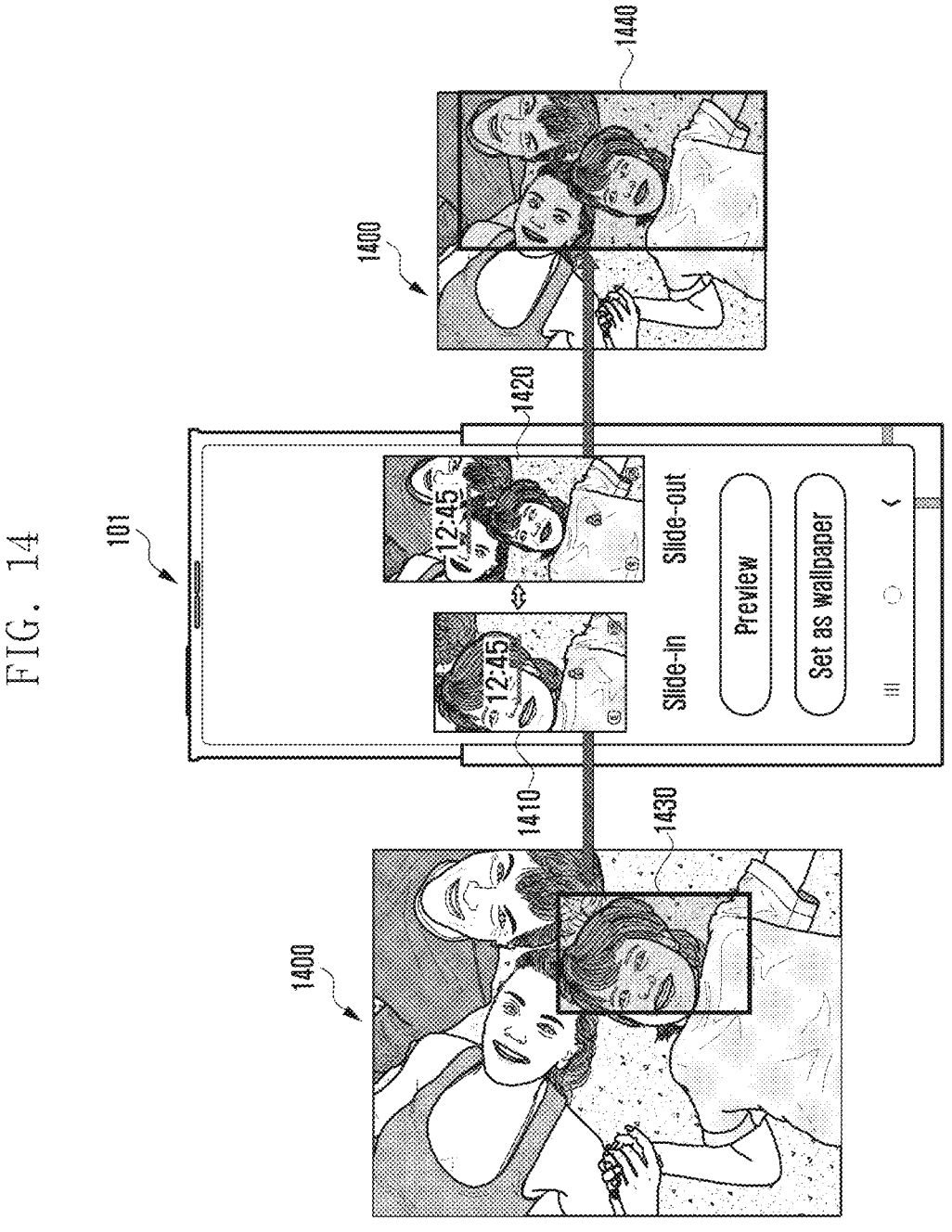
FIG. 14 is a view for describing an example of a wallpaper image for wallpaper in an electronic device according to an embodiment of the present disclosure.

FIG. 14 is a view for describing an example of a wallpaper image for wallpaper in an electronic device according to an embodiment of the present disclosure.

According to an embodiment, FIG. 14 may illustrate an example of configuring a displayable image area corresponding to a first state (e.g., a closed state) and a second state (e.g., an open state) of the electronic device 101, respectively, on the basis of a wallpaper image 1400 designated for wallpaper.

According to an embodiment, the preview image 1410 corresponding to a first state (e.g., a closed state) of the electronic device 101 may be provided on the basis of a configuration value of an image area 1430 (or position) (e.g., about 1092, 980 position) that includes at least one image object designated on the basis of an original size (e.g., scale=about 100%) of the wallpaper image 1400. For example, the image area 1430 may represent a configuration area that is displayed as wallpaper on a display in a closed state of the electronic device 101.

According to an embodiment, the preview image 1420 corresponding to a second state (e.g., an open state) of the electronic device 101 may be provided on the basis of a configuration value of an image area 1440 (or position) (e.g., about 1038, 1140 position) that includes at least one image object designated on the basis of a size (e.g., scale=about 67%) at which an original size (e.g., scale=about 100%) of the wallpaper image 1400 is contracted by a predetermined ratio. For example, the image area 1440 may represent a configuration area that is displayed as wallpaper on the display in an open state of the electronic device 101.

According to an embodiment, as illustrated in FIG. 14, an image area for wallpaper may be provided, for the wallpaper image 1400, by changing an image configuration value of the image area to be displayed in proportion to a change in display height (e.g., a zoom in/out effect). For example, an image area for wallpaper may be configured by changing a scale of the wallpaper image 1400 in correspondence to a display ratio of the display.

Figure 15:
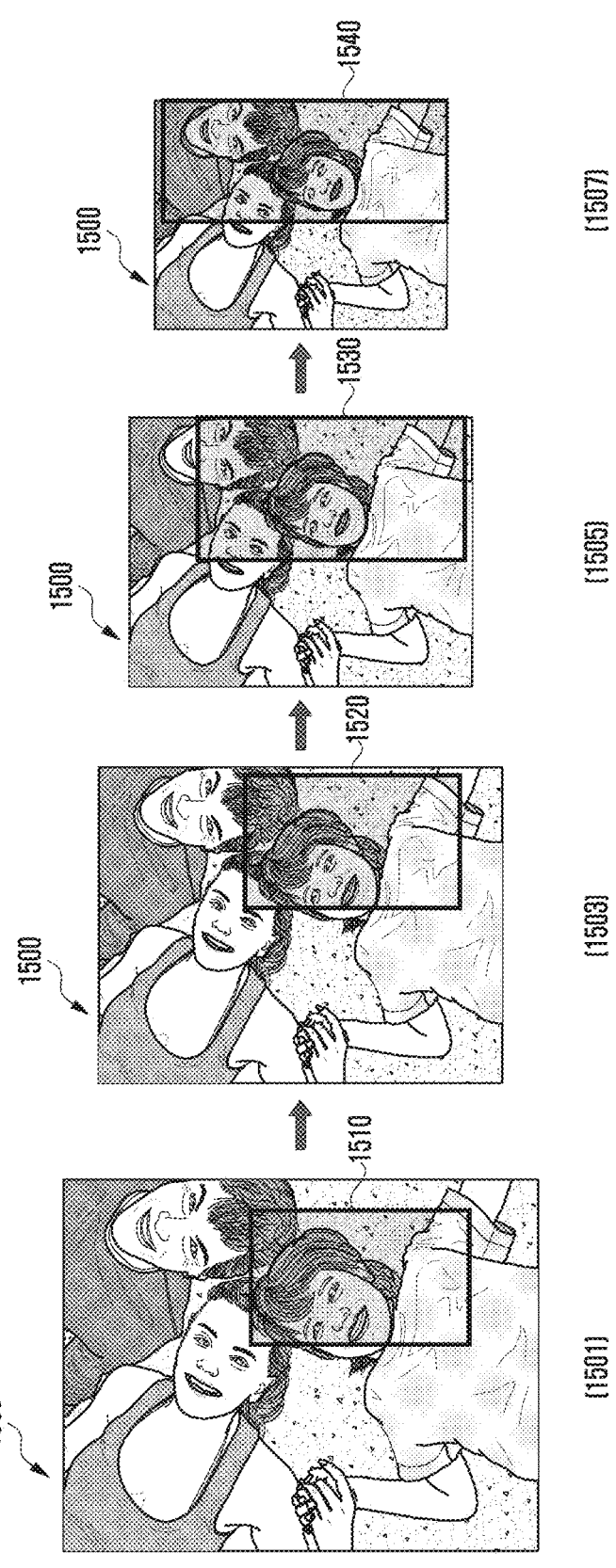
FIG. 15 is a view for describing an example in which a wallpaper image is provided in response to a state change in an electronic device according to an embodiment of the present disclosure.

FIG. 15 is a view for describing an example in which a wallpaper image is provided in response to a state change in an electronic device according to an embodiment of the present disclosure.

According to an embodiment, FIG. 15 is a view for describing an example in which an image area displayable in correspondence to a state change of the electronic device 101 is changed on the basis of a wallpaper image 1500 designated for wallpaper.

According to an embodiment, example 1501, example 1503, example 1505, and example 1507 may represent changes in image areas 1510, 1520, 1530, and 1540 that are actually displayed as wallpaper on a display on the basis of an amount of change in display (e.g., an amount of withdrawal or a ratio of display area that is changed to be expanded) when the electronic device 101 undergoes a state change from a closed state to an open state.

According to an embodiment, in the wallpaper provided when the electronic device 101 is switched to an open state, while the wallpaper image 1500 may be contracted on the basis of a first amount of change in display (e.g., an amount of withdrawal), at least a portion of the contracted wallpaper image 1500 may be sequentially included in an image area. According to an embodiment, in the wallpaper provided when the electronic device 101 is switched to a closed state, the wallpaper image 1500 may be expanded on the basis of a second amount of change in display (e.g., an amount of retraction), and at least a portion of the expanded wallpaper image 1500 may be sequentially included in an image area.

As illustrated in FIG. 15, the image areas 1510, 1520, 1530, and 1540 of the wallpaper that are displayed in response to a state change in the wallpaper image 1500 may be provided in such a way that an image configuration value changes in proportion to a change in display height. For example, as illustrated in FIG. 15, a scale of the wallpaper image 1500 may be gradually reduced (e.g., about 100%-about 89%-about 78%-about 67%) and a center point (or reference position) of an image area may be gradually moved (e.g., about 1092, 980 position-about 1038, 1140 position) in proportion to an increase in display height (e.g., switching from a closed state to an open state).

Figure 16:
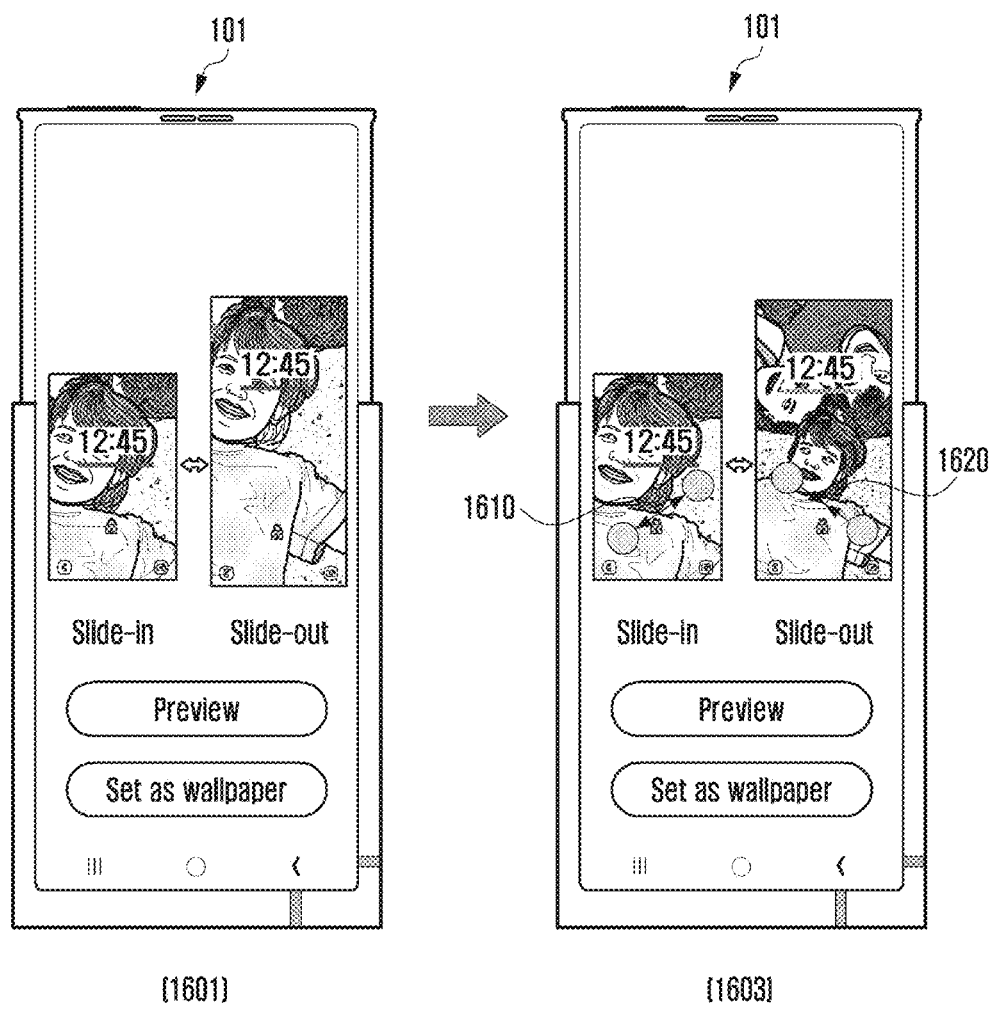
FIG. 16 is a view for describing an example of configuring wallpaper in an electronic device according to an embodiment of the present disclosure.

FIG. 16 is a view for describing an example of configuring wallpaper in an electronic device according to an embodiment of the present disclosure.

According to an embodiment, FIG. 16 may illustrate an example of an operation of supporting a wallpaper setting in the electronic device 101 (e.g., the electronic device 300), according to an embodiment. According to an embodiment, FIG. 16 may illustrate an example of supporting a direct configuration of an image area to be provided as wallpaper corresponding to each state from a wallpaper image by a user input.

With reference to FIG. 16, in example 1601, the processor 120 may display a user interface related to a wallpaper setting that includes a plurality of preview images 1310 and 1320 corresponding to a plurality of states (e.g., a closed state and an open state) of the electronic device 101. With reference to example 1301, the processor 120 may simultaneously provide preview images corresponding to an open state and a closed state of the electronic device 101 (or display), respectively.

In example 1603, a user may directly configure an image area corresponding to at least one state in a preview image to be displayed in an open state and/or a preview image to be displayed in a closed state through a user input 1610 or 1620 (e.g., a zoom in/out input).

According to an embodiment, a user may contract a range of an image area to be displayed as wallpaper using a zoom in input in a preview image and allow a designated object (e.g., a specific face object) to be expanded for display. According to an embodiment, a user may expand a range of an image area to be displayed as wallpaper using a zoom out input in a preview image and allow a designated object (e.g., a plurality of face objects) to be further included for display.

Figure 17:
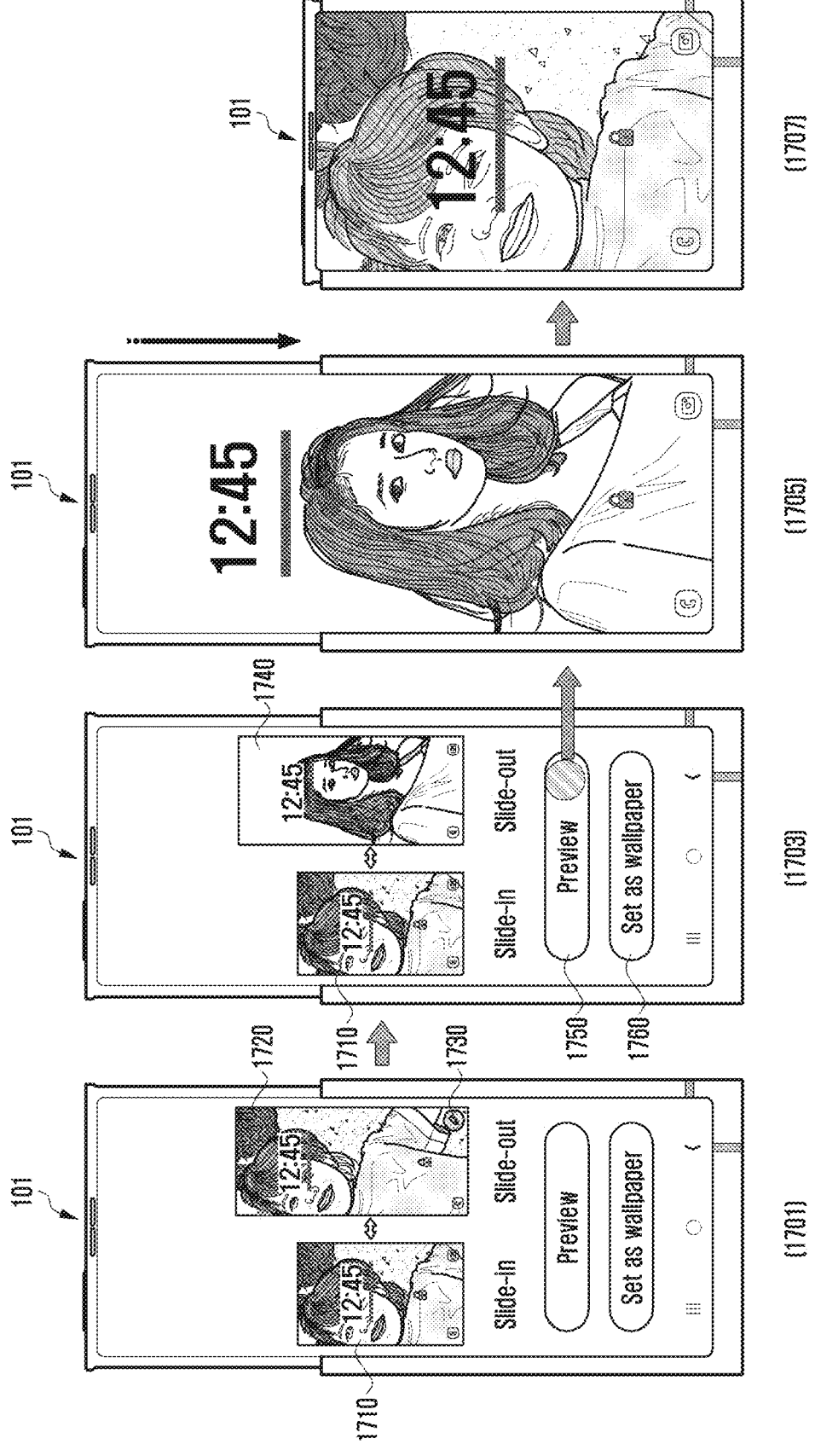
FIG. 17 is a view for describing an example of configuring wallpaper in an electronic device according to an embodiment of the present disclosure.

FIG. 17 is a view for describing an example of configuring wallpaper in an electronic device according to an embodiment of the present disclosure.

According to an embodiment, FIG. 17 may illustrate an example of an operation of supporting a wallpaper setting in the electronic device 101 (e.g., the electronic device 300), according to an embodiment. According to an embodiment, FIG. 17 may illustrate an example of a case in which the electronic device 101 enters a wallpaper setting mode in an open state. According to an embodiment, FIG. 17 may illustrate an example of configuring wallpaper corresponding to each state on the basis of different wallpaper images.

With reference to FIG. 17, in example 1701, the processor 120 may simultaneously provide preview images 1710 and 1720 corresponding to a first state (e.g., a closed state) and a second state (e.g., an open state), respectively, of the electronic device 101 (or display). According to an embodiment, the processor 120 may simultaneously provide a first preview image 1710 to be displayed in a first state and a second preview image 1720 to be displayed in a second state to a wallpaper preview area. According to an embodiment, the processor 120 may provide each of the preview images 1710 and 1720 on the basis of a default area (e.g., on the basis of a cropped area) in a designated wallpaper image when an occasion of entering a wallpaper setting is an initial configuration.

With reference to example 1701, the processor 120 may provide a change object 1730 on the basis of an area (e.g., right side lower end area) designated in the second preview image 1720 related to a second state (e.g., an open state) of the wallpaper preview area. According to an embodiment, the change object 1730 may represent an object (e.g., an icon) for changing a wallpaper image for wallpaper related to a designated state. According to an embodiment, the change object 1730 may be provided, respectively, on the basis of respective designated areas in both the first preview image 1710 related to a first state (e.g., a closed state) and the second preview image 1720 related to a second state, of the wallpaper preview area.

In example 1701, the processor 120 may detect a user input for the change object 1730. According to an embodiment, a user may select (e.g., touch) the change object 1730 to change a wallpaper image of wallpaper for a designated state through the change object 1730 displayed in a preview image.

According to an embodiment, the processor 120 may, on the basis of detecting a user input for the change object 1730, provide a designated user interface for obtaining an image to be changed, and obtain an image to be changed according to a user selection through the user interface. For example, the processor 120 may provide a user interface (e.g., a photographing interface) for obtaining an image to be changed by photographing according to a user selection, or a user interface (e.g., a gallery interface) for obtaining an image to be changed by selecting a pre-stored image. A user may obtain (e.g., photograph or select) an image that the user desires to change on the basis of a user interface provided, and designate the image as a wallpaper image for a selected state.

In example 1703, the processor 120 may display a preview image 1740 of wallpaper based on a wallpaper image obtained by a user. For example, the processor 120 may change and provide a second preview image 1740 to be displayed in a second state on the basis of an image area of the obtained wallpaper image. For example, the processor 120 may provide the second preview image 1740 as a wallpaper preview that fits a display size of the electronic device 101 (or display) in a second state (e.g., an open state).

In a state like example 1703, the processor 120 may perform a corresponding operation on the basis of a user input. According to an embodiment, the processor 120 may complete a wallpaper setting operation based on a user input, or provide a wallpaper preview based on an image area configured for each state.

In example 1703, the processor 120 may complete a wallpaper setting operation when a user input (e.g., touch) is detected through a completion object 1760 (e.g., a completion button) that completes a wallpaper setting. For example, the processor 120 may configure wallpaper for a first state on the basis of an image area corresponding to a first wallpaper image, and configure wallpaper for a second state on the basis of an image area corresponding to a second wallpaper image that is different from the first wallpaper image.

In example 1703, when the processor 120 detects a user input (e.g., touch) through the preview object 1750 (e.g., a preview execution button), the processor 120 may switch a user interface related to a wallpaper setting to a user interface related to a wallpaper preview, as in example 1705 and provide the user interface. According to an embodiment, the processor 120 may provide a wallpaper preview on the basis of an image area of a second wallpaper image configured in the second preview image 1720 in correspondence to a current state (e.g., an open state) of the electronic device 101. For example, the processor 120 may provide a wallpaper preview in which wallpaper is configured to an image area of a second wallpaper image related to a second state.

According to an embodiment, a user may confirm a wallpaper preview according to a first state, and then perform a user input (e.g., a roll in operation of the electronic device 101) to switch the electronic device 101 from a second state (e.g., an open state) to the first state (e.g., a closed state), as illustrated in example 1705. In example 1705, the processor 120 may provide a wallpaper preview on the basis of an image area of a first wallpaper image configured in the first preview image 1710 in correspondence to the first state, on the basis of detecting a state change in which the electronic device 101 changes from the second state to the first state. For example, the processor 120 may provide a wallpaper preview in which wallpaper is configured to an image area of a first wallpaper image related to a first state.

According to an embodiment, the processor 120 may provide a designated switching effect (or change effect) for a visual effect of continuous screen switching based on a change in display when the processor 120 is switched from a second state (e.g., an open state) to a first state (e.g., a closed state), or from a first state to a second state. Examples related to this are illustrated in FIGS. 18 and 19.

Figure 18:
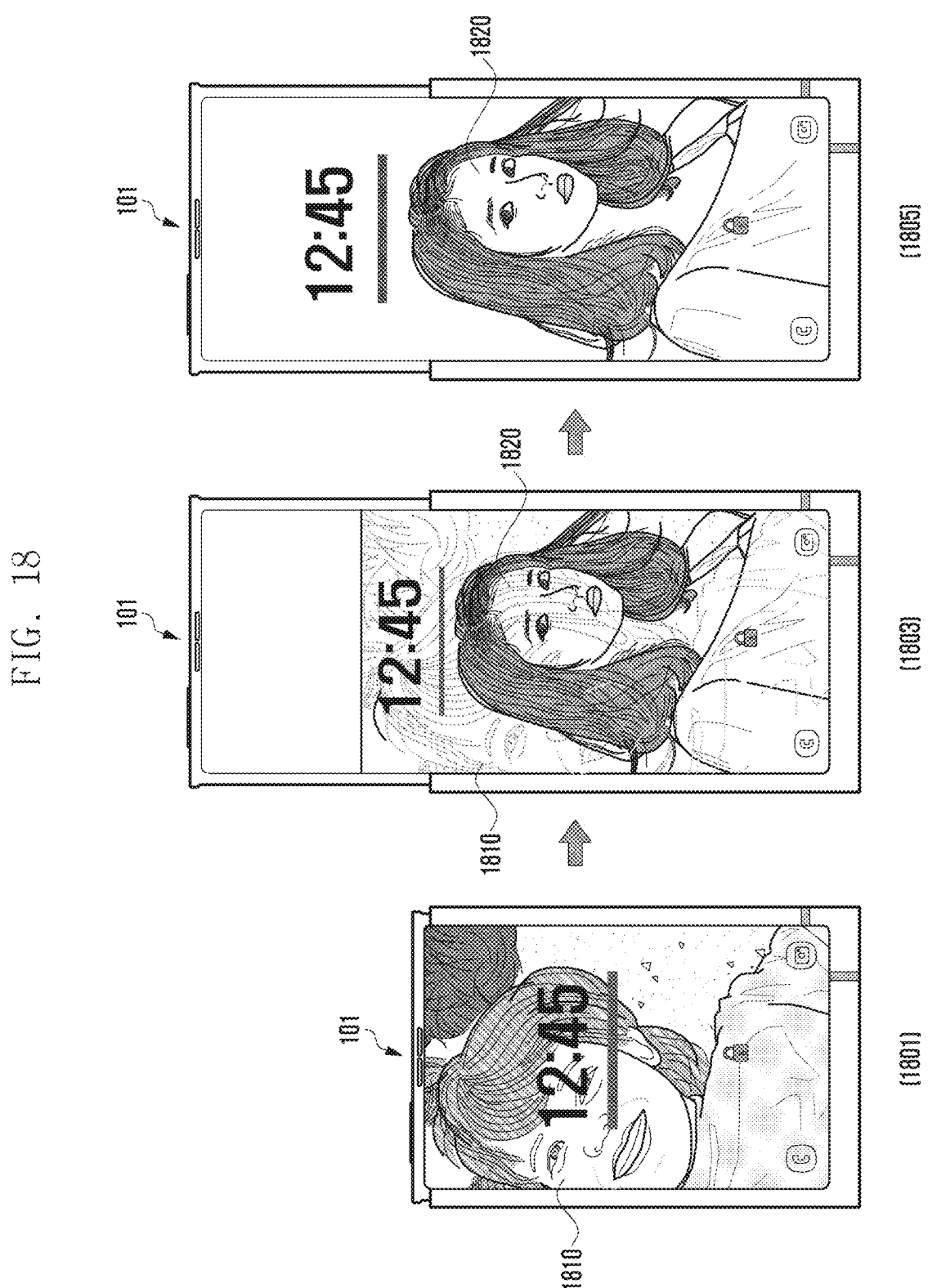
FIG. 18 is a view illustrating an example of providing a wallpaper switching effect in response to a state change in an electronic device according to an embodiment of the present disclosure.
Figure 19:
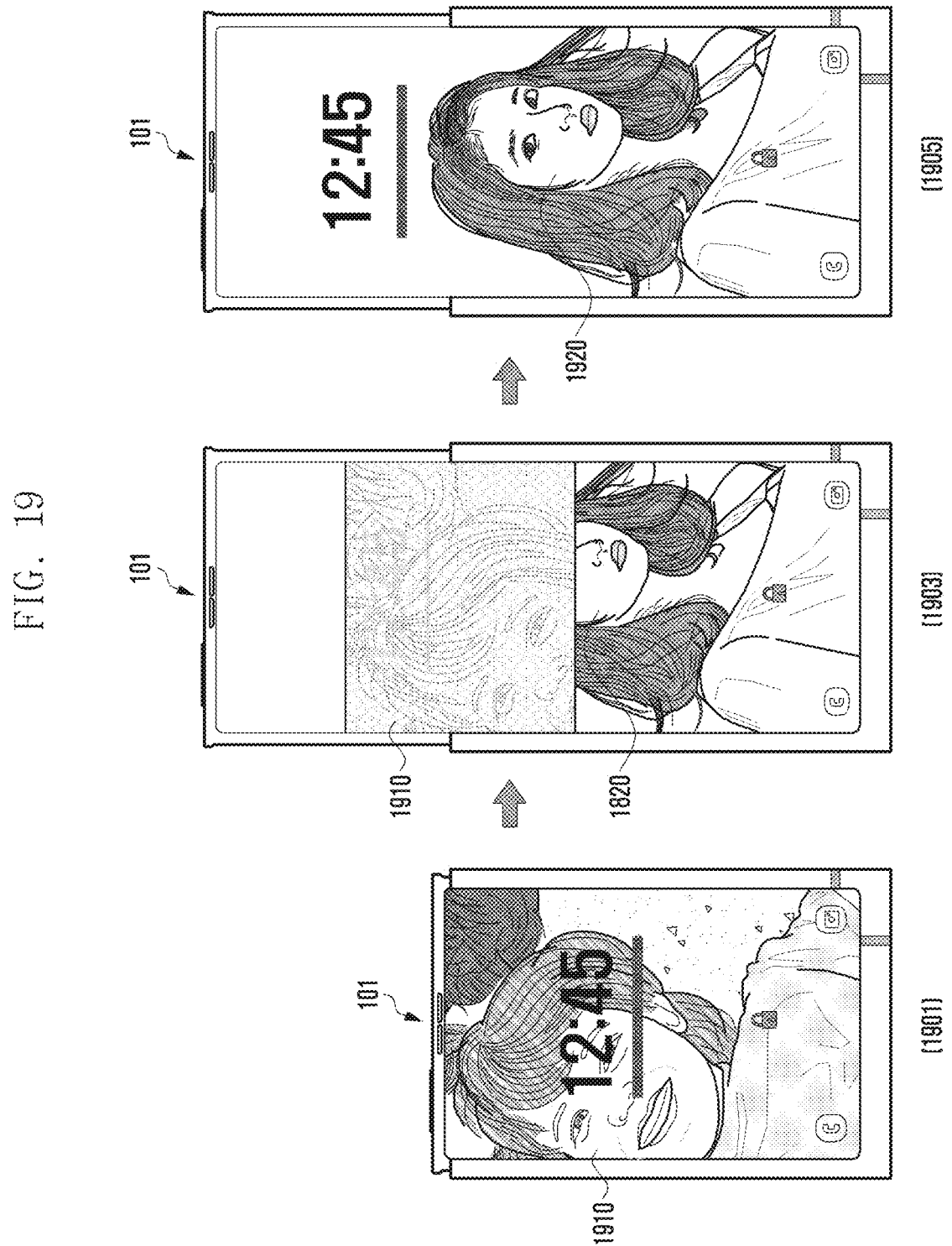
FIG. 19 is a view illustrating an example of providing a wallpaper switching effect in response to a state change in an electronic device according to an embodiment of the present disclosure.

FIG. 18 is a view illustrating an example of providing a wallpaper switching effect in response to a state change in an electronic device according to an embodiment of the present disclosure.

According to an embodiment, FIG. 18 may illustrate an example of switching wallpaper (e.g., wallpaper based on a first image area of a wallpaper image) for a closed state and wallpaper for an open state (e.g., wallpaper based on a second image area of a wallpaper image or another wallpaper image) as a first designated switching effect in correspondence to a state change of the electronic device 101 from a closed state to an open state. According to an embodiment, FIG. 18 illustrates an example of switching from a closed state to an open state, and the first designated switching effect according to FIG. 18 may also be applied during a state change from an open state to a closed state.

With reference to FIG. 18, in example 1801, the electronic device 101 may display first wallpaper 1810 on the basis of a first image area of a designated wallpaper image in a closed state. For example, example 1801 may be a state in which the electronic device 101 is in a closed state and displays the first wallpaper 1810 through the display on the basis of a designated image area of a wallpaper image. According to an embodiment, the electronic device 101 may display the first wallpaper 1810 on the basis of a first output resolution in a closed state of the display. According to an embodiment, the first output resolution may include a resolution corresponding to a full screen in a closed state of the display. According to an embodiment, the electronic device 101 may display the first wallpaper 1810 on the basis of a first output resolution according to a closed state.

According to an embodiment, the electronic device 101 may be switched from a closed state to an open state on the basis of a user input, as in example 1803. According to an embodiment, the electronic device 101 may be switched from a closed state to an open state on the basis of a user input to change a state of the electronic device 101 while displaying the first wallpaper 1810 through the display. For example, the electronic device 101 may detect a state change in which an output resolution of the display changes (or a display ratio of a display area changes) while displaying the first wallpaper 1810.

In example 1803, the electronic device 101 may provide a switching effect in which, while being switched from a closed state to an open state, the electronic device 101 is switched from the first wallpaper 1810 based on a first image area of a designated wallpaper image in the closed state to a second wallpaper 1820 based on a second image area of a designated wallpaper image in the open state (e.g., a wallpaper image that is the same as or different from the designated wallpaper image in the closed state). For example, the switching effect may include various screen switching effects, such as a frame in/out (or slide in/out) effect or a fade in/out effect.

According to an embodiment, example 1803 may illustrate an example of providing a switching effect between wallpapers on the basis of a fade in/out effect. For example, the first wallpaper 1810 may gradually disappear in a fade out, while the second wallpaper 1820 may appear at roughly the same time, gradually substituting for the first wallpaper 1810 in a fade in.

In example 1805, the electronic device 101 may display the second wallpaper 1820 based on a second image area of a designated wallpaper image in an open state (e.g., a wallpaper image that is the same as or different from a designated wallpaper image in a closed state) at an occasion when the switching effect has been completed. For example, example 1805 may be a state in which the electronic device 101 is in an open state and displays the second wallpaper 1820 through the display on the basis of a designated image area of a wallpaper image. According to an embodiment, the electronic device 101 may display the second wallpaper 1820 on the basis of a second output resolution in an open state of the display. According to an embodiment, the second output resolution may include a resolution corresponding to a full screen in an open state of the display. According to an embodiment, the electronic device 101 may display the second wallpaper 1820 on the basis of a second output resolution based on an open state.

FIG. 19 is a view illustrating an example of providing a wallpaper switching effect in response to a state change in an electronic device according to an embodiment of the present disclosure.

According to an embodiment, FIG. 19 may illustrate an example of switching wallpaper (e.g., wallpaper based on a first image area of a wallpaper image) for a closed state and wallpaper for an open state (e.g., wallpaper based on a second image area of a wallpaper image or another wallpaper image) as a second designated switching effect in correspondence to a state change of the electronic device 101 from a closed state to an open state. According to an embodiment, FIG. 19 illustrates an example of switching from a closed state to an open state, and the second designated switching effect according to FIG. 19 may also be applied during a state change from an open state to a closed state.

With reference to FIG. 19, in example 1901, the electronic device 101 may display first wallpaper 1910 on the basis of a first image area of a designated wallpaper image in a closed state. For example, example 1901 may be a state in which the electronic device 101 is in a closed state and displays the first wallpaper 1910 through the display on the basis of a designated image area of a wallpaper image. According to an embodiment, the electronic device 101 may display the first wallpaper 1910 on the basis of a first output resolution in a closed state of the display.

According to an embodiment, the electronic device 101 may be switched from a closed state to an open state on the basis of a user input, as in example 1903. According to an embodiment, the electronic device 101 may be switched from a closed state to an open state on the basis of a user input to change a state of the electronic device 101 while displaying the first wallpaper 1910 through the display. For example, the electronic device 101 may detect a state change in which an output resolution of the display changes (or a display ratio of a display area changes) while displaying the first wallpaper 1910.

In example 1903, the electronic device 101 may provide a switching effect in which, while being switched from a closed state to an open state, the electronic device 101 is switched from the first wallpaper 1910 based on a first image area of a designated wallpaper image in the closed state to a second wallpaper 1920 based on a second image area of a designated wallpaper image in the open state (e.g., a wallpaper image that is the same as or different from the designated wallpaper image in the closed state). For example, the switching effect may include various screen switching effects, such as a frame in/out (or slide in/out) effect or a fade in/out effect.

According to an embodiment, example 1903 may illustrate an example of providing a switching effect between wallpapers on the basis of a frame in/out effect. For example, the first wallpaper 1910 may gradually disappear in a frame out in a designated direction, while the second wallpaper

1920 may appear at roughly the same time, gradually substituting for the first wallpaper 1910 in a frame in.

In example 1905, the electronic device 101 may display the second wallpaper 1920 based on a second image area of a designated wallpaper image in an open state (e.g., a wallpaper image that is the same as or different from a designated wallpaper image in a closed state) at an occasion when the switching effect has been completed. For example, example 1905 may be a state in which the electronic device 101 is in an open state and displays the second wallpaper 1920 through the display on the basis of a designated image area of a wallpaper image. According to an embodiment, the electronic device 101 may display the second wallpaper 1820 on the basis of a second output resolution in an open state of the display.

The electronic device 101 according to an embodiment of the present disclosure may include a rollable display having a first display area and a second display area that expands from the first display area. An operation method performed by an electronic device 101 according to an embodiment of the present disclosure may include an operation of configuring a first image area corresponding to first wallpaper displayed in a first display area, and displaying a first preview image corresponding to the configured first image area, and an operation of configuring a second image area corresponding to second wallpaper displayed in a second display area, and displaying a second preview image corresponding to the configured second image area.

According to an embodiment, the first display area may include an area that is visually exposed in a first state. According to an embodiment, the second display area may include an area that is visually exposed in a second state different from the first state, and that expands an area of the first display area in response to a sliding movement of the second housing.

According to an embodiment, the electronic device 101 may be configured such that a size of the second preview image changes in proportion to a change in a size of the second display area in response to a sliding movement of a housing of the electronic device 101.

An operation of configuring a preview image in the electronic device 101 according to an embodiment of the present disclosure may include an operation of detecting a trigger related to a wallpaper setting, and an operation of simultaneously displaying, on the basis of detecting the trigger, a plurality of preview images (e.g., a first preview image and a second preview image) each corresponding to a plurality of states (e.g., a first state and a second state) of the electronic device 101.

According to an embodiment, the displaying operation may simultaneously display the first preview image and the second preview image corresponding to the first display area in the first state and the second display area in the second state, respectively.

According to an embodiment, the displaying operation may include an operation of performing an object analysis of various image objects on the basis of an entire area of a wallpaper image corresponding to the first preview image and the second preview image, an operation of generating at least one recommended object related to at least one image object on the basis of a result of the object analysis, and an operation of providing the at least one recommended object to a wallpaper preview area for wallpaper.

According to an embodiment, the recommended object may include an icon, an image, and/or a text that indicates at least one information related to at least one image object included in another image area not designated as an image area for wallpaper in the wallpaper image.

According to an embodiment, the at least one information may include first information indicating a person, a user face, an animal, a plant, a food, an automobile, and/or an object, and second information indicating a number corresponding to each one of the first information.

According to an embodiment, the operation of displaying a preview image may include an operation of detecting a user input of selecting a recommended object on the basis of the at least one recommended object, and an operation of identifying, in response to the user input, the second image area for the second wallpaper on the basis of the selected recommended object, an operation of configuring the second wallpaper based on the second image area, and an operation of displaying the second preview image for the second wallpaper through the wallpaper preview area.

According to an embodiment, the operation of displaying a preview image may include an operation of detecting a trigger related to the wallpaper setting, an operation of entering a wallpaper setting mode on the basis of detecting the trigger, and an operation of providing, upon entering the wallpaper setting mode, a user interface that includes a plurality of preview images each corresponding to a first state and a second state of the electronic device.

According to an embodiment, the operation of providing a user interface may include on operation of simultaneously providing a wallpaper preview area with a first preview image to be displayed in the first state and a second preview image to be displayed in the second state. According to an embodiment, the first preview image may represent a preview image based on a first image area that is to be shown as wallpaper in the first state in the wallpaper image. According to an embodiment, the second preview image may represent a preview image based on a second image area that is to be shown as wallpaper in the second state in the wallpaper image.

According to an embodiment, the first preview image and the second preview image may be provided on the basis of a designated image area of one identical wallpaper image or different wallpaper images.

According to an embodiment, the operation of performing an object analysis may include on operation of performing an object analysis of various image objects on the basis of an entire area of a wallpaper image corresponding to a preview image. According to an embodiment, the object analysis may include recognizing and extracting characteristics, patterns, and/or types that are implicit in the wallpaper image.

According to an embodiment, on the basis of a result of the object analysis based on a wallpaper image, an operation of identifying a recommendable image area based on an area that includes an image object in an entire area of the wallpaper image, and an operation of providing the at least one recommended object based on at least one image object of the recommendable image area, may be included.

According to an embodiment, the operation of providing at least one recommended object may include an operation of providing a recommended object on the basis of at least one wallpaper preview area designated among a first wallpaper preview area related to the first state and a second wallpaper preview area related to the second state.

According to an embodiment, the operation of displaying a preview image may include an operation of changing and displaying an existing preview image in a wallpaper preview area from the wallpaper image to a preview image based on an image area recommended according to the recommended object, in response to a user input of selecting the recommended object.

According to an embodiment, the changing and displaying operation may include an operation of zooming the recommended image area across an entire area of the wallpaper image to correspond to an output resolution of the second state, upon changing to the preview image based on the recommended image area.

According to an embodiment, an operation of detecting a user input on the basis of a completion object for completing a wallpaper setting, an operation of configuring, in response to the user input of selecting the completion object, the first wallpaper for the first state on the basis of a first image area corresponding to a first preview image in the wallpaper image, and operation of configuring the second wallpaper for the second state on the basis of a second image area corresponding to a second preview image in the wallpaper image, may be included.

According to an embodiment, an operation of determining the first state or the second state when displaying the wallpaper, after a configuration of the first wallpaper for the first state and the second wallpaper for the second state has been completed, and an operation of displaying the first preview image in the first state or displaying the second preview image in the second state, on the basis of a result of the determination, may be included.

According to an embodiment, an operation of detecting, while displaying a preview image, a change in state between the first state and the second state and, in response to detecting the change in state, an operation of changing a display ratio of a corresponding image area in the wallpaper image in correspondence to the first state or the second state, and an operation of displaying a preview image in accordance with the corresponding state, may be included.

According to an embodiment, an operation of switching and displaying the first preview image or the second preview image successively in response to a change between the first state and the second state, may be included.

According to an embodiment, an operation of detecting a user input on the basis of a preview object for a wallpaper preview, an operation of switching, in response to the user input of selecting the preview object, a first user interface related to a wallpaper setting to a second user interface related to a preview of the wallpaper, an operation of determining, upon switching the user interfaces, the first state or the second state, and an operation of displaying, on the basis of a result of the determination, a preview of the wallpaper based on a preview image configured in response to the first state or the second state, may be included.

The various embodiments disclosed in the present specification and drawings are provided as examples merely for easily explaining the technical contents and helping understand the present disclosure, but not intended to limit the scope of the technology disclosed in the present disclosure. Therefore, the scope of the present disclosure should be interpreted that all changes or modified forms derived based on the technical spirit of the present disclosure fall within the scope of the present disclosure in addition to the embodiments disclosed herein.

What is claimed is:
1. An electronic device comprising:
a first housing;
a second housing disposed to slidingly move relative to the first housing;

a flexible display comprising a first display area and a second display area extending from the first display area memory comprising one or more storage media storing instructions; and at least one processor comprising processing circuitry, wherein the instructions, when executed by the at least one processor individually and/or collectively, cause the electronic device to:

configure a first portion of an image as a first wallpaper to be displayed in the first display area when the electronic device is in a slide-in state, configure a second portion of the image as a second wallpaper to be displayed across the first display area and the second display area when the electronic device is in a slide-out state, and based on receiving a user input for configuring a wallpaper, display a screen including a first preview image corresponding to the first wallpaper and a second preview image corresponding to the second wallpaper.

2. The electronic device of claim 1, wherein the instructions, when executed by the at least one processor individually and/or collectively, cause the electronic device to change a size of the second preview image in proportion to a change in a size of the second display area in response to a sliding movement of the second housing.

3. The electronic device of claim 1, wherein the instructions, when executed by the at least one processor individually and/or collectively, cause the electronic device to:

perform an object analysis of various image objects on the basis of an entire area of the image corresponding to the first preview image and the second preview image, generate a recommended object related to at least one image object on the basis of a result of the object analysis, and provide the at least one recommended object to the screen including the first preview image and the second preview image, and wherein the object analysis is recognizing and extracting characteristics, patterns, and/or types implicit in the image.

4. The electronic device of claim 3, wherein the recommended object includes an icon, an image, and/or a text indicating at least one information related to the at least one image object included in another image area not designated as an image area for wallpaper in the image, and wherein the at least one information includes first information indicating a person, a user face, an animal, a plant, food, an automobile, and/or an object, and second information indicating a number corresponding to each one of the first information.

5. The electronic device of claim 3, wherein the instructions, when executed by the at least one processor individually and/or collectively, cause the electronic device to:

detect a user input of selecting the recommended object on the basis of the at least one recommended object, configure in response to the user input, the second portion of the image as a fourth wallpaper on the basis of the selected recommended object, display a fourth preview image corresponding to the fourth wallpaper instead of displaying the second preview image.

6. The electronic device of claim 3, wherein the slide-in state includes a state when the second housing is slid in the first housing, wherein the slide out state includes a state when the second housing is slid out from the first housing, wherein the first preview image and the second preview image are provided on the basis of a designated image area of one identical wallpaper image or different wallpaper-images.

7. The electronic device of claim 3, wherein the instructions, when executed by the at least one processor individually and/or collectively, cause the electronic device to:

identify, on the basis of the result of the object analysis, a recommendable image area on the basis of an area that includes an image object in an entire area of the image, and provide the at least one recommended object on the basis of at least one image object of the recommendable image area.

8. The electronic device of claim 3, wherein the screen includes a first preview image area and a second preview image area, wherein the instructions, when executed by the at least one processor individually and/or collectively, cause the electronic device to provide the recommended object to at least one of the first image area and the second preview image area.

9. The electronic device of claim 3, wherein the instructions, when executed by the at least one processor individually and/or collectively, cause the electronic device to:

in response to a user input of selecting the recommended object, display a preview image based on a recommended image area according to the recommended object on the screen, and zoom the recommended image area in an entire area of the image in correspondence to an output resolution of the slide-out state upon changing to the preview image based on the recommended image area.

10. The electronic device of claim 3, wherein the instructions, when executed by the at least one processor individually and/or collectively, cause the electronic device to:

detect a user input for completing configuring a wallpaper, configure the first wallpaper for the slide-in state on the basis of the first preview image in the image, and configure the second wallpaper for the slide-out state on the basis of the second preview image in the image.

11. The electronic device of claim 10, wherein the instructions, when executed by the at least one processor individually and/or collectively, cause the electronic device to:

complete configuring the first wallpaper for the slide-in state and the second wallpaper for the slide-out state, determine the slide-in state or the slide-out state when displaying the wallpaper, and display the first wallpaper in the slide-in state or display the second wallpaper in the slide-out state on the basis of a result of the determination.

12. The electronic device of claim 11, wherein the instructions, when executed by the at least one processor individually and/or collectively, cause the electronic device to:

while displaying the wallpaper, detect a state change between the slide-in state and the slide-out state, change, in response to detecting the state change, a display ratio of an image area corresponding to the wallpaper to correspond to the slide-in state or the slide-out state, display the wallpaper according to a corresponding state of the slide-in state or the slide-out state, and switch and display the first wallpaper or the second wallpaper successively in response to a change between the slide-in state and the slide-out state.

13. The electronic device of claim 3, wherein the instructions, when executed by the at least one processor individually and/or collectively, cause the electronic device to:

detect a user input on the basis of a preview object, switch a first user interface related to a configuring wallpaper to a second user interface related to a preview of the wallpaper in response to the user input of selecting the preview object, determine the slide-in state or the slide-out state upon switching the first user interface to the second user interface, and display a preview of the wallpaper on the basis of a preview image in response to the slide in state or the slide-out state on the basis of a result of the determination.

14. A method of operating an electronic device including a flexible display comprising a first display area and a second display area extending from the first display area, the method comprising:

configuring a first portion of an image as a first wallpaper to be displayed in the first display area when the electronic device is in a slide-in state, configuring a second portion of the image as a second wallpaper to be displayed across the first display area and the second display area when the electronic device is in a slide-out state, and based on receiving a user input for configuring a wallpaper, displaying a screen including a first preview image corresponding to the first wallpaper and a second preview image corresponding to the second wallpaper.

15. The method of claim 14, further comprising changing a size of the second preview image in proportion to a change in a size of the second display area in response to a sliding movement of the second housing.

16. The method of claim 14, further comprising:

performing an object analysis of various image objects on the basis of an entire area of the image corresponding to the first preview image and the second preview image, generating a recommended object related to at least one image object on the basis of a result of the object analysis, and providing the at least one recommended object to the screen including the first preview image and the second preview image, and wherein the object analysis is recognizing and extracting characteristics, patterns, and/or types implicit in the image.

17. The method of claim 14, further comprising:

completing configuring the first wallpaper for the slide-in state and the second wallpaper for the slide-out state, determining the slide-in state or the slide-out state when displaying the wallpaper, displaying the first wallpaper in the slide-in state or display the second wallpaper in the slide-out state on the basis of a result of the determination, while displaying the wallpaper, detecting a state change between the slide-in state and the slide-out state, changing, in response to detecting the state change, a display ratio of an image area corresponding to the image to correspond to the slide-in state or the slide-out state, and displaying the wallpaper according to a corresponding state of the slide-in state or the slide-out state.

18. One or more non-transitory computer-readable storage media storing computer-executable instructions that, when executed by one or more processors of an electronic device individually or collectively, cause the one or more processors to perform operations, the operations comprising:

configuring a first portion of an image as a first wallpaper to be displayed in a first display area when the electronic device is in a slide-in state, configuring a second portion of the image as a second wallpaper to be displayed across the first display area and a second display area when the electronic device is in a slide-out state, and based on receiving a user input for configuring a wallpaper, displaying a screen including a first preview image corresponding to the first wallpaper and a second preview image corresponding to the second wallpaper.

* * * * *